United States Patent
Young et al.

(10) Patent No.: US 10,522,827 B2
(45) Date of Patent: Dec. 31, 2019

(54) ELECTROCHEMICAL HYDROGEN STORAGE ELECTRODES AND CELLS

(71) Applicant: BASF Corporation, Florham Park, NJ (US)

(72) Inventors: Kwo Young, Troy, MI (US); Tiejun Meng, Novi, MI (US); Michael A. Fetcenko, Rochester, MI (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 15/142,109

(22) Filed: Apr. 29, 2016

(65) Prior Publication Data

US 2016/0329560 A1    Nov. 10, 2016

Related U.S. Application Data

(60) Provisional application No. 62/156,464, filed on May 4, 2015.

(51) Int. Cl.
| | |
|---|---|
| *H01M 4/38* | (2006.01) |
| *H01M 4/131* | (2010.01) |
| *H01M 4/52* | (2010.01) |
| *H01M 10/34* | (2006.01) |
| *H01M 10/0568* | (2010.01) |
| *H01M 10/0569* | (2010.01) |
| *H01M 4/74* | (2006.01) |
| *H01M 4/134* | (2010.01) |
| *H01M 4/66* | (2006.01) |

(52) U.S. Cl.
CPC ........... *H01M 4/383* (2013.01); *H01M 4/386* (2013.01); *H01M 10/345* (2013.01)

(58) Field of Classification Search
CPC ............................. H01M 4/383; H01M 4/386
See application file for complete search history.

(56) References Cited

U.S. PATENT DOCUMENTS

| | | | |
|---|---|---|---|
| 5,552,242 A * | 9/1996 | Ovshinsky | H01M 6/18 429/152 |
| 5,554,456 A | 9/1996 | Ovshinsky et al. | |
| 2005/0208376 A1 | 9/2005 | Williamson et al. | |
| 2007/0048604 A1 * | 3/2007 | Gaillard | H01M 2/0275 429/175 |

(Continued)

FOREIGN PATENT DOCUMENTS

| | | |
|---|---|---|
| DE | 2855413 A1 | 7/1980 |
| EP | 1764853 A1 | 3/2007 |

(Continued)

OTHER PUBLICATIONS

English language abstract of WO2012/056557 May 3, 2012.

(Continued)

*Primary Examiner* — Stewart A Fraser
*Assistant Examiner* — Rachel L Zhang
(74) *Attorney, Agent, or Firm* — Dinsmore & Shohl LLP; Weston R. Gould

(57) ABSTRACT

Hydrogen storage negative electrodes based on group IV elements, for example hydrogen storage negative electrodes based on silicon and/or carbon, are highly effective towards reversibly charging/discharging hydrogen in an hydride electrochemical cell.

21 Claims, 1 Drawing Sheet

Electrochemical performance after 25 formation cycles

(56) References Cited

U.S. PATENT DOCUMENTS

| | | | | |
|---|---|---|---|---|
| 2010/0015514 A1* | 1/2010 | Miyagi | ............... | H01M 4/131 |
| | | | | 429/129 |
| 2010/0190065 A1* | 7/2010 | Ihara | ................ | H01M 4/133 |
| | | | | 429/331 |
| 2011/0212363 A1* | 9/2011 | Yamazaki | ............. | H01G 11/46 |
| | | | | 429/206 |
| 2014/0079997 A1* | 3/2014 | Rosso | ................ | H01M 4/0421 |
| | | | | 429/213 |
| 2016/0141727 A1 | 5/2016 | Young et al. | | |

FOREIGN PATENT DOCUMENTS

| | | |
|---|---|---|
| FR | 2858313 A1 | 2/2005 |
| FR | 2881736 A1 | 8/2006 |
| JP | H108180 A | 1/1998 |
| JP | 2005-239454 A | 9/2005 |
| JP | 2005305394 A | 11/2005 |
| JP | 2006256888 A | 9/2006 |
| WO | 2008017793 | 2/2008 |
| WO | 2012/056557 A1 | 5/2012 |

OTHER PUBLICATIONS

English language abstract of JP2005-239454 Sep. 8, 2005.
International Search Report/written opinion dated Aug. 23, 2016.
Copending U.S. Appl. No. 14/669,588, filed Mar. 26, 2015.
Hui Wu et al., Nano Today vol. 7, pp. 414-429 May 21, 2012.

* cited by examiner

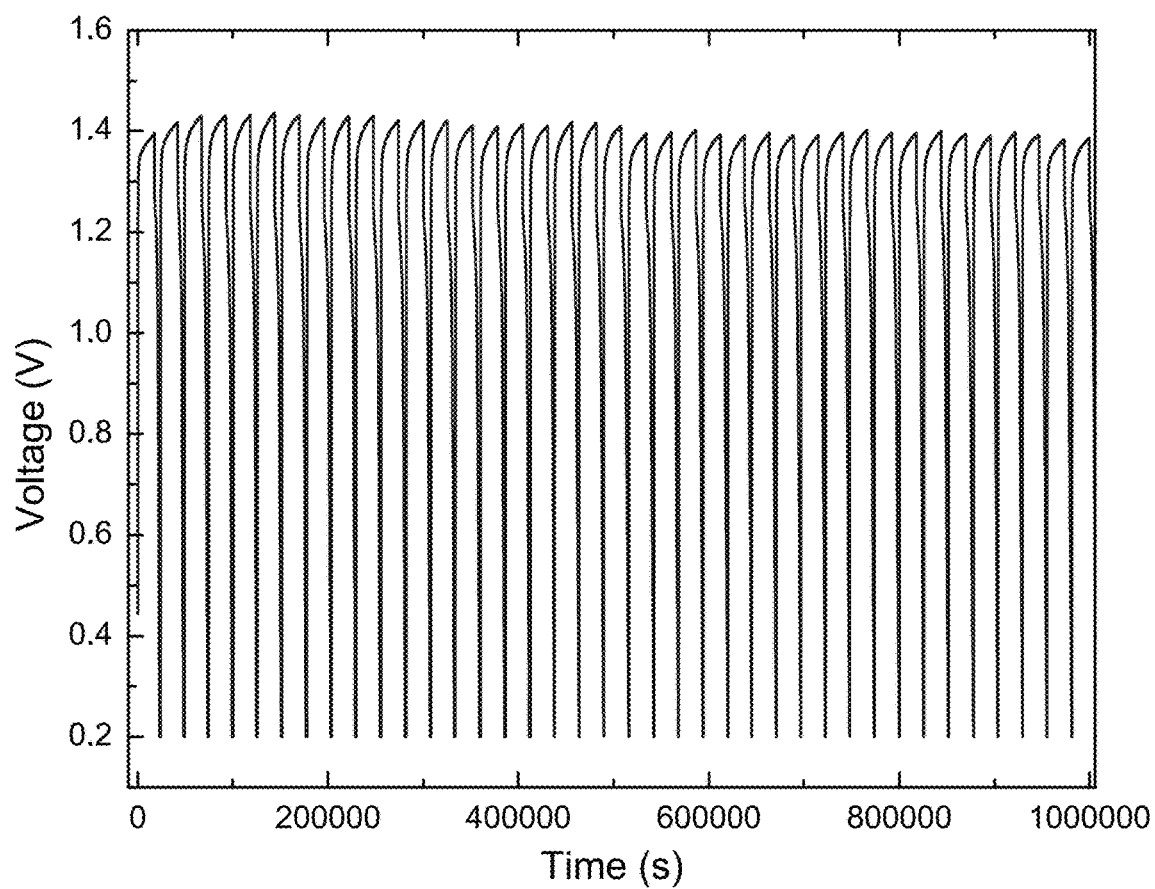
Electrochemical performance after 25 formation cycles

ELECTROCHEMICAL HYDROGEN STORAGE ELECTRODES AND CELLS

GOVERNMENT SUPPORT STATEMENT

This invention was made with government support under DE-AR0000386 awarded by Advanced Research Projects Agency-Energy. The government has certain rights in the invention.

The invention relates to electrochemical hydrogen storage electrodes, electrochemical hydrogen storage materials and electrochemical cells.

BACKGROUND OF THE INVENTION

Rechargeable metal hydride (MH) electrochemical cells are employed in numerous applications such as portable computers, phones, industrial applications, aerospace applications and electric vehicles.

The negative electrode (anode) of a metal hydride electrochemical cell may comprise an $AB_5$, $AB_2$, $A_2B_7$-type, Ti—Ni-based, Mg—Ni-based, BCC or Zr—Ni-based metal hydride alloy. The metal alloys are hydrogen storage alloys. Conventional $AB_5$ and $A_2B_7$ alloys have capacities of from about 320 to about 360 mAh/g and are of relatively high weight. Desired are rechargeable electrochemical cells having lighter weight, higher capacity and higher gravimetric energy density.

It has been found that a negative electrode comprising a hydrogen storage material based on one or more group IV elements is highly effective as a hydrogen charge/discharge component in an electrochemical cell. The hydrogen storage material is for example based on silicon and/or carbon.

SUMMARY OF THE INVENTION

Some non-limiting aspects of the invention include the following.

a. A stable group IV element-based, e.g. stable silicon-based hydrogen storage negative electrode for electrochemical hydrogen storage negative electrode for electrochemical uses. The hydrogen storage electrode may for instance be in contact with a non-aqueous electrolyte composition and/or comprises a solid electrolyte interface (SEI) capable of allowing proton transport. The SEI provides corrosion resistance for the electrode and may also serve as an electrochemical catalyst. The durability and functionality of the SEI layer are very important for the operation of a rechargeable electrochemical cell (battery). The typical SEI on the anode made from conventional hydrogen storage alloy contains oxide, hydroxide, metallic inclusion, amorphous oxide/metal buffer, voids and channels.

b. An electrochemical cell comprising a stable group IV element-based, e.g. stable silicon-based hydrogen storage negative electrode and an aqueous or non-aqueous electrolyte composition in contact with the electrode, for example the electrolyte composition is neutral or acidic, where the electrolyte composition has a pH of about 7 or less.

c. An electrochemical cell comprising a hydrogen storage negative electrode, a positive electrode and an electrolyte composition in contact with the electrodes, where the reversible half cell charge/discharge electrochemical reaction at the negative electrode is

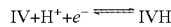

for example

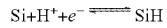

where IV and Si are a stable group IV element-based and a stable silicon-based hydrogen storage material, respectively.

d. A hydrogen storage negative electrode for electrochemical uses, where the discharge capacity of the hydrogen storage material is ≥800 mAh/g over 20 charge/discharge cycles.

e. An electrochemical cell comprising a hydrogen storage negative electrode, a positive electrode and an electrolyte composition in contact with the electrodes, where the cell exhibits a gravimetric energy density of >100 Wh/kg and/or a volumetric energy density of >250 Wh/L.

f. Modifying elements and/or compounds may be employed to alter the physical (density, porosity, melting temperature, etc.), chemical (alloy heat of formation, hydride heat of formation, electron coherent energy, hydrogen bond strength, nature of hydrogen bond, etc.) and electrochemical properties (capacity, rate capability, charge-retention, cycle stability, corrosion resistance, etc.) of the anode. In the case of group IV element-based hydrogen storage anode materials, suitable modifying elements include 1. Structural modifiers: elements to promote the amorphous phase of the material, such as B; 2. H-bond strength modifiers: elements to adjust the voltage of the cell, such as alkaline earth metals, transition metals, rare earth metals, and other metals from groups III and V of the periodic table; and 3. SEI modifiers: elements to prolong the cycle stability and reduce the temperature sensitivity of the SEI layer, including non-metal elements such as O, F, P, Cl, etc.

DETAILED DISCLOSURE

Disclosed are negative hydrogen storage electrodes based on one or more group IV elements, for instance based on Si and/or carbon. The hydrogen storage electrodes are useful in electrochemical cells. The cells comprise an electrolyte composition that is for example non-aqueous or is aqueous with a pH of about 7 or less.

In present electrochemical cells, it is believed that the reversible half cell electrochemical reaction at the negative electrode is

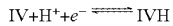

where IV is a hydrogen storage material based on one or more group IV elements.

In the case of a silicon-based hydrogen storage negative electrode, it is believed that the reversible half cell electrochemical reaction at the negative electrode is

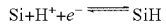

where Si is a silicon-based hydrogen storage material.

In a charged state, the negative electrode is reduced and contains stored hydrogen while the positive electrode is oxidized. During discharge, protons exit the negative electrode (anode) and migrate through the electrolyte composition to the positive electrode (cathode) while their associated electrons exit the anode via external circuitry.

The present cells are rechargeable and during charge/discharge cycles the negative electrode reversibly charges and discharges hydrogen as does a nickel metal hydride anode in a metal hydride cell, although possibly not via an identical mechanism. A present electrochemical cell may be considered a "hydride battery" or a "non-metal hydride battery" or a "rechargeable proton battery".

The hydrogen storage negative electrode comprises a hydrogen storage material based on one or more group IV elements, for example based on silicon. The hydrogen storage material is capable of reversibly charging and discharging hydrogen during cycling of an electrochemical cell. For example, the mechanism of charging hydrogen may be intercalation of protons. Likewise, the term "hydrogen storage" means capable of reversibly charging and discharging hydrogen during cycling of an electrochemical cell.

The term "based on" or "-based" means that the hydrogen storage material comprises greater than 27 wt % of one or more group IV elements, based on the total weight of the hydrogen storage material. "Silicon-based" means that the hydrogen storage material contains >27 wt % of Si, based on the total weight of the hydrogen storage material.

Group IV elements include silicon, carbon, germanium and tin. Group IV is also known as the carbon group or group 14 of the periodic table.

For example, the hydrogen storage material contains ≥28 wt %, ≥29 wt %, ≥30 wt %, ≥33 wt %, ≥35 wt %, ≥40 wt %, ≥45 wt %, ≥50 wt %, ≥55 wt %, ≥60 wt %, ≥65 wt %, ≥70 wt %, ≥75 wt %, ≥80 wt %, ≥85 wt %, ≥90 wt %, ≥95 wt %, ≥96 wt %, ≥97 wt %, ≥98 wt % or ≥99 wt % of one or more elements selected from the group consisting of group IV elements, for example Si and/or carbon, based on the hydrogen storage material.

The term "stable" means that the anode exhibits ≤10% capacity degradation over 100 charge/discharge cycles of an electrochemical cell. For instance, the anode may exhibit ≤9%, ≤8%, ≤7%, ≤6%, ≤5% or ≤4% capacity degradation over 100 charge/discharge cycles.

Percent capacity degradation at certain charge/discharge rates over 100 cycles is defined as $[(cap_H-cap_L)/cap_H]\cdot 100$ where $cap_H$ is the highest value of discharge capacity and $cap_L$ is the lowest value of discharge capacity. A typical half-cell cycling schema is with a C/5 charge rate for 110% state-of-charge (5.5 h) and discharge at C/5 rate to a cut-off voltage of 0.9 V vs. a standard $Ni(OH)_2$/NiOOH or −0.5 V vs. a Hg/HgO refrence electrode.

The anode may consist of or consist essentially of the hydrogen storage material or, alternatively, the anode may comprise the hydrogen storage material and a substrate. For instance, the hydrogen storage material may be adsorbed on a substrate such as a metal, glass, plastic or inorganic substrate. Inorganic substrate includes graphite.

For example, the hydrogen storage material may comprise silicon. Silicon may advantageously be amorphous (a-Si). Amorphous silicon may be deposited as a thin film onto a substrate via chemical vapor deposition (CVD) techniques, for example via plasma enhanced chemical vapor deposition techniques (PECVD).

Silicon may be hydrogenated to prepare hydrogenated silicon prior to or after preparation of the anode. For example, amorphous silicon may be hydrogenated to prepare a-Si:H prior to or after preparation of the anode. Thus, the anode may be hydrogenated prior to preparation of an electrochemical device. For instance, hydrogenated amorphous Si (a-Si:H) thin films may be prepared by chemical vapor deposition. An a-Si:H thin film may be prepared via rf-sputtering deposition of a-Si followed by hydrogenation.

The hydrogen storage material may comprise doped silicon or doped hydrogenated silicon, for example P-type silicon or hydrogenated P-type silicon. P-type silicon is for example silicon doped with Al. Suitable also for instance is silicon or hydrogenated silicon doped with phosphine or boron. For example, the hydrogen storage material is doped hydrogenated amorphous silicon (doped a-Si:H).

Suitable a-Si film thickness is for instance >20 nm, ≥50 nm, ≥90 nm, ≥120 nm or ≥180 nm. For instance, a suitable a-Si film thickness is from about 90 nm to about 10 μm, from about 100 nm to about 5 μm, from about 150 nm to about 3 μm, from about 150 nm to about 2 μm or from about 150 nm to about 1 μm.

Silicon may be microcrystalline silicon or nanocrystalline silicon, which generally are forms of amorphous silicon containing small silicon crystals. Silicon may also be monocrystalline silicon, polycrystalline or protocrystalline.

Silicon may be porous silicon (p-Si). Types of porous silicon include microporous, mesoporous and macroporous, with average pore sizes of less than about 2 nm, from about 2 nm to about 50 nm and greater than about 50 nm, respectively.

The hydrogen storage material may contain one or more different forms of silicon.

The hydrogen storage materials include alloys of silicon, for example alloys of silicon with one or more of carbon, germanium and tin. For instance amorphous alloys of silicon and carbon (amorphous silicon carbide) or alloys of silicon and germanium or alloys of silicon and tin. Amorphous alloys of silicon and carbon can also be hydrogenated to prepare $a\text{-}Si_{1-x}C_x\text{:}H$ where x is for example from about 0.01 to about 0.99, from about 0.05 to about 0.95 or from about 0.1 to about 0.9.

Other hydrogen storage materials of the invention may also be hydrogenated prior to preparation of an electrochemical device.

Hydrogenation (hydrogenating) is performed for instance under hydrogen gas at a pressure greater than atmospheric. Hydrogen pressure is for instance from about 2 atm to about 20 atm. Hydrogenation may be performed at increased temperature, for instance from about 25° C. to about 500° C. Hydrogenation may be performed electrochemically.

Hydrogen storage materials include carbon and graphitic materials such as natural graphite, artificial graphite, expanded graphite, graphene, carbon fiber, soft carbon, hard carbon, non-graphitizable carbon, carbon black, carbon nanotube, fullerene, activated carbon, crystalline carbon and amorphous carbon.

The hydrogen storage materials may include one or more further elements, for instance one or more further elements selected from the group consisting of structural modifiers (elements to promote the amorphous phase of a material), hydrogen bond strength modifiers and solid electrolyte interface (SEI) modifiers.

Structural modifiers include for example B.

Hyrogen bond modifiers include for example alkaline earth metals, transition metals, rare earth metals and other metals of groups III and V of the periodic table.

SEI modifiers include non-metals such as O, F, P, Cl and the like.

In addition to the hydrogen storage materials, the anode may further include binders and/or conductive materials and/or other additives. The anode assemblies may include these mixtures in adherence to a current collector such as a metal foil substrate.

The binder assists in coupling the hydrogen storage material and the conductive material and the mixture to the current collector. Binders include poly(tetrafluoroethylene) (PTFE), a copolymer of acrylonitrile and butadiene (NBR), polyvinylidene fluoride (PvDF), polyvinyl alcohol, carboxy methyl cellulose (CMC), starch, hydroxy propyl cellulose, regenerated cellulose, polyvinylpyrrolidone, tetrafluoroethylene, polyethylene, polypropylene, ethylene-propylene-diene polymer (EPDM), sulfonated-EPDM, styrene-butadiene rubber (SBR), fluorine rubber, copolymers thereof and mixtures thereof. Binders may be employed from about 1 to about 50 weight %, based on the total weight of electrode assembly.

Conductive materials may be from about 1 to about 20 weight %, based on the total weight of the electrode assembly. Conductive materials include graphitic materials such as natural graphite, artificial graphite, a carbon black such as acetylene black, Ketjen black, channel black, furnace black or lamp black, conductive fibers such as carbon fiber or metal fiber, metal powders such as carbon fluoride, aluminum or nickel powder, conductive metal oxides such as zinc oxide, potassium titanate or titan oxide and other conductive materials such as polyphenylene derivatives.

A filler may be employed as a component for controlling expansion of the anode. Fillers include olefin-based polymers such as polyethylene or polypropylene and fibrous material such as glass fiber or carbon fiber.

The negative electrode may advantageously comprise ≥30% by weight of the one or more group IV elements; for example ≥35%, ≥40%, ≥45%, ≥50%, ≥55%, ≥60%, ≥65%, ≥70%, ≥75%≥80%, ≥85% or ≥90% by weight of the one or more group IV elements, based on the total weight of the negative electrode (total weight of the electrode assembly). The total weight of the negative electrode includes the hydrogen storage material and optional components such as substrate, binders, conductive materials and additives.

A separator is typically interposed between the cathode and the anode which is for instance an insulating thin film ensuring high ion (proton) transmission. The separator generally has a pore size of about 0.01 to about 10 microns and a thickness of about 5 to about 300 microns. Separator materials include sheets or non-woven fabrics comprising materials including glass fiber, cotton, nylon, polyester, polyethylene, polypropylene, polyvinyl chloride, polytetrafluoroethylene and kraft paper.

The active materials of the positive electrode (cathode active materials) participate in the charge/discharge reactions. Suitable active materials include nickel hydroxide active materials, i.e. nickel hydroxide or modified nickel hydroxide.

The cathode materials may comprise a multi-phase disordered nickel hydroxide material having at least one modifier. The at least one modifier is for instance a metal, a metallic oxide, a metallic oxide alloy, a metal hydride and/or a metal hydride alloy. For example, the modifier is one or more components selected from the group consisting of Al, Ba, Ca, F, K, Li, Mg, Na, Sr, Bi, Co, Cr, Cu, Fe, In, $LaH_3$, Mn, Ru, Sb, Sn, $TiH_2$, TiO, and Zn. Such materials are taught in U.S. Pat. No. 5,348,822.

Suitable cathode materials may comprise a disordered multi-phase nickel hydroxide matrix including at least one modifier, for example 3 modifiers, chosen from F, Li, Na, K, Mg, Ba, Ln, Se, Nd, Pr, Y, Co, Zn, Al, Cr, Mn, Fe, Cu, Zn, Sc, Sn, Sb, Te, Bi, Ru and Pb. Suitable cathode materials are taught for example in U.S. Pat. No. 5,637,423.

Cathode materials may comprise nickel hydroxide modified with one or more group II elements and Co in a solid solution state. Such materials are taught in U.S. Pat. No. 5,366,831.

The cathode active materials may comprise nickel hydroxide and one or more components selected from the group consisting of cobalt, cobalt hydroxide and cobalt oxide and a carbon powder. The cathode materials may further comprise a compound of Ca, Sr, Ba, Cu, Ag or Y, for example $Ca(OH)_2$, CaO, $CaF_2$, CaS, $CaSO_4$, $CaSi_2O_5$, $CaC_2O_4$, $CaWO_4$, $SrCO_3$, $Sr(OH)_2$, BaO, $Cu_2O$, $Ag_2O$, $Y_2(CO_3)_3$ or $Y_2O_3$. Suitable cathode materials are taught for instance in U.S. Pat. No. 5,451,475.

Cathode active materials may comprise a metal oxide and one or more of Co, Ca, Ag, Mn, Zn, V, Sb, Cd, Y, Sr, Ba and oxides of Ca, Sr, Ba, Sb, Y or Zn. The metal oxide is for example nickel oxide and or manganese oxide. Such active materials are taught in U.S. Pat. No. 5,455,125.

The cathode materials may contain nickel hydroxide and a further component selected from the group consisting of Y, In, Sb, Ba and Be and Co and/or Ca. Such materials are disclosed in U.S. Pat. No. 5,466,543.

Cathode materials may be prepared by reacting nickel sulfate and ammonium hydroxide to form a nickel ammonium complex; the complex is then reacted with sodium hydroxide to form nickel hydroxide. The method may provide nickel hydroxide comprising one or more of Co, Zn and Cd. These materials are taught in U.S. Pat. No. 5,498,403.

Cathode active materials may comprise nickel hydroxide and cobalt oxyhydroxide as taught in U.S. Pat. No. 5,489,314.

Cathode materials may comprise nickel hydroxide, cobalt monoxide and elemental zinc as taught in U.S. Pat. No. 5,506,070.

The cathode materials may comprise nickel hydroxide, nickel powder, a second powder and at least one of cobalt, cobalt hydroxide and cobalt oxide. The second powder contains one or more of Ca, Sr, Ba, Cu, Ag and Y. Such materials are taught in U.S. Pat. No. 5,571,636.

The cathode active materials may comprise particles of nickel hydroxide or manganese hydroxide having at least partially embedded therein a conductive material. The conductive material may be for instance nickel, nickel alloys, copper, copper alloys; metal oxides, nitrides, carbides, silicides or borides; or carbon (graphite). These materials are disclosed in U.S. Pat. No. 6,177,213.

The cathode materials may comprise nickel hydroxide particles containing at least three modifiers selected from the group consisting of Al, Bi, Ca, Co, Cr, Cu, Fe, In, La, rare earths, Mg, Mn, Ru, Sb, Sn, Ti, Ba, Si, Sr and Zn. For example, nickel hydroxide particles may contain at least four modifiers, for instance, Ca, Co, Mg and Zn. Such materials are disclosed in U.S. Pat. No. 6,228,535.

The active cathode material for instance comprises nickel hydroxide and a carbon material such as graphite. The cathode may also comprise a polymeric binder. The polymeric binder is for example a thermoplastic organic polymer, for instance selected from the group consisting of polyvinyl alcohol (PVA), polyethylene oxide, polypropylene oxide, polybutylene oxide, methyl cellulose, carboxymethyl cellulose, hydroxyethyl cellulose, hydroxypropyl cellulose, hydroxypropylmethyl cellulose, polyethylene, polypropylene, polyisobutylene, polyvinyl chloride, polyvinyliden chloride, polyvinyliden fluoride, polytetrafluoroethylene (PTFE), fluorinated ethylene propylene (FEP), perfluoroalkoxy (PFA), polyvinylacetate, polyvinyl isobutylether, polyacrylonitrile, polymethacrylonitrile, polymethylmethacrylate, polymethylacrylate, polyethylmethacrylate, allyl acetate, polystyrene, polybutadiene, polyisoprene, polyoxymethylene, polyoxyethylene, polycyclic thioether, polydimethylsiloxane, polyesters such as polyethylene terephthalate, polycarbonate and polyamide. Blends and copolymers of the above are also suitable. The polymeric binder may also be an elastomer or rubber such as styrene-butadiene copolymer, styrene-butadiene-styrene block copolymer, styrene-isoprene block copolymer, styrene-isoprene-styrene block copolymer, styrene-ethylene-styrene-butadiene block copolymer, styrene-ethylene-butadiene-styrene block copolymer or styrene-acrylonitrile-butadiene-methyl acrylate copolymer. Suitable active materials are taught for instance in U.S. Pat. No. 6,617,072.

The cathode active material may contain nickel hydroxide and nickel oxyhydroxide as taught in U.S. Pat. No. 7,396,379.

Generally, cathode active material particles are formed in a sintered or pasted electrode. The pasted electrode may be made by mixing the material with various additives and/or binders and applying the paste to a conductive support. Preferably, one or more cobalt additives are added to the pasted electrode. The cobalt additives may include Co and/or CoO to enhance conductivity, improve utilization and reduce electrical resistance of the positive electrode.

Modified nickel hydroxide may contain one or more modifiers such as Co, Cd, Ag, V, Sb, Ca, Mg, Al, Bi, Cr, Cu, Fe, In, rare earths, Mn, Ru, Sn, Ti, Ba, Si, Sr or Zn. A suitable modified nickel hydroxide is $(Ni,Co,Zn)(OH)_2$, for instance in the form of a spherical powder. In modified nickel hydroxides, nickel generally is present at a level of ≥80 atomic percent, for instance ≥90 atomic percent, based on the metals.

According to the present invention, further cathode active materials are possible. Further cathode active materials include transition metals and their oxides, hydroxides, oxide/hydroxides and fluorides. For example, further cathode active materials include Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt and Au and their oxides, hydroxides, oxide/hydroxides and fluorides.

For example, further cathode active materials are selected from the group consisting of
Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;
oxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;
hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;
oxide/hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au and
fluorides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au.

In further cathode active materials selected from the group consisting of metal oxides, metal hydroxides and metal oxide/hydroxides, nickel may be present at a level of ≤5, ≤10, ≤15, ≤20, ≤25, ≤30, ≤35, ≤40, ≤45, ≤50, ≤55, ≤60, ≤65, ≤70, ≤75, ≤80 or ≤85 atomic percent, for instance ≤90 atomic percent, based on the total metals of the metal oxides, metal hydroxides and metal oxide/hydroxides.

The electrolyte composition may be neutral or acidic, having a pH of about 7 or less. Suitable electrolyte compositions are for example taught in copending U.S. patent application Ser. No. 14/540,445, filed Nov. 13, 2014 and Ser. No. 14/669,588, filed Mar. 26, 2015. The electrolyte composition allows for transport of protons.

For instance, the electrolyte compositions have a pH of from about 1, from about 2, from about 3, from about 4, from about 5 or from about 6 to about 7.

Suitable electrolyte compositions contain one or more ionic compounds. The ionic compounds may be protic compounds selected from the group consisting of Bransted acids (protic acids) and protic ammonium compounds or oxonium compounds. Bransted acids for instance have a pKa of less than or equal to about 5.

The ionic compounds may be aprotic compounds selected from the group consisting of ammonium compounds, oxonium compounds, phosphonium compounds and alkali or alkali earth metal compounds.

The ionic compounds contain a cation and an anion.

Alkali metal or alkali earth metal cations include $Li^+$, $Na^+$, $K^+$, $Rb+$, $Cs+$, $Be^{++}$, $Mg^{++}$, $Ca^{++}$, $Sr^{++}$ and $Ba^{++}$.

Ammonium ions are cations of formula $^+NR_1R_2R_3R_4$ where $R_1$, $R_2$, $R_3$ and $R_4$ are selected from hydrogen and hydrocarbyl or two of $R_1$-$R_4$ together are hydrocarbylene or three of $R_1$-$R_4$ together are hydrocarbylene. When one or more of $R_1$-$R_4$ is hydrogen, the ammonium ion is protic. When all four of $R_1$-$R_4$ are hydrocarbyl or hydrocarbylene the ammonium ion is aprotic.

Ammonium ions also include hydrazinium cations of formula $R_1R_2N$—$^+NR_3R_4R_5$, where $R_1$, $R_2$, $R_3$, $R_4$ and $R_5$ are selected from hydrogen and hydrocarbyl or $R_1$ and $R_2$ together and/or two of $R_3$-$R_5$ together are hydrocarbylene.

Ammonium ions also include hydroxylammonium cations of formula HO—$N^+R_1R_2R_3$ where $R_1$, $R_2$ and $R_3$ are selected from hydrogen and hydrocarbyl or two of $R_1$-$R_3$ together are hydrocarbylene.

Oxonium ions are positively charged groups of formula $^+OR_1R_2R_3$ where $R_1$, $R_2$ and $R_3$ are selected from hydrogen and hydrocarbyl or two of $R_1$-$R_3$ together are hydrocarbylene. When one or more of $R_1$-$R_3$ is hydrogen, the oxonium is protic. When all three of $R_1$-$R_3$ are hydrocarbyl or hydrocarbylene, the oxonium is aprotic.

Phosphonium ions are positively charged groups of formula $^+PR_1R_2R_3R_4$ where $R_1$, $R_2$, $R_3$ and $R_4$ are hydrocarbyl or two of $R_1$-$R_4$ together are hydrocarbylene.

Hydrocarbyl is any hydrocarbon based group, bound to the cationic nitrogen, oxygen or phosphorus with a carbon atom. Hydrocarbylene is a ring-forming version of hydrocarbyl.

Hydrocarbyl is for instance alkyl, alkenyl, cycloalkyl, cycloalkenyl, aryl or aralkyl, which may be substituted by one or more groups selected from the group consisting of halogen, hydroxy, $C_1$-$C_4$alkoxy, thio, $C_1$-$C_4$alkylthio, amino, $C_1$-$C_4$alkylamino, di-$C_1$-$C_4$alkylamino, nitro, cyano, —COOH and —COO$^-$. Hydrocarbyl may also be interrupted by one or more groups selected from the group consisting of —O—, —S—, —NH— and —N($C_1$-$C_4$alkyl)-. Hydrocarbyl may be both substituted by one or more of said groups and interrupted by one or more of said groups. For instance alkyl, alkenyl, cycloalkyl, cycloalkenyl, aryl or aralkyl may be substituted by one to three groups selected from the group consisting of chloro, hydroxy, methoxy, ethoxy, propoxy, butoxy, thio, methylthio, methylamino, ethylamino, propylamino, butylamino, dimethylamino, diethylamino, dipropylamino, dibutylamino, —COOH, —COO$^-$, cyano and nitro and/or may be interrupted by one to three groups selected from the group consisting of —O—, —S—, —NH— and —N($C_1$-$C_4$alkyl)-.

Hydrocarbyl also includes polyethylene glycols and polypropylene glycols such as R'(OC$_2$H$_4$)$_n$— or R'(OC$_3$H$_6$)$_n$— where R' is hydrogen or alkyl and n is an integer from 1 to 50, for instance from 1 to 40, 1 to 30 or 1 to 20, for instance from 1 to 10.

When two or three of $R_1$-$R_5$ together are hydrocarbylene, this means together with the N, O or P atom they form a heterocyclic ring. The ring is for example 5- or 6-membered. The heterocyclic ring may contain a further heteroatom and may be saturated or unsaturated. Hydrocarbylene is for instance —(CH$_2$)$_4$—, —(CH$_2$)$_5$—, —(CH$_3$)N—CH═C(CH$_3$)—CH═, ═CH—CH═CH—CH═CH—, ═C(CH$_3$)—C═CH—CH═CH—, ═C—C(CH$_3$)═CH—CH═CH—, ═C—CH═C(CH$_3$)—CH═CH—, —CH=CH—CH=CH—, —CH$_2$=CH—CH$_2$—CH$_2$—, —CH=CH—N=CH—, —CH$_2$CH$_2$NHCH$_2$CH$_2$—, —CH$_2$—CH$_2$—N=CH—, —CH$_2$—CH$_2$—O—CH$_2$—CH$_2$— or =CH—(CH$_2$)$_3$—. The further heteroatom is for example N, O or S.

Examples of ammonium ion rings are piperidinium, pyrrolinium, 2,4-dimethylpyrazolium, pyrrolininium, pyrrolidinium, pyridinium, morpholinium and methylpyridinium. Pyridinium is an example of where three of R$_1$-R$_4$ together form a ring. The hydrocarbylene ring may also be annulated to form for instance quinolinium or isoquinolinium.

Alkyl is for instance from 1 to 25 carbon atoms, is branched or unbranched and includes methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, icosyl and docosyl.

Partly or fully fluorinated means replacement of one, more than one or all of the hydrogens of the alkyl with fluoro. Perfluoroalkyl means all hydrogens of an alkyl are replaced with fluoro (fully fluorinated).

Alkenyl is an unsaturated version of alkyl, for instance allyl.

Cycloalkyl includes cyclopentyl, methylcyclopentyl, dimethylcyclopentyl, cyclohexyl, methylcyclohexyl, dimethylcyclohexyl, trimethylcyclohexyl, tert-butylcyclohexyl, cycloheptyl or cyclooctyl.

Cycloalkenyl is an unsaturated version of cycloalkyl.

Aryl includes phenyl, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

Aralkyl includes benzyl, α-methylbenzyl, α,α-dimethylbenzyl and 2-phenylethyl.

Examples of ammonium ions include protic ions such as NH$_4^+$ (ammonium), methylammonium, ethylammonium, dimethylammonium, diethylammonium, trimethylammonium (NMe$_3$H$^+$), triethylammonium, tributylammonium, diethylmethylammonium, hydroxyethylammonium, methoxymethylammonium, dibutylammonium, methylbutylammonium, anilinium, pyridinium, 2-methylpyridinium, imidazolium, 1-methylimidazolium, 1,2-dimethylimidazolium, imidazolinium, 1-ethylimidazolium, 1-(4-sulfobutyl)-3-methylimidazolium, 1-allylimidazolium, quinolinium, isoquinolinium, pyrrolinium, pyrrolininium and pyrrolidinium. Examples of ammonium ions also include aprotic ions such as 1-butyl-1-methylpyrrolidinium, tetramethylammonium, tetraethylammonium, tetra-n-butylammonium, n-butyl-tri-ethylammonium, benzyl-tri-methylammonium, tri-n-butylmethylammonium, benzyl-tri-ethylammonium, 1-methylpyridinium, 1-butyl-3,5-dimethylpyridinium, 1,2,4-trimethylpyrazolium, trimethylhydroxyethylammonium (choline), tri-(hydroxyethyl)methylammonium, dimethyl-di(polyoxyethylene)ammonium, 1,2,3-trimethylimidazolium, 1-butyl-3-methylimidazolium, 1-ethyl-2,3-dimethylimidazolium, 1-allyl-3-methylimidazolium, 1-hydroxyethyl-3-methylimidazolium, 1,3-dimethylimidazolium, 1-ethyl-1-methylpiperidinium, 4-ethyl-4-methylmorpholinium, 1-(cyanomethyl)-3-methylimidazolium, 1-(3-cyanopropyl)pyridinium, 1,3-bis(cyanomethyl)imidazolium, 1-hexyl-3-methylimidazolium and 1-ethyl-3-methylimidazolium.

Pyrrolinium is the ammonium of pyrrole, pyrrolininium is the ammonium of pyrroline and pyrrolidinium is the ammonium of pyrrolidine. Pyrroline may be 1-, 2- or 3-pyrroline, thus the ammonium cation of 1-, 2- or 3-pyrroline is included.

An example of a hydrazinium ion is hydrazinium (H$_2$NNH$_3^+$).

An example of a hydroxylammonium ion is hydroxylammonium (HO—NH$_3^+$).

Examples of protic oxonium ions include H$_3$O$^+$ (hydronium), H$^+$O(Et)$_2$, H$_2$EtO$^+$, H$_2$MeO$^+$, H$^+$O(Me)$_2$, protonated THF and protonated 2-methyl-THF.

Examples of aprotic oxonium ions include $^+$O(Me)$_3$, $^+$O(Et)$_3$ and methylated or ethylated THF or 2-methyl-THF.

Me is methyl, Et is ethyl, nBu is n-butyl, tBu (or t-butyl) is tert-butyl and THF is tetrahydrofuran. Without designation, butyl means n-butyl.

Examples of phosphonium ions include methyltriphenylphosphonium, tetraphenylphosphonium, tetrabutylphosphonium, tributylmethylphosphonium, triethylmethylphosphonium, trihexyltetradecylphosphonium, triphenylpropylphosphonium and tetrakis(hydroxymethyl)phosphonium.

Examples of suitable anions are hydroxide, nitrate, perchlorate, bifluoride, alkoxides, halides, phosphates, phosphinates, phosphonates, borates, carboxylates, sulfites, sulfates, sulfonates, carbonates, imides, aluminates, cyanates, methides, arsenates, silicates and antimonates.

Anions, cations and ionic compounds may be those disclosed for instance in U.S. Pat. No. 6,254,797 and U.S. Pub. No. 2011/0045359. Bifluoride is HF$_2^-$. Alkoxides are RO$^-$ where R is hydrocarbyl, for example methoxide, ethoxide, n-propoxide, i-propoxide, n-butoxide, t-butoxide or phenoxide. Alkoxides also include where R is perfluoroalkyl. Halide is chloride, bromide, iodide or fluoride. Phosphates include dihydrogen phosphate, hydrogen phosphate, alkyl phosphate, dialkyl phosphate, phosphate, PF$_6^-$ (hexafluorophosphate), HPO$_3$F$^-$ (fluorohydrogen phosphate), trisoxalatophosphate (TOP), tetrafluorooxalatophosphate (TFOP) and fluoro(perfluoroalkyl)phosphates such as F$_2$P(C$_2$F$_5$)$_4^-$, F$_3$P(C$_2$F$_5$)$_3^-$ (tris(pentafluoroethyl)trifluorophosphate or FAP), F$_4$P(C$_2$F$_5$)$_2^-$, F$_2$P(C$_3$F$_7$)$_4^-$, F$_3$P(C$_3$F$_7$)$_3^-$, F$_4$P(C$_3$F$_7$)$_2^-$, F$_2$P(C$_4$F$_9$)$_4^-$, F$_3$P(C$_4$F$_9$)$_3^-$ and F$_4$P(C$_4$F$_9$)$_2^-$. Phosphinates are for instance hydrogen alkyl phosphinate, dialkyl phosphinate, hydrogen aryl phosphinate or diaryl phosphinate. For instance bis(2,4-trimethylphenyl)phosphinate. Phosphonates are for instance alkylphosphonate such as methylphosphonate or hydrogenphosphonate (phosphonate). Borates include orthoborate, tetrahydroxyborate, tetraborate, tetraphenylborate, [B(3,5-(CF$_3$)$_2$C$_6$H$_3$)$_4$]$^-$ (BARF), B(C$_2$O$_4$)$_2^-$ (bis(oxalato)borate) (BOB), difluoro(oxalato)borate (dFOB), di(trifluoroacetato)oxalatoborate (D(Ac)OB), B(C$_6$F$_5$)$_4^-$ and BF$_4^-$ (tetrafluoroborate). Carboxylate anions are of formula RCOO$^-$ where R is hydrogen or hydrocarbyl and include formate, acetate (ethanoate), propanoate, n-butanoate, i-butanoate, n-pentanoate, i-pentanoate, octanoate, decanoate, benzoate, salicylate, thiosalicylate, 2-, 3- or 4-nitrobenzoate; citrate, oxalate, tartrate, glycolate, gluconate, malate, mandelate, a carboxylate of nitrilotriacetic acid, a carboxylate of N-(2-hydroxyethyl)-ethylenediaminetriacetic acid, a carboxylate of ethylenediaminetetraacetic acid, a carboxylate of diethylenetriaminepentaacetic acid and haloalkylcarboxylates such as fluoroacetate, difluoroacetate, trifluoroacetate, chloroacetate, dichloroacetate and trichloroacetate. Sulfites include sulfite and hydrogensulfite. Sulfates include hydrogensulfate, sulfate, thiosulfate and alkylsulfates such as methylsulfate and ethylsulfate. Sulfonates include alkyl, arylsulfonates and perfluoroalkylsulfonates, for instance trifluoromethanesulfonate (triflate), p-toluenesulfonate (tosylate) or methanesulfonate (mesylate). Carbonate anions are for instance carbonate, hydrogencarbonate or an alkylcarbonate such as methylcarbonate, ethylcarbonate or butylcarbonate. Imide anions include dicyanamide, $N(SO_2F)_2^-$ ((bisfluorosulfonyl)imide), bis(perfluoroalkylsulfonyl)imides such as $[N(SO_2CF_3)_2]^-$ (bistriflimide), bis(pentafluoroethylsulfonyl)imide and $N(CF_3SO_2)(CF_3(CF_2)_3SO_2)^-$ and (perfluoroalkylsulfonyl)(perfluoroalkylcarboxyl)imides.

Aluminates include $Al(OC(CF_3)_3)_4^-$, di(trifluoroacetato)oxalatoaluminate (d(Ac)OAl), tetrachloroaluminate, tetrafluoroaluminate, tetraiodoaluminate and tetrabromoaluminate. Cyanates include thiocyanate and cyanate. Methides include tris(perfluoroalkylsulfonyl)methides such as tris(trifluoromethylsulfonyl)methide, $C(CF_3SO_2)_3^-$. Arsenates include arsenate, hydrogen arsenate, dihydrogen arsenate and $AsF_6^-$. Silicates include $SiF_6^{-2}$. Antimonates include $SbF_6^-$ and $Sb(OH)_6^-$.

For example, the protic ionic compound is $H_3PO_4$, $NH_4SO_3CF_3$, $NH_4BF_4$, $NH_4OH$, $NH_4Cl$, $NH_4Br$, $NH_4I$, $NH_4F$, $NH_4H_2PO_4$, $(NH_4)_2HPO_4$, methylammonium phosphonate, pyridinium tosylate, pyridinium chloride, anilinium chloride, hydroxylammonium chloride, $(NH_4)_2SO_4$, hydrazinium sulfate $(N_2H_6SO_4)$, $(NH_4)HSO_4$, $NaHSO_4$, $NH_4BF_4$, $H_2SO_4$, $KH_2PO_4$, $K_2HPO_4$, $NaH_2PO_4$, $Na_2HPO_4$, $HBF_4$, $H(OEt_2)BF_4$, $HPF_6$, $HAsF_6$, $HClO_4$, $HSO_3CF_3$, $H[N(SO_2CF_3)_2]$ or $H[N(SO_2CF_2CF_3)_2]$.

The protic ionic compound may also be an oxonium ion of a highly non-coordinating ion such as Brookhart's acid (BARF acid), $[H(OEt_2)_2][B[3,5-(CF_3)_2C_6H_3]_4]$. Other examples include $[H(OEt_2)_2][B(C_6F_5)_4]$ (oxonium acid) and $[H(OEt_2)_2][Al(OC(CF_3)_3)_4]$. In these cases the cation is protonated diethyl ether (diethyl ether oxonium). Alternatively, the cation may be other protonated ethers, for instance protonated tetrahydrofuran (THF).

The protic ionic compound may be a protic ionic liquid such as ethylammonium nitrate, diethylmethylammonium trifluoromethanesulfonate (DEMA TfO), triethylammonium methanesulfonate, 2-methylpyridinium trifluoromethanesulfonate, ammonium fluoride, methylammonium nitrate, hydroxyethylammonium nitrate, ethylammonium nitrate, dimethylammonium nitrate, 1-methylimidazolium nitrate, 1-ethylimidazolium nitrate, t-butylammonium tetrafluoroborate, hydroxyethylammonium tetrafluoroborate, methylbutylammonium tetrafluoroborate, triethylammonium tetrafluoroborate, imidazolium tetrafluoroborate, 1-methylimidazolium tetrafluoroborate, 1,2-dimethylimidazolium tetrafluoroborate, t-butylammonium triflate, 2-fluoropyridinium triflate, hydroxyethylammonium triflate, 1,2-dimethylimidazolium triflate, imidazolium triflate, 1-methylimidazolium hydrogensulfate, 1-methylimidazolium chloride, 1-methylimidazolium triflate, hydronium triflate, methylammonium mesylate, ethylammonium mesylate, butylammonium mesylate, methoxyethylammonium mesylate, dimethylammonium mesylate, dibutylammonium mesylate, triethylammonium mesylate, dimethylethylammonium mesylate, hydronium hydrogensulfate, ammonium hydrogensulfate, methylammonium hydrogensulfate, ethylammonium hydrogensulfate, propylammonium hydrogensulfate, n-butylammonium hydrogensulfate, t-butylammonium hydrogensulfate, dimethylammonium hydrogensulfate, diethylammonium hydrogensulfate, di-n-butylammonium hydrogensulfate, methylbutylammonium hydrogensulfate, ethylbutylammonium hydrogensulfate, trimethylammonium hydrogensulfate, triethylammonium hydrogensulfate, tributylammonium hydrogensulfate, dimethylethylammonium hydrogensulfate, dibutylammonium fluorohydrogen phosphate, triethylammonium fluorohydrogen phosphate, tributylammonium fluorohydrogen phosphate, hydronium dihydrogen phosphate, methylammonium dihydrogen phosphate, ethylammonium dihydrogen phosphate, propylammonium dihydrogen phosphate, n-butylammonum dihydrogen phosphate, methoxyethylammonium dihydrogen phosphate, dimethylammonium dihydrogen phosphate, dibutylammonium dihydrogen phosphate, methylbutylammonium dihydrogen phosphate, ammonium bifluoride, methylammonium bifluoride, ethylammonium bifluoride or dimethylammonium bifluoride.

Carboxylic acids are protic acids/protic compounds. Carboxylic acids are of formula RCOOH where R is hydrogen or hydrocarbyl. Carboxylic acids contain carboxylate anions. Carboxylic acids include formic acid, acetic acid, acrylic acid, fluoroacetic acid, difluoroacetic acid, trifluoroacetic acid, chloroacetic acid, dichloroacetic acid, trichloroacetic acid, propanoic acid, butyric acid, 3-methylbutanoic acid, valeric acid, hexanoic acid, heptanoic acid, caprylic acid, nonanoic acid, benzoic acid, salicylic acid, 2-, 3- or 4-nitrobenzoic acid; citric acid, oxalic acid, tartaric acid, glycolic acid, gluconic acid, malic acid, mandelic acid, nitrilotriacetic acid, N-(2-hydroxyethyl)-ethylenediaminetriacetic acid, ethylenediaminetetraacetic acid and diethyleneaminepentaacetic acid.

For example, the aprotic ionic compound is $NMe_4^+SO_3CF_3^-$, $NMe_4OH$, $NEt_4^+BF_4^-$, $NMe_4^+Cl^-$, $NEt_4^+Br^-$, $NnBu_4^+I^-$, $NnBu_4^+F^-$, $NEt_4^+H_2PO_4^-$, $(NMe_4)_2HPO_4$, methyltriphenyl phosphonium iodide, tetrakis(hydroxymethyl) phosphonium chloride, tetraphenylphosphonium bromide, 1-methylpyridinium chloride, benzalkonium chloride, $Me_3OBF_4$, $Et_3OBF_4$, $NEt_4PF_6$, $NMe_4AsF_6$, $NMe_4ClO_4$, $NEt_4SO_3CF_3$, $NMe_4[N(SO_2CF_3)_2]$ or $NEt_4[N(SO_2CF_2CF_3)_2]$.

The aprotic ionic compound may also include a highly non-coordinating anion such as BARF, for instance sodium BARF, $Na^+B[3,5-(CF_3)_2C_6H_3]_4^-$. Other examples include $K^+B(C_6F_5)_4^-$ and $K^+Al(OC(CF_3)_3)_4^-$.

The aprotic ionic compound may be an aprotic ionic liquid such as tri-n-butylmethylammonium methylsulfate, 1-ethyl-2,3-dimethylimidazolium ethylsulfate, 1-butyl-3-methylimidazolium thiocyanate, 1-butyl-3-methylimidazolium tetrachloroaluminate, 1-butyl-3-methylimidazolium methylsulfate, 1-butyl-3-methylimidazolium methanesulfonate, 1-butyl-3-methylimidazolium hydrogencarbonate, 1-butyl-3-methylimidazolium hydrogensulfate, 1-butyl-3-methylimidazolium chloride, 1,2,3-trimethylimidazolium methylsulfate, tris-(hydroxyethyl)methylammonium methylsulfate, 1,2,4-trimethylpyrazolium methylsulfate, 1,3-dimethylimidazolium hydrogencarbonate, 1-ethyl-3-methylimidazolium hydrogencarbonate, 1-ethyl-3-methylimidazolium chloride, 1-ethyl-3-methylimidazolium tetrachloroaluminate, 1-ethyl-3-methylimidazolium thiocyanate, 1-ethyl-3-methylimidazolium methanesulfonate, 1-ethyl-3-methylimidazolium hydrogensulfate, 1-ethyl-3-methylimidazolium ethylsulfate, 1-ethyl-3-methylimidazolium nitrate, 1-butylpyridinium chloride, 1-ethyl-3-methylimidazolium dicyanamide, 1-ethyl-3-methylimidazolium tetrafluoroborate, 1-ethyl-3-methylimidazolium hexafluorophosphate, 1-butyl-3,5-dimethylpyridinium bromide, 1-ethyl-3-methylimidazolium bis(trifluoromethylsulfonyl) imide, 1-ethyl-3-methylimidazolium bis(pentafluoroethylsulfonyl)imide, 1-ethyl-2,3-dimethylimidazolium methylcarbonate, carboxymethyl-tributylphosphonium bis (trifluoromethylsulfonyl)imide, N-carboxyethylmethylpyrrolidinium bis(trifluoromethylsulfonyl)imide, N-carboxymethyl-trimethylammonium bis(trifluoromethylsulfonyl)imide, N-carboxymethyl-methylpyridinium bis(trifluoromethylsulfonyl)imide, hexyltrimethylammonium bis(trifluromethylsulfonyl)imide, tetrabutylphosphonium methanesulfonate, triethylmethylammonium methylcarbonate, 1-ethyl-1-methylpiperidinium methylcarbonate, 4-ethyl-4-methylmorpholinium methylcarbonate, 1-butyl-1-methylpyrrolidinium methylcarbonate, triethylmethylammonium dibutylphosphate, tributylmethylphosphonium dibutylphosphate, triethylmethylphosphonium dibutylphosphate, tetrabutylphosphonium tetrafluoroborate, tetrabutylphosphonium p-toluenesulfonate, tributylmethylphosphonium methylcarbonate, 1-ethyl-3-methylimidazolium hydrogencarbonate, tributylmethylammonium methylcarbonate, tributylmethylammonium dibutylphosphate, 1-ethyl-3-methylimidazolium dibutylphosphate, 1-butyl-3-methylimidazolium dibutylphosphate, 1-(cyanomethyl)-3-methylimidazolium chloride, 1-(3-cyanopropyl)-3-methylimidazolium chloride, 1-(3-cyanopropyl)-3-methylimidazolium bis(trifluoromethylsulfonyl)imide, 1-(3-cyanopropyl)-3-methylimidazolium dicyanamide, 1-(3-cyanopropyl)pyridinium chloride, 1-(3-cyanopropyl)pyridinium bis(trifluoromethylsulfonyl)imide, 1,3-bis(cyanomethyl)imidazolium chloride, 1,3-bis(cyanomethyl)imidazolium bis(trifluoromethylsulfonyl)imide, 1,3-bis(cyanopropyl)imidazolium chloride, 1,3-bis(3-cyanopropyl)imidazolium bis(trifluoromethylsulfonyl)imide, 1-butyl-3-methylimidazolium hexafluorophosphate, 1-butyl-3-methylimidazolium tetrafluoroborate, 1-ethyl-3-methylimidazolium tetrafluoroborate, 1-ethyl-3-methylimidazolium chloride, 1-ethyl-3-methylimidazolium bromide, 1-butyl-3-methylimidazolium bromide, 1-hexyl-3-methylimidazolium chloride, tributylmethylphosphonium methylsulfate, triethylmethylphosphonium dibutylphosphate, trihexyltetradecylphosphonium bis(trifluromethylsulfonyl)imide, trihexyltetradecylphosphonium bis(2,4,4-trimethylphenyl)phosphinate, trihexyltetradecylphosphonium bromide, trihexyltetradecylphosphonium chloride, trihexyltetradecylphosphonium decanoate, trihexyltetradecylphosphonium dicyanamide, 3-(triphenylphosphonio)propane-1-sulfonate or 3-(triphenylphosphonio)propane-1-sulfonic acid tosylate.

Examples of carboxylate compounds are tetramethylammonium benzoate, tetraethylammonium oxalate, tetrabutylammonium tartrate, sodium tartrate, potassium formate, tetramethylammonium acetate, 1-methylpyridinium chloride, trimethylammonium citrate tri-basic, tetramethylammonium 2-, 3- or 4-nitrobenzoate, ammonium benzoate, ammonium salicylate, ammonium oxalate, ammonium tartrate, methyltriphenyl phosphonium acetate, tetrakis(hydroxymethyl)phosphonium benzoate, tetrakis(hydroxymethyl)phosphonium formate, mono- or di-potassium tartrate, ammonium citrate mono-, di- or tri-basic; ammonium 2-nitrobenzoate, ammonium 3-nitrobenzoate, ammonium 4-nitrobenzoate, potassium trifluoroacetate and potassium chloroacetate.

In polybasic carboxylic acids, ammonium and/or alkali metal and/or alkali earth metal ions may replace one or any number of the acidic hydrogens to form a present carboxylate compound. For instance included are the mono-, di- and tri-basic ammonium citrates and mono-, di- and tri-basic sodium citrates.

Ionic liquids are ionic compounds that exhibit a melting point of ≤100° C.

Otherwise, the ionic compound is "a salt" with a melting point >100° C.

Ionic liquids generally are ammonium or phosphonium compounds, that is containing ammonium or phosphonium cations.

Salts include halide salts such as alkali or alkali earth metal halide salts such as NaCl, KCl or KBr as well as other ionic compounds with melting points above 100° C. Alkali and alkali earth metal salts include for instance anions selected from the group consisting of nitrate, perchlorate, bifluoride, halides, phosphates, phosphinates, phosphonates, borates, carboxylates, sulfites, sulfates, sulfonates, carbonates, imides, aluminates, cyanates, methides, arsenates, silicates and antimonates.

The present ionic compounds may contain the cation and anion together in the same molecule. Thus, also included are zwitterionic compounds (inner salts) such as betaines. Included are zwitterions containing ammonium or phosphonium ions and sulfonate or sulfate ions. Included are hydroxysultaines, 4-(triphenylphosphonio)butane-1-sulfonate, methyl N-(triethylammoniosulfonyl)carbamate (Burgess reagent) and phosphonium sulfate zwitterions as taught for instance in U.S. Pat. No. 3,471,544. Included is sulfamic acid.

Advantageously, two or more different ionic compounds are employed in the electrolyte composition. For instance, the two different ionic compounds may be a protic ionic compound and an aprotic ionic compound or may be an ionic liquid and a salt.

For instance, present electrolyte compositions may comprise at least two different ionic liquids. The electrolyte composition may comprise one or more ionic liquids and one or more salts, for example a protic or aprotic ammonium salt or an alkali metal salt such as an alkai metal halide.

The electrolyte composition may contain a mixture of a carboxylate compound and a carboxylic acid. The electrolyte composition may contain a mixture of a carboxylate-containing ionic liquid and a carboxylic acid. The electrolyte composition may contain two different carboxylic acids.

The electrolyte composition may contain a protic acid, protic ammonium compound or a protic oxonium compound and an ionic liquid.

Where at least two different ionic compounds are present, the weight:weight ratio of the two different ionic compounds is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

In the two different ionic compounds, the cations or the anions may be identical.

The electrolyte compositions advantageously contain an ionic liquid. Cations of ionic liquids include ammonium and phosphonium ions discussed above. Ionic liquids may contain a cation selected from the group consisting of formulae (a)-(h)

(a)

(b)

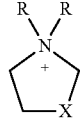

(c)

-continued

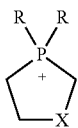

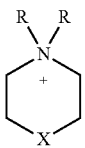

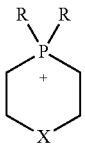

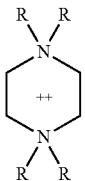

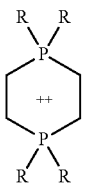

where
each R is independently H, $C_1$-$C_{16}$alkyl or hydroxy$C_1$-$C_{16}$alkyl, for instance methyl, ethyl, hydroxyethyl or propyl and
X is $CH_2$, O, S or NR where R is H or $C_1$-$C_{16}$alkyl, for instance H, methyl, ethyl or propyl.

For instance, suitable cations of ionic liquids include 1-ethyl-3-methylimidazolium, 1-hexyl-3-methylimidazolium, 1-butyl-1-methylpyrrolidinium and trihexyl(tetradecyl)phosphonium. Anions of ionic liquids include carboxylates, imides, methides, nitrate, bifluoride, halides, borates, phosphates, phosphinates, phosphonates, sulfonates, sulfates, carbonates and aluminates.

The ionic liquids may contain an anion selected from the group consisting of $[F_zB(C_mF_{2m+1})_{4-z}]^-$, $[F_yP(C_mF_{2m+1})_{6-y}]^-$, $[(C_mF_{2m+1})_2P(O)O]^-$, $[C_mF_{2m+1}P(O)O_2]^{2-}$, $[O-C(O)-C_mF_{2m+1}]^-$, $[O-S(O)_2-C_mF_{2m+1}]^-$, $[N(C(O)-C_mF_{2m+1})_2]^-$, $[N(S(O)_2-C_mF_{2m+1})_2]^-$, $[N(C(O)-C_mF_{2m+1})(S(O)_2-C_mF_{2m+1})]^-$, $[N(C(O)-C_mF_{2m+1})(C(O)F)]^-$, $[N(S(O)_2-C_mF_{2m+1})(S(O)_2F)]^-$, $[N(S(O)_2F)_2]^-$, $[C(C(O)-C_mF_{2m+1})_3]^-$, $[C(S(O)_2-C_mF_{2m+1})_3]^-$,

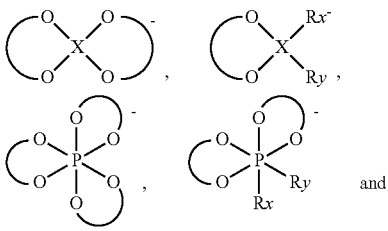

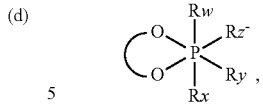

(e) where
y is an integer of 1 to 6,
m is an integer of 1 to 8, for instance 1 to 4,
z is an integer of 1 to 4,
X is B or Al and
$R_w$, $R_x$, $R_y$ and $R_z$ are independently halogen, $C_1$-$C_{20}$alkyl, $C_1$-$C_{20}$alkyl which is partly or fully fluorinated, $C_1$-$C_{20}$alkoxy, $C_1$-$C_{20}$alkoxy which is partly or fully fluorinated, $C_1$-$C_{20}$alkyl-COO or $C_1$-$C_{20}$alkyl-COO which is partly or fully fluorinated and (g) 

is independently a bidentate group derived from the —OH groups of a 1,2- or 1,3-diol, a 1,2- or 1,3-dicarboxylic acid or from a 1,2- or 1,3-hydroxycarboxylic acid and where any one $CF_2$ group may be replaced by O, $S(O)_2$, NR or $CH_2$.

(h) The anions of ionic liquids may include $F_2P(C_2F_5)_4^-$, $F_3P(C_2F_5)_3^-$, $F_4P(C_2F_5)_2^-$, $F_2P(C_3F_7)_4^-$, $F_3P(C_3F_7)_3^-$, $F_4P(C_3F_7)_2^-$, $F_2P(C_4F_9)_4^-$, $F_3P(C_4F_9)_3^-$, $F_4P(C_4F_9)_2^-$, perfluoroalkylcarboxylate, perfluoroalkylsulfonate, bis(perfluoroalkylsulfonyl)imide, (perfluoroalkylsulfonyl)(perfluoroalkylcarboxyl)imide, tris(perfluoroalkylsulfonyl)methide, trifluoroacetate, trifluoromethanesulfonate (triflate), bis(trifluoromethylsulfonyl)imide, tris(trifluoromethylsulfonyl)methide, tetrafluoroborate, spiro-oxo borates and spiro-oxo phosphates, for example bisoxalatoborate (BOB), difluorooxalatoborate (dFOB), di(trifluoroacetato)oxalatoborate (d(Ac)OB), trisoxalatophosphate, tetrafluorooxalatophosphate and di(trifluoroacetato)oxalatoaluminate.

The electrolyte composition may be "non-aqueous", containing essentially no inadvertent water, for instance ≤1000 ppm, ≤100 ppm or ≤10 ppm by weight water, based on the total weight of the electrolyte composition.

The electrolyte compositions may advantageously be "anhydrous", that is, containing little or no water. The electrolyte compositions may contain ≤10 ppm water, for instance ≤9, ≤8, ≤7, ≤6, ≤5 or ≤4 ppm water by weight, based on the total weight of the electrolyte composition.

The electrolyte composition may advantageously contain a solvent. Alternatively, the electrolyte composition may contain no solvent. For instance, solvents are not required when one or more ionic liquids are employed in the electrolyte composition. "No solvent" means no organic solvent is present and essentially no inadvertent water is present.

Where a solvent is present in the electrolyte composition, the weight:weight ratio of ionic compounds in total to solvent may be from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

The present electrolyte compositions may not be limited by the hydrogen and oxygen evolution potential of water. Thus, the electrochemical cells disclosed may exhibit a nominal open-circuit voltage of >1.2 V (volts). The present cells may supply a nominal open-circuit voltage up to about 6 V. For instance, present cells may exhibit a nominal open-circuit voltage of from about 1.2 to about 6.0 V, from about 1.3 to about 6.0 V, from about 1.4 to about 6.0 V or from about 1.5 to about 6.0 V. For instance, present cells may exhibit a nominal open-circuit voltage of about 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9 or about 6.0 V.

Solvents are water and organic solvents.

The solvent may consist essentially of water or may consist essentially of organic solvent. The solvent may contain varying ratios of water:organic solvent.

When the solvent consists essentially of organic solvent, water may only be present at very low levels, for example ≤1000 ppm, ≤100 ppm or ≤10 ppm by weight water, based on the total weight of the electrolyte composition. When the solvent consists essentially of water, organic solvents may only be present at the same low levels.

For example the solvent may be a water/organic solvent mixture where the weight:weight ratio of water to organic solvent is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

The electrolyte composition may contain organic solvent and no water. The electrolyte composition may contain water and no organic solvent.

Suitable organic solvents are for instance selected from the group consisting of organic carbonates, ethers, glymes, ortho esters, polyalkylene glycols, esters, lactones, glycols, formates, sulfones, sulfoxides, amides, alcohols, ketones, nitro solvents, nitrile solvents and combinations thereof.

Organic carbonates are cyclic or acyclic and include ethylene carbonate (EC), propylene carbonate (PC), trimethylene carbonate, 1,2-butylene carbonate (BC), dimethyl carbonate (DMC), diethyl carbonate (DEC), ethylmethyl carbonate (EMC), vinylene carbonate, difluoroethylene carbonate and monofluoroethylene carbonate.

Ethers and glymes include dimethoxymethane (DMM), diethoxymethane, 1,2-dimethoxyethane (DME or ethyleneglycol dimethylether or glyme), diglyme, triglyme, tetraglyme, ethyleneglycol diethylether (DEE), ethyleneglycol dibutylether, diethyleneglycol diethylether, tetrahydrofuran (THF), 2-methyltetrahydrofuran (2-MeTHF), 1,3-dioxane, 1,3-dioxolane (DIOX), 4-methyl-1,3-dioxolane (4-MeDIOX), 2-methyl-1,3-dioxolane (2-MeDIOX), 1,4-dioxane, dimethylether, ethylmethylether, diethylether, di-n-butylether, di-t-butylether, di-isopropylether, methyl-t-butylether, ethyl-t-butylether and t-amyl-methylether.

Ortho esters include trimethoxymethane, triethoxymethane, 1,4-dimethyl-3,5,8-trioxabicyclo[2.2.2]octane and 4-ethyl-1-methyl-3,5,8-trioxabicyclo[2.2.2]octane.

Polyalkylene glycols are homo- or cooligomers or homo- or copolymers of $C_1$-$C_4$alkylene glycols. For instance, polyethylene glycol (PEG) or monomethyl, dimethyl or diethyl (end-capped) polyethylene glycol. Weight average molecular weights (Mw) of polyalkylene glycols are for example from about 200 to about 1200 g/mol, from about 200 to about 1000 g/mol, from about 200 to about 900 g/mol, from about 200 to about 700 g/mol or from about 200 to about 500 g/mol. Included are oligomers of 4 monomers and more, for instance tetraethylene glycol, fluorinated tetraethylene glycol and tetrapropylene glycol. For instance PEG 200, PEG 300, PEG 400, PEG 500, PEG 600, PEG 700, PEG 800, PEG 900 or PEG 1000.

Esters and lactones include γ-butyrolactone (GBL), γ-valerolactone, δ-valerolactone, ethyl acetate (EA), 2-methoxyethyl acetate, 2-ethoxyethyl acetate, 2-butoxyethyl acetate, 2-(2-butoxyethoxy)ethyl acetate (diethylene glycol butyl ether acetate, DBA), ethylene glycol diacetate (EGDA), 3-ethoxy ethyl propionate (EEP), methyl butyrate (MB), n-amyl acetate (NAAC), propylene glycol methyl ether acetate (PMA), ethyl butryate (EB), diethyl malonate, dimethyl malonate and dibasic ester mixture (DBE).

Dibasic ester mixture includes for instance methyl esters of adipic, glutaric and succinic acids.

Glycols include ethylene glycol, propylene glycol, 2-methoxyethanol, 2-ethoxyethanol, 2-propoxyethanol, 2-isopropoxyethanol, 2-butoxyethanol (ethylene glycol butyl ether, EB), 2-phenoxyethanol, 2-benzyloxyethanol, 2-(2-methoxyethoxy)ethanol, 2-(2-ethoxyethoxy)ethanol, 2-(2-butoxyethoxy)ethanol (diethylene glycol butyl ether, DB), propylene glycol butyl ether (PB), propylene glycol methyl ether (PM), triethylene glycol (TEG), dipropylene glycol methyl ether (DPM), diethylene glycol methyl ether, 1,3-butanediol, 1,4-butanediol, 1,5-pentanediol, perfluoro-1,4-butanediol, perfluoro-1,5-butanediol, fluorinated diethylene glycol methyl ether, fluorinated triethylene glycol, fluorinated triethylene glycol methyl ether and fluorinated diethylene glycol butyl ether.

Formates include methyl formate, ethyl formate, isobutyl formate and tert-butyl formate.

Sulfones and sulfoxides include methylsulfonylmethane (MSM or dimethylsulfone), ethylmethylsulfone, sulfolane and dimethylsulfoxide (DMSO).

Amides include dimethylformamide (DMF), dimethylacetamide (DMA), N-methylpyrrolidone (NMP), 2-pyrrolidone, 1,3-dimethyl-2-imidazolidinone (DMI), hexamethylphosphoramide (HMPA) and N,N'-dimethyl-N,N'-trimethyleneurea (1,3-dimethyl-3,4,5,6-tetrahydro-2(1H)-pyrimidinone (DMPU)).

Alcohols include for example benzylalcohol (BA), ethanol, trifluoroethanol (2,2,2-trifluoroethanol), methanol, isopropanol, t-butanol and n-butanol.

Ketones include for example methylethylketone (MEK) and methyl-isoamylketone (MIAK).

Nitro solvents include nitrobenzene, nitromethane and nitroethane.

Nitrile solvents include acetonitrile, propionitrile, butyronitrile and adiponitrile.

Advantageously, a mixture of solvents is employed, for instance a mixture of organic carbonates or a mixture of one or more organic carbonates and one or more ether or glyme.

Other organic solvents may be employed, for instance common non-polar organic solvents including toluene, hexane, heptane and the like.

The electrolyte composition may advantageously comprise an ionic liquid and a protic acid and/or an organic solvent.

Present electrolyte compositions are for instance liquid at room temperature (25° C.). Liquid includes syrupy high viscosity liquids. For example, the electrolyte compositions have a viscosity of from about 0.2 cP to about 100 cP at 25° C. For example the electrolyte compositions have a viscosity of ≤100 cP, ≤90 cP, ≤80 cP, ≤70 cP, ≤50 cP, ≤40 cP, ≤30 cP, ≤20 cP, ≤10 cP or ≤5 cP at 25° C.

Viscosity may be measured for instance with a rotational rheometer or with a microviscometer employing a rolling steel ball in a glass capillary timed and calibrated against control liquids. Viscosity may also be measured with a DVI or DVII Brookfield viscometer, a plate viscometer or an oscillating type viscometer.

The electrolyte composition may further comprise one or more additives selected from the group consisting of corrosion inhibitors, solid electrolyte interface (SEI) improvers, proton evolution improvers, self-discharge inhibitors, antigassing agents, viscosity adjusting agents, cathode protection agents, salt stabilizers, conductivity improvers and solvating agents.

For instance, the electrolyte composition may contain one or more additives selected from the group consisting of fluorinated oil, sodium stannate, sodium citrate or polyacrylic acids;

HF or KF, oxides or hydroxides of rare earths such as Y, metal porphines, for example Ni or Fe porphine, vinylene carbonate, vinylethylene carbonate, methylene ethylene carbonate or fluoro-ethylene carbonate;

polyglycols, polyglycol alkyl ethers, polyglycol alkyl phosphate esters or polysorbates such as polyethylene glycol (PEG), polypropylene glycol, polysorbate 20, polysorbate 40 or polysorbate 80 or a mixture of PEG 600 and polysorbate 20 or a mixture of PEG 600 and ZnO;

phosphate ester-based surfactants, propane sultone or fluoropropane sultone; and

DMSO;

for example at a level of from about 0.1% to about 15% by weight, based on the total weight of the electrolyte composition.

Group IV elements, for example silicon with a molecular weight of 28 g/mol, are much lighter than conventional metal hydride alloys. Typical $AB_2$ and $AB_5$ alloys have a molecular weight of about 70 g/mol. The present electrochemical cells have a higher gravimetric energy density and/or higher volumetric energy density than conventional metal hydride batteries.

Present rechargeable cells may exhibit a gravimetric energy density of >100 Wh/kg. For instance, the gravimetric energy density is ≥110 Wh/kg, ≥115, ≥120, ≥125, ≥130, ≥135, ≥140, ≥145, ≥150, ≥155, ≥160, ≥165, ≥170, ≥175, ≥180, ≥185, ≥190, ≥195 or ≥200 Wh/kg.

Present rechargeable cells may exhibit a volumetric energy density of >250 Wh/L, for instance, the volumetric energy density is ≥260 Wh/kg, ≥265, ≥270, ≥275, ≥280, ≥285, ≥290, ≥295, ≥300, ≥305, ≥310, ≥315, ≥320, ≥325, ≥330, ≥335, ≥340, ≥345 or ≥350 Wh/kg.

Present anodes may exhibit a discharge capacity of ≥800 mAh/g over 20 cycles or more (over at least 20 cycles), for example ≥810, ≥820, ≥825, ≥830, ≥835, ≥840, ≥845, ≥850, ≥855, ≥860, ≥865, ≥870, ≥875, ≥880 or ≥895 mAh/g over 20 cycles or more; based on the weight of the hydrogen storage material.

"Negative electrode for electrochemical uses", "electrochemical cells" and "electrochemical devices" means as an electrode for solid hydrogen storage media devices, batteries, fuel cells, air battery systems and the like.

U.S. patents, U.S. published patent applications and U.S. patent applications discussed herein are each hereby incorporated by reference.

The articles "a" and "an" are used herein to refer to one or to more than one (i.e., to at least one) of the grammatical object of the article. By way of example, "an ionic liquid" means one ionic liquid or more than one ionic liquid.

Any ranges cited herein are inclusive.

The terms "substantially" and "about" used throughout this specification are used to describe and account for small fluctuations. For example, they can refer to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

All measurements herein are performed at ambient conditions, 25° C. and 1 atm of pressure, unless otherwise indicated.

BRIEF DESCRIPTION OF THE DRAWINGS

FIG. 1 shows electrochemical performance of the cell of Example 1 after 25 formation cycles. The anode contains a 250 nm a-Si film on a nickel substrate. The cathode is sintered nickel hydroxide on a nickel mesh substrate. The electrolyte composition is 2 molar acetic acid in 1-ethyl-3-methylimidazolium acetate. The cell is cycled at a charge/discharge current density of 387 mA/g.

Following are some embodiments of the invention.

E1. A stable group IV element-based hydrogen storage negative electrode for electrochemical uses; for example a stable silicon-based or carbon-based hydrogen storage negative electrode for electrochemical uses; for example where the electrode comprises a hydrogen storage material comprising >27 wt % of one or more elements selected from the group consisting of C, Si, Ge and Sn, based on the total weight of the hydrogen storage material.

E2. An electrode according to embodiment 1 comprising a hydrogen storage material comprising >27 wt % of one or more elements selected from the group consisting of C, Si, Ge and Sn; for example comprising >27 wt % silicon or >27 wt % carbon, based on the total weight of the hydrogen storage material.

E3. An electrode according to embodiments 1 or 2 where the hydrogen storage material comprises amorphous silicon, microcrystalline silicon, nanocrystalline silicon, monocrystalline silicon, polycrystalline silicon, protocrystalline silicon or porous silicon.

E4. An electrode according to any of the preceding embodiments where the hydrogen storage material comprises amorphous silicon.

E5. An electrode according to any of the preceding embodiments where the hydrogen storage material comprises carbon; for example carbon in the form of natural graphite, artificial graphite, expanded graphite, graphene, carbon fiber, hard carbon, soft carbon, non-graphitizable carbon, carbon black, carbon nanotube, fullerene, activated carbon, crystalline carbon or amorphous carbon.

E6. An electrode according to any of the preceding embodiments where the hydrogen storage material comprises an alloy of silicon and one or more of carbon, germanium and tin, for example amorphous silicon carbide or an alloy of silicon and germanium or an alloy of silicon and tin.

E7. An electrode according to any of the preceding embodiments comprising a hydrogen storage material which is hydrogenated prior to or after assembly of the electrode (a pre-hydrogenated negative electrode); for example where the hydrogen storage material is hydrogenated amorphous silicon (a-Si:H) or hydrogenated amorphous silicon carbide (a-$Si_{1-x}C_x$:H, where x is for example from about 0.01 to about 0.99, from about 0.05 to about 0.95 or from about 0.1 to about 0.9).

E8. An electrode according to any of the preceding embodiments where the hydrogen storage material, for example amorphous silicon, is comprised in a film, for example a film with a thickness >20 nm, ≥50 nm, ≥90 nm, ≥120 nm or ≥180 nm or from about 90 nm to about 10 μm, from about 100 nm to about 5 µm, from about 150 nm to about 3 µm, from about 150 nm to about 2 µm or from about 150 nm to about 1 µm.

E9. An electrode according to any of the preceding embodiments where the hydrogen storage material is comprised in a film in adherence to a substrate, for example a substrate selected from metal, glass, inorganics and plastic.

E10. An electrode according to any of the preceding embodiments where the hydrogen storage material comprises one or more further elements, for example one or more elements selected from the group consisting B, Al, Ga, In, As, Sb, Te and transition metals.

E11. An electrode according to any of the preceding embodiments where the hydrogen storage material contains ≥28 wt %, ≥29 wt %, ≥30 wt %, ≥35 wt %, ≥40 wt %, ≥45 wt %, ≥50 wt %, ≥55 wt %, ≥60 wt %, ≥65 wt %, ≥70 wt %, ≥75 wt %, ≥80 wt %, ≥85 wt %, ≥90 wt %, ≥95 wt %, ≥96 wt %, ≥97 wt %, ≥98 wt % or ≥99 wt % of one or more elements selected from the group consisting of group IV elements, for example Si and/or C, based on the total weight of the hydrogen storage material.

E12. An electrode according to any of the preceding embodiments comprising ≥30% by weight of the one or more group IV elements; for example ≥35%, ≥40%, ≥45%, ≥50%, ≥55%, ≥60%, ≥65%, ≥70%, ≥75%≥80%, ≥85% or ≥90% by weight of the one or more group IV elements, for example Si and/or C, based on the total weight of the negative electrode.

E13. An electrode according to any of the preceding embodiments further comprising one or more components selected from the group consisting of binders, conductive materials and other additives.

E14. An electrode according to any of the preceding embodiments comprising a solid electrolyte interface capable of allowing transport of protons.

E15. An electrode according to any of the preceding embodiments where the hydrogen storage material includes one or more further elements selected from the group consisting of structural modifiers (elements to promote the amorphous phase of a material), hydrogen bond strength modifiers and solid electrolyte interface (SEI) modifiers; for example one or more further elements selected from the group consisting of B, alkaline earth metals, transition metals, rare earth metals, other metals of groups III or V of the periodic table, 0, F, P, Cl and the like.

E16. An electrode according to any of the preceding embodiments in contact with an electrolyte composition which is neutral or acidic, for example having a pH of about 7 or lower; for example from about 1, from about 2, from about 3, from about 4, from about 5 or from about 6 to about 7.

E17. An electrode according to embodiment 16 where the electrolyte composition comprises one or more ionic compounds selected from the group consisting of protic acids, protic ammonium compounds, protic oxonium compounds, aprotic ammonium compounds, aprotic oxonium compounds, aprotic phosphonium compounds and alkali or alkali earth metal salts.

E18. An electrode according to embodiments 16 or 17 where the electrolyte composition comprises an ionic compound containing a cation selected from the group consisting of $NH_4^+$ (ammonium), methylammonium, ethylammonium, dimethylammonium, diethylammonium, trimethylammonium ($NMe_3H^+$), triethylammonium, tributylammonium, diethylmethylammonium, hydroxyethylammonium, methoxymethylammonium, dibutylammonium, methylbutylammonium, anilinium, pyridinium, 2-methylpyridinium, imidazolium, 1-methylimidazolium, 1,2-dimethylimidazolium, imidazolinium, 1-ethylimidazolium, 1-(4-sulfobutyl)-3-methylimidazolium, 1-allylimidazolium, quinolinium, isoquinolinium, pyrrolinium, pyrrolininium or pyrrolidinium;

1-butyl-1-methylpyrrolidinium, tetramethylammonium, tetraethylammonium, tetra-n-butylammonium, n-butyl-tri-ethylammonium, benzyl-tri-methylammonium, tri-n-butylmethylammonium, benzyl-tri-ethylammonium, 1-methylpyridinium, 1-butyl-3,5-dimethylpyridinium, 1,2,4-trimethylpyrazolium, trimethylhydroxyethylammonium (choline), tri-(hydroxyethyl)methylammonium, dimethyl-di(polyoxyethylene)ammonium, 1,2,3-trimethylimidazolium, 1-butyl-3-methylimidazolium, 1-ethyl-2,3-dimethylimidazolium, 1-allyl-3-methylimidazolium, 1-hydroxyethyl-3-methylimidazolium, 1,3-dimethylimidazolium, 1-ethyl-1-methylpiperidinium, 4-ethyl-4-methylmorpholinium, 1-(cyanomethyl)-3-methylimidazolium, 1-(3-cyanopropyl)pyridinium, 1,3-bis(cyanomethyl)imidazolium, 1-hexyl-3-methylimidazolium or 1-ethyl-3-methylimidazolium; and methyltriphenylphosphonium, tetraphenylphosphonium, tetrabutylphosphonium, tributylmethylphosphonium, triethylmethylphosphonium, trihexyltetradecylphosphonium, triphenylpropylphosphonium or tetrakis(hydroxymethyl)phosphonium;

for instance, the cation is 1-ethyl-3-methylimidazolium, 1-hexyl-3-methylimidazolium, 1-butyl-1-methylpyrrolidinium or trihexyl(tetradecyl)phosphonium.

E19. An electrode according to any of embodiments 16-18 where the electrolyte composition comprises an ionic compound containing an anion selected from the group consisting of carboxylates, imides, methides, nitrate, bifluoride, halides, borates, phosphates, phosphinates, phosphonates, sulfonates, sulfates, carbonates and aluminates.

E20. An electrode according to any of embodiments 16-19 where the electrolyte composition comprises an ionic compound containing an anion selected from the group consisting of $[F_zB(C_mF_{2m+1})_{4-z}]^-$, $[F_yP(C_mF_{2m+1})_{6-y}]^-$, $[(C_mF_{2m+1})_2P(O)O]^-$, $[C_mF_{2m+1}P(O)O_2]^{2-}$, $[O-C(O)-C_mF_{2m+1}]^-$, $[O-S(O)_2-C_mF_{2m+1}]^-$, $[N(C(O)-C_mF_{2m+1})_2]^-$, $[N(S(O)_2-C_mF_{2m+1})_2]^-$, $[N(C(O)-C_mF_{2m+1})(S(O)_2-C_mF_{2m+1})]^-$, $[N(C(O)-C_mF_{2m+1})(C(O)F)]^-$, $[N(S(O)_2-C_mF_{2m+1})(S(O)_2F)]^-$, $[N(S(O)_2F)_2]^-$, $[C(C(O)-C_mF_{2m+1})_3]^-$, $[C(S(O)_2-C_mF_{2m+1})_3]^-$,

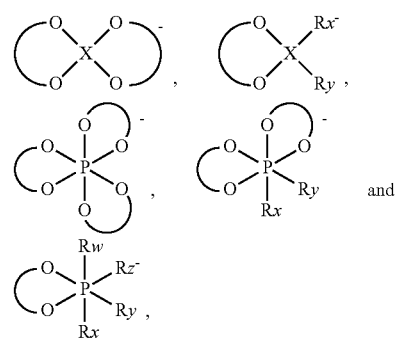

where
y is an integer of 1 to 6,
m is an integer of 1 to 8, for instance 1 to 4,
z is an integer of 1 to 4,
X is B or Al and
$R_w$, $R_x$, $R_y$ and $R_z$ are independently halogen, $C_1$-$C_{20}$alkyl, $C_1$-$C_{20}$alkyl which is partly or fully fluorinated, $C_1$-$C_{20}$alkoxy, $C_1$-$C_{20}$alkoxy which is partly or fully fluorinated, $C_1$-$C_{20}$alkyl-COO or $C_1$-$C_{20}$alkyl-COO which is partly or fully fluorinated and

is independently a bidentate group derived from the —OH groups of a 1,2- or 1,3-diol, a 1,2- or 1,3-dicarboxylic acid or from a 1,2- or 1,3-hydroxycarboxylic acid and where any one $CF_2$ group may be replaced by O, $S(O)_2$, NR or $CH_2$.

E21. An electrode according to any of embodiments 16-20 where the electrolyte composition comprises an ionic compound containing an anion selected from the group consisting of $F_2P(C_2F_5)_4^-$, $F_3P(C_2F_5)_3^-$, $F_4P(C_2F_5)_2^-$, $F_2P(C_3F_7)_4^-$, $F_3P(C_3F_7)_3^-$, $F_4P(C_3F_7)_2^-$, $F_2P(C_4F_9)_4^-$, $F_3P(C_4F_9)_3^-$, $F_4P(C_4F_9)_2^-$, perfluoroalkylcarboxylate, perfluoroalkylsulfonate, bis(perfluoroalkylsulfonyl)imide, (perfluoroalkylsulfonyl)(perfluoroalkylcarboxyl)imide, tris(perfluoroalkylsulfonyl)methide, trifluoroacetate, trifluoromethanesulfonate (triflate), bis(trifluoromethylsulfonyl)imide, tris(trifluoromethylsulfonyl)methide, tetrafluoroborate or a spiro-oxo borate or spiro-oxo phosphate, for example bisoxalatoborate (BOB), difluorooxalatoborate (dFOB), di(trifluoroacetato)oxalatoborate (d(Ac)OB), trisoxalatophosphate, tetrafluorooxalatophosphate and di(trifluoroacetato)oxalatoaluminate.

E22. An electrode according to any of embodiments 16-21 where the electrolyte composition comprises an ionic compound containing a carboxylate anion of formula RCOO⁻ where R is hydrogen or hydrocarbyl; such as formate, acetate (ethanoate), acrylate, propanoate, n-butanoate, i-butanoate, n-pentanoate, i-pentanoate, octanoate, decanoate, benzoate, salicylate, thiosalicylate, 2-, 3- or 4-nitrobenzoate; citrate, oxalate, tartrate, glycolate, gluconate, malate, mandelate, a carboxylate of nitrilotriacetic acid, a carboxylate of N-(2-hydroxyethyl)-ethylenediaminetriacetic acid, a carboxylate of ethylenediaminetetraacetic acid, a carboxylate of diethylenetriaminepentaacetic acid or a haloalkylcarboxylate such as fluoroacetate, difluoroacetate, trifluoroacetate, chloroacetate, dichloroacetate or trichloroacetate.

E23. An electrode according to any of embodiments 16-22 where the electrolyte composition comprises an ionic compound containing an imide anion such as dicyanamide, $N(SO_2F)_2^-$ ((bisfluorosulfonyl)imide), a bis(perfluoroalkylsulfonyl)imide such as $[N(SO_2CF_3)_2]^-$ (bistriflimide), bis(pentafluoroethylsulfonyl)imide or $N(CF_3SO_2)(CF_3(CF_2)_3S_2)^-$ or a (perfluoroalkylsulfonyl)(perfluoroalkylcarboxyl)imide; or a methide such as a tris(perfluoroalkylsulfonyl)methide, for example tris(trifluoromethylsulfonyl)methide, $C(CF_3SO_2)_3^-$; or bifluoride ($HF_2^-$); or chloride, bromide, iodide or fluoride; or a borate such as orthoborate, tetrahydroxyborate, tetraborate, tetraphenylborate, $[B(3,5-(CF_3)_2C_6H_3)_4]^-$ (BARF), $B(C_2O_4)_2^-$ (bis(oxalato)borate) (BOB), difluoro(oxalato)borate (dFOB), di(trifluoroacetato)oxalatoborate (D(Ac)OB), $B(C_6F_5)_4^-$ or $BF_4^-$ (tetrafluoroborate); or a phosphate such as dihydrogen phosphate, hydrogen phosphate, alkyl phosphate, dialkyl phosphate, phosphate, $PF_6^-$ (hexafluorophosphate), $HPO_3F^-$ (fluorohydrogen phosphate), trisoxalatophosphate (TOP), tetrafluorooxalatophosphate (TFOP) or a fluoro(perfluoroalkyl)phosphate such as $F_2P(C_2F_5)_4^-$, $F_3P(C_2F_5)_3^-$ (tris(pentafluoroethyl)trifluorophosphate or FAP), $F_4P(C_2F_5)_2^-$, $F_2P(C_3F_7)_4^-$, $F_3P(C_3F_7)_3^-$, $F_4P(C_3F_7)_2^-$, $F_2P(C_4F_9)_4^-$, $F_3P(C_4F_9)_3^-$ or $F_4P(C_4F_9)_2^-$; or a sulfonate such as an alkylsulfonate, arylsulfonate or perfluoroalkylsulfonate, for instance trifluoromethanesulfonate (triflate), p-toluenesulfonate (tosylate) or methanesulfonate (mesylate); or a sulfate such as hydrogensulfate, sulfate, thiosulfate or an alkylsulfate such as methylsulfate or ethylsulfate; or a carbonate anion such as carbonate, hydrogencarbonate or an alkylcarbonate such as methylcarbonate, ethylcarbonate or butylcarbonate; or an aluminate such as $Al(OC(CF_3)_3)_4^-$, di(trifluoroacetato)oxalatoaluminate (d(Ac)OAl), tetrachloroaluminate, tetrafluoroaluminate, tetraiodoaluminate or tetrabromoaluminate.

E24. An electrode according to any of embodiments 16-23 where the electrolyte composition comprises an ionic liquid.

E25. An electrode according to any of embodiments 16-24 where the electrolyte composition comprises an ionic liquid selected from the group consisting of diethylmethylammonium trifluoromethanesulfonate (DEMA TfO), ethylammonium nitrate, triethylammonium methanesulfonate, 2-methylpyridinium trifluoromethanesulfonate, ammonium fluoride, methylammonium nitrate, hydroxyethylammonium nitrate, ethylammonium nitrate, dimethylammonium nitrate, 1-methylimidazolium nitrate, 1-ethylimidazolium nitrate, t-butylammonium tetrafluoroborate, hydroxyethylammonium tetrafluoroborate, methylbutylammonium tetrafluoroborate, triethylammonium tetrafluoroborate, imidazolium tetrafluoroborate, 1-methylimidazolium tetrafluoroborate, 1,2-dimethylimidazolium tetrafluoroborate, t-butylammonium triflate, 2-fluoropyridinium triflate, hydroxyethylammonium triflate, 1,2-dimethylimidazolium triflate, imidazolium triflate, 1-methylimidazolium hydrogensulfate, 1-methylimidazolium chloride, 1-methylimidazolium triflate, hydronium triflate, methylammonium mesylate, ethylammonium mesylate, butylammonium mesylate, methoxyethylammonium mesylate, dimethylammonium mesylate, dibutylammonium mesylate, triethylammonium mesylate, dimethylethylammonium mesylate, hydronium hydrogensulfate, ammonium hydrogensulfate, methylammonium hydrogensulfate, ethylammonium hydrogensulfate, propylammonium hydrogensulfate, n-butylammonium hydrogensulfate, t-butylammonium hydrogensulfate, dimethylammonium hydrogensulfate, diethylammonium hydrogensulfate, di-n-butylammonium hydrogensulfate, methylbutylammonium hydrogensulfate, ethylbutylammonium hydrogensulfate, trimethylammonium hydrogensulfate, triethylammonium hydrogensulfate, tributylammonium hydrogensulfate, dimethylethylammonium hydrogensulfate, dibutylammonium fluorohydrogen phosphate, triethylammonium fluorohydrogen phosphate, tributylammonium fluorohydrogen phosphate, hydronium dihydrogen phosphate, methylammonium dihydrogen phosphate, ethylammonium dihydrogen phosphate, propylammonium dihydrogen phosphate, n-butylammonum dihydrogen phosphate, methoxyethylammonium dihydrogen phosphate, dimethylammonium dihydrogen phosphate, dibutylammonium dihydrogen phosphate, methylbutylammonium dihydrogen phosphate, ammonium bifluoride, methylammonium bifluoride, ethylammonium bifluoride and dimethylammonium bifluoride.

E26. An electrode according to any of embodiments 16-25 where the electrolyte composition comprises an ionic liquid selected from the group consisting of 1-ethyl-3-methylimidazolium trifluoromethanesulfonate (EMIM TfO), 1-ethyl-3-methylimidazolium tetrafluoroborate (EMIM $BF_4$), 1-ethyl-3-methylimidazolium bis(trifluoromethylsulfonyl)imide (EMIM TFSI), 1-ethyl-3-methylimidazolium acetate (EMIM Ac), 1-butyl-3-methylimidazolium trifluoromethanesulfonate (BMIM TfO), 1-butyl-3-methylimidazolium acetate (BMIM Ac), 1-butyl-3-methylimidazolium bis(trifluoromethylsulfonyl)imide (BMIM TFSI), tri-n-butylmethylammonium methylsulfate, 1-ethyl-2,3-dimethylimidazolium ethylsulfate, 1-butyl-3-methylimidazolium thiocyanate, 1-butyl-3-methylimidazolium tetrachloroaluminate, 1-butyl-3-methylimidazolium methylsulfate, 1-butyl-3-methylimidazolium methanesulfonate, 1-butyl-3-methylimidazolium hydrogencarbonate, 1-butyl-3-methylimidazolium hydrogensulfate, 1-butyl-3-methylimidazolium chloride, 1,2,3-trimethylimidazolium methylsulfate, tris-(hydroxyethyl)methylammonium methylsulfate, 1,2,4-trimethylpyrazolium methylsulfate, 1,3-dimethylimdiazolium hydrogencarbonate, 1-ethyl-3-methylimidazolium hydrogencarbonate, 1-ethyl-3-methylimidazolium chloride, 1-ethyl-3-methylimidazolium tetrachloroaluminate, 1-ethyl-3-methylimidazolium thiocyanate, 1-ethyl-3-methylimidazolium methanesulfonate, 1-ethyl-3-methylimidazolium hydrogensulfate, 1-ethyl-3-methylimidazolium ethylsulfate, 1-ethyl-3-methylimidazolium nitrate, 1-butylpyridinium chloride, 1-ethyl-3-methylimidazolium dicyanamide, 1-ethyl-3-methylimidazolium hexafluorophosphate, 1-butyl-3,5-dimethylpyridinium bromide, 1-ethyl-3-methylimidazolium bis(pentafluoroethylsulfonyl)imide, 1-ethyl-2,3-dimethylimidazolium methylcarbonate, carboxymethyl-tributylphosphonium bis(trifluoromethylsulfonyl)imide, N-carboxyethyl-methylpyrrolidinium bis(trifluoromethylsulfonyl)imide, N-carboxymethyl-trimethylammonium bis(trifluoromethylsulfonyl)imide, N-carboxymethyl-methylpyridinium bis(trifluoromethylsulfonyl)imide, hexyltrimethylammonium bis(trifluromethylsulfonyl)imide, tetrabutylphosphonium methanesulfonate, triethylmethylammonium methylcarbonate, 1-ethyl-1-methylpiperidinium methylcarbonate, 4-ethyl-4-methylmorpholinium methylcarbonate, 1-butyl-1-methylpyrrolidinium methylcarbonate, triethylmethylammonium dibutylphosphate, tributylmethylphosphonium dibutylphosphate, triethylmethylphosphonium dibutylphosphate, tetrabutylphosphonium tetrafluoroborate, tetrabutylphosphonium p-toluenesulfonate, tributylmethylphosphonium methylcarbonate, 1-ethyl-3-methylimidazolium hydrogencarbonate, tributylmethylammonium methylcarbonate, tributylmethylammonium dibutylphosphate, 1-ethyl-3-methylimidazolium dibutylphosphate, 1-butyl-3-methylimidazolium dibutylphosphate, 1-(cyanomethyl)-3-methylimidazolium chloride, 1-(3-cyanopropyl)-3-methylimidazolium chloride, 1-(3-cyanopropyl)-3-methylimidazolium bis(trifluoromethylsulfonyl)imide, 1-(3-cyanopropyl)-3-methylimidazolium dicyanamide, 1-(3-cyanopropyl)pyridinium chloride, 1-(3-cyanopropyl)pyridinium bis(trifluoromethylsulfonyl)imide, 1,3-bis(cyanomethyl)imidazolium chloride, 1,3-bis(cyanomethyl)imidazolium bis(trifluoromethylsulfonyl)imide, 1,3-bis(cyanopropyl)imidazolium chloride, 1,3-bis(3-cyanopropyl)imidazolium bis(trifluoromethylsulfonyl)imide, 1-butyl-3-methylimidazolium hexafluorophosphate, 1-butyl-3-methylimidazolium tetrafluoroborate, 1-ethyl-3-methylimidazolium tetrafluoroborate, 1-ethyl-3-methylimidazolium chloride, 1-ethyl-3-methylimidazolium bromide, 1-butyl-3-methylimidazolium bromide, 1-hexyl-3-methylimidazolium chloride, tributylmethylphosphonium methylsulfate, triethylmethylphosphonium dibutylphosphate, trihexyltetradecylphosphonium bis(trifluromethylsulfonyl)imide, trihexyltetradecylphosphonium bis(2,4,4-trimethylphenyl)phosphinate, trihexyltetradecylphosphonium bromide, trihexyltetradecylphosphonium chloride, trihexyltetradecylphosphonium decanoate, trihexyltetradecylphosphonium dicyanamide, 3-(triphenylphosphonio)propane-1-sulfonate and 3-(triphenylphosphonio)propane-1-sulfonic acid tosylate.

E27. An electrode according to any of embodiments 16-26 where the electrolyte composition comprises a protic acid; for example a protic acid such as hydrochloric acid, nitric acid, phosphoric acid, sulfuric acid, boric acid, hydrofluoric acid, hydrobromic acid, hydroiodic acid, perchloric acid or periodic acid; or a bisulfate such as sodium bisulfate, potassium bisulfate or ammonium bisulfate; or $HAsF_6$, $HBF_4$, $H(OEt_2)BF_4$, $HPF_6$, $H[N(SO_2CF_3)_2]$ or $H[N(SO_2CF_2CF_3)_2]$.

E28. An electrode according to any of embodiments 16-27 where the electrolyte composition comprises an organic protic acid such as a carboxylic acid of formula RCOOH where R is hydrogen or hydrocarbyl, for example formic acid, acetic acid, acrylic acid, fluoroacetic acid, difluoroacetic acid, trifluoroacetic acid, chloroacetic acid, dichloroacetic acid, trichloroacetic acid, propanoic acid, butyric acid, 3-methylbutanoic acid, valeric acid, hexanoic acid, heptanoic acid, caprylic acid, nonanoic acid, benzoic acid, salicylic acid, 2-, 3- or 4-nitrobenzoic acid; citric acid, oxalic acid, tartaric acid, glycolic acid, gluconic acid, malic acid, mandelic acid, nitrilotriacetic acid, N-(2-hydroxyethyl)-ethylenediaminetriacetic acid, ethylenediaminetetraacetic acid or diethyleneaminepentaacetic acid.

E29. An electrode according to any of embodiments 16-28 where the electrolyte composition comprises a protic sulfonic acid of formula $RSO_3H$ where R is alkyl or aryl or alkyl or aryl substituted by one to three halogens, such as p-toluenesulfonic acid, phenylsulfonic acid, methanesulfonic acid or trifluoromethanesulfonic acid.

E30. An electrode according to any of embodiments 16-29 where the electrolyte composition comprises a protic acid which is an oxonium ion associated with a highly non-coordinating ion such as Brookhart's acid (BARF acid), $[H(OEt_2)_2][B[3,5-(CF_3)_2C_6H_3]_4]$, $[H(OEt_2)_2][B(C_6F_5)_4]$ (oxonium acid) or $[H(OEt_2)_2][Al(OC(CF_3)_3)_4]$.

E31. An electrode according to any of embodiments 16-30 where the electrolyte composition comprises at least two different ionic compounds; for example, where the electrolyte composition comprises a protic ionic compound and an aprotic ionic compound;
two different protic ionic compounds;
two different aprotic ionic compounds;
two different salts;
two different ionic liquids;
a salt and an ionic liquid, for example a protic or aprotic ammonium salt or an alkali metal salt such as an alkai metal halide;
a protic acid, protic ammonium compound or a protic oxonium compound and an ionic liquid, for example a carboxylic acid and an ionic liquid.

E32. An electrode according to any of embodiments 16-31 where the electrolyte composition comprises two different ionic compounds which contain an identical cation or an identical anion.

E33. An electrode according to any of embodiments 16-32 where electrolyte composition comprises two different ionic compounds with a weight:weight ratio of from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E34. An electrode according to any of embodiments 16-33 where the electrolyte composition contains no organic solvent and ≤1000 ppm, ≤100 ppm or ≤10 ppm water by weight, based on the total weight of the electrolyte composition; or where the electrolyte composition contains ≤9, ≤8, ≤7, ≤6, ≤5 or ≤4 ppm water by weight, based on the total weight of the electrolyte composition.

E35. An electrode according to any of embodiments 16-33 where the electrolyte composition comprises a solvent.

E36. An electrode according to any of embodiments 16-33 where the electrolyte composition comprises a solvent consisting essentially of water.

E37. An electrode according to any of embodiments 16-33 where the electrolyte composition comprises a solvent consisting essentially of organic solvent.

E38. An electrode according to any of embodiments 16-33 where the electrolyte composition comprises a solvent comprising water and an organic solvent.

E39. An electrode according to embodiment 38 where the weight:weight ratio of water to organic solvent is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E40. An electrode according to any of embodiments 37-39 where the organic solvent comprises one or more solvents selected from the group consisting of organic carbonates, ethers, glymes, ortho esters, polyalklene glycols, esters, lactones, glycols, formates, sulfones, sulfoxides, amides, alcohols, ketones, nitro solvents and nitrile solvents.

E41. An electrode according to embodiment 40 where the electrolyte composition comprises an organic solvent such as an organic carbonate, for example a cyclic or acyclic organic carbonate such as ethylene carbonate (EC), propylene carbonate (PC), trimethylene carbonate, 1,2-butylene carbonate (BC), dimethyl carbonate (DMC), diethyl carbonate (DEC), ethylmethyl carbonate (EMC), vinylene carbonate, difluoroethylene carbonate or monofluoroethylene carbonate; or an ether or glyme such as dimethoxymethane (DMM), diethoxymethane, 1,2-dimethoxyethane (DME or ethyleneglycol dimethylether or glyme), diglyme, triglyme, tetraglyme, ethyleneglycol diethylether (DEE), ethyleneglycol dibutylether, diethyleneglycol diethylether, tetrahydrofuran (THF), 2-methyltetrahydrofuran (2-MeTHF), 1,3-dioxane, 1,3-dioxolane (DIOX), 4-methyl-1,3-dioxolane (4-MeDIOX), 2-methyl-1,3-dioxolane (2-MeDIOX), 1,4-dioxane, dimethylether, ethylmethylether, diethylether, di-n-butylether, di-t-butylether, di-isopropylether, methyl-t-butylether, ethyl-t-butylether or t-amyl-methylether; or an ortho ester such as trimethoxymethane, triethoxymethane, 1,4-dimethyl-3,5,8-trioxabicyclo[2.2.2]octane or 4-ethyl-1-methyl-3,5,8-trioxabicyclo[2.2.2]octane; or a polyalkylene glycol, that is a homo- or cooligomer or homo- or copolymer of $C_1$-$C_4$alkylene glycols, such as polyethylene glycol (PEG) or monomethyl, dimethyl or diethyl (end-capped) polyethylene glycol with weight average molecular weights (Mw) for example from about 200 to about 1200 g/mol, from about 200 to about 1000 g/mol, from about 200 to about 900 g/mol, from about 200 to about 700 g/mol or from about 200 to about 500 g/mol, for example oligomers of 4 monomers or more, for instance tetraethylene glycol, fluorinated tetraethylene glycol or tetrapropylene glycol, for instance PEG 200, PEG 300, PEG 400, PEG 500, PEG 600, PEG 700, PEG 800, PEG 900 or PEG 1000; or an ester or lactone such as γ-butyrolactone (GBL), γ-valerolactone, δ-valerolactone, ethyl acetate (EA), 2-methoxyethyl acetate, 2-ethoxyethyl acetate, 2-butoxyethyl acetate, 2-(2-butoxyethoxy)ethyl acetate (diethylene glycol butyl ether acetate, DBA), ethylene glycol diacetate (EGDA), 3-ethoxy ethyl propionate (EEP), methyl butyrate (MB), n-amyl acetate (NAAC), propylene glycol methyl ether acetate (PMA), ethyl butyrate (EB), diethyl malonate or dimethyl malonate; or a dibasic ester mixture such as methyl esters of adipic, glutaric or succinic acids; or a glycol such as ethylene glycol, propylene glycol, 2-methoxyethanol, 2-ethoxyethanol, 2-propoxyethanol, 2-isopropoxyethanol, 2-butoxyethanol (ethylene glycol butyl ether, EB), 2-phenoxyethanol, 2-benzyloxyethanol, 2-(2-methoxyethoxy)ethanol, 2-(2-ethoxyethoxy)ethanol, 2-(2-butoxyethoxy)ethanol (diethylene glycol butyl ether, DB), propylene glycol butyl ether (PB), propylene glycol methyl ether (PM), triethylene glycol (TEG), dipropylene glycol methyl ether (DPM), diethylene glycol methyl ether, 1,3-butanediol, 1,4-butanediol, 1,5-pentanediol, perfluoro-1,4-butanediol, perfluoro-1,5-butanediol, fluorinated diethylene glycol methyl ether, fluorinated triethylene glycol, fluorinated triethylene glycol methyl ether or fluorinated diethylene glycol butyl ether; or a formate such as methyl formate, ethyl formate, isobutyl formate or tert-butyl formate; or a sulfone or sulfoxide such as methylsulfonylmethane (MSM or dimethylsulfone), ethylmethylsulfone, sulfolane or dimethylsulfoxide (DMSO); or an amide such as dimethylformamide (DMF), dimethylacetamide (DMA), N-methylpyrrolidone (NMP), 2-pyrrolidone, 1,3-dimethyl-2-imidazolidinone (DMI), hexamethylphosphoramide (HMPA) or N,N'-dimethyl-N,N'-trimethyleneurea (1,3-dimethyl-3,4,5,6-tetrahydro-2(1H)-pyrimidinone (DMPU)); or an alcohol such as benzylalcohol (BA), ethanol, trifluoroethanol (2,2,2-trifluoroethanol), methanol, isopropanol, t-butanol or n-butanol; or a ketone such as methylethylketone (MEK) or methylisoamylketone (MIAK); or a nitro solvent such as nitrobenzene, nitromethane or nitroethane; or a nitrile solvent such as acetonitrile, propionitrile, butyronitrile or adiponitrile.

E42. An electrode according to any of embodiments 16-33 and 35-41 where the electrolyte composition comprises a solvent and where the weight:weight ratio of ionic compounds in total to solvent is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E43. An electrode according to any of embodiments 16-42 where the electrolyte composition further comprises one or more additives selected from the group consisting of corrosion inhibitors, solid electrolyte interface (SEI) improvers, proton evolution improvers, self-discharge inhibitors, antigassing agents, viscosity adjusting agents, cathode protection agents, salt stabilizers, conductivity improvers and solvating agents.

E44. An electrode according to any of embodiments 16-43 where the electrolyte composition contains one or more additives selected from the group consisting of fluorinated oil, sodium stannate, sodium citrate or polyacrylic acids;

HF or KF, oxides or hydroxides of rare earths such as Y, metal porphines, for example Ni or Fe porphine, vinylene carbonate, vinylethylene carbonate, methylene ethylene carbonate or fluoro-ethylene carbonate;

polyglycols, polyglycol alkyl ethers, polyglycol alkyl phosphate esters or polysorbates such as polyethylene glycol (PEG), polypropylene glycol, polysorbate 20, polysorbate 40 or polysorbate 80 or a mixture of PEG 600 and polysorbate 20 or a mixture of PEG 600 and ZnO; phosphate ester-based surfactants, propane sultone or fluoropropane sultone; and

DMSO;

for example at a level of from about 0.1% to about 15% by weight, based on the total weight of the electrolyte composition.

E45. A rechargeable electrochemical cell comprising a negative electrode according to any of embodiments 1-15, a positive electrode, a casing having said electrodes positioned therein and an electrolyte composition according to any of embodiments 16-44 in contact with the electrodes, where the gravimetric energy density of the cell is >100 Wh/kg, ≥110 Wh/kg, ≥115, ≥120, ≥125, ≥130, ≥135, ≥140, ≥145, ≥150, ≥155, ≥160, ≥165, ≥170, ≥175, ≥180, ≥185, ≥190, ≥195 or ≥200 Wh/kg and/or where the volumetric energy density of the cell is >250 Wh/L, for instance, ≥260 Wh/kg, ≥265, ≥270, ≥275, ≥280, ≥285, ≥290, ≥295, ≥300, ≥305, ≥310, ≥315, ≥320, ≥325, ≥330, ≥335, ≥340, ≥345 or ≥350 Wh/kg and/or where the discharge capacity of the hydrogen storage material is ≥800 mAh/g over 20 cycles or more (over at least 20 cycles), for example ≥810, ≥820, ≥825, ≥830, ≥835, ≥840, ≥845, ≥850, ≥855, ≥860, ≥865, ≥870, ≥875, ≥880 or ≥895 mAh/g over 20 cycles or more.

E46. A rechargeable electrochemical cell comprising a negative electrode according to any of embodiments 1-15, a positive electrode, a casing having said electrodes positioned therein and an electrolyte composition according to any of embodiments 16-44 in contact with the electrodes, where the reversible half cell charge/discharge electrochemical reaction at the negative electrode is

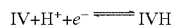

$IV + H^+ + e^- \rightleftharpoons IVH$ or

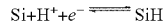

$Si + H^+ + e^- \rightleftharpoons SiH$ where

IV is a group IV element-based hydrogen storage material and

Si is a silicon-based hydrogen storage material.

E47. A rechargeable electrochemical cell comprising a negative electrode according to any of embodiments 1-15, a positive electrode, a casing having said electrodes positioned therein and an electrolyte composition according to any of embodiments 16-44 in contact with the electrodes, the positive electrode comprising one or more cathode active materials selected from the group consisting of transition metals, transition metal oxides, transition metal hydroxides, transition metal oxide/hydroxides and transition metal fluorides; for example one or more materials selected from the group consisting of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;

oxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;

hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;

oxide/hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au; and fluorides Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au.

Following are more embodiments of the invention.

E1. An electrochemical cell comprising a stable group IV element-based hydrogen storage negative electrode; for example a stable silicon-based or carbon-based hydrogen storage negative electrode; for example where the negative electrode comprises a hydrogen storage material comprising >27 wt % of one or more elements selected from the group consisting of C, Si, Ge and Sn, based on the total weight of the hydrogen storage material;

the cell also comprising an aqueous or non-aqueous electrolyte composition in contact with the electrode.

E2. A cell according to embodiment 1 where the negative electrode comprises a hydrogen storage material comprising >27 wt % of one or more elements selected from the group consisting of C, Si, Ge and Sn; for example comprising >27 wt % silicon or >27 wt % carbon, based on the total weight of the hydrogen storage material.

E3. A cell according to embodiments 1 or 2 where the hydrogen storage material comprises amorphous silicon, microcrystalline silicon, nanocrystalline silicon, monocrystalline silicon, polycrystalline silicon, protocrystalline silicon or porous silicon.

E4. A cell according to any of the preceding embodiments where the hydrogen storage material comprises amorphous silicon.

E5. A cell according to any of the preceding embodiments where the hydrogen storage material comprises carbon; for example carbon in the form of natural graphite, artificial graphite, expanded graphite, graphene, carbon fiber, hard carbon, soft carbon, non-graphitizable carbon, carbon black, carbon nanotube, fullerene, activated carbon, crystalline carbon or amorphous carbon.

E6. A cell according to any of the preceding embodiments where the hydrogen storage material comprises an alloy of silicon and one or more of carbon, germanium and tin, for example amorphous silicon carbide or an alloy of silicon and germanium or an alloy of silicon and tin.

E7. A cell according to any of the preceding embodiments where the hydrogen storage material is hydrogenated prior to assembly of the cell (a pre-hydrogenated negative electrode); for example where the hydrogen storage material is hydrogenated amorphous silicon (a-Si:H) or hydrogenated amorphous silicon carbide (a-$Si_{1-x}C_x$:H, where x is for example from about 0.01 to about 0.99, from about 0.05 to about 0.95 or from about 0.1 to about 0.9).

E8. A cell according to any of the preceding embodiments where the hydrogen storage material, for example amorphous silicon, is comprised in a film, for example a film with a thickness >20 nm, ≥50 nm, ≥90 nm, ≥120 nm or ≥180 nm or from about 90 nm to about 10 µm, from about 100 nm to about 5 µm, from about 150 nm to about 3 µm, from about 150 nm to about 2 µm or from about 150 nm to about 1 µm.

E9. A cell according to any of the preceding embodiments where the hydrogen storage material is comprised in a film in adherence to a substrate, for example a substrate selected from metal, glass, inorganics and plastic.

E10. A cell according to any of the preceding embodiments where the hydrogen storage material comprises one or more further elements, for example one or more elements selected from the group consisting B, Al, Ga, In, As, Sb, Te and transition metals.

E11. A cell according to any of the preceding embodiments where the hydrogen storage material contains ≥28 wt %, ≥29 wt %, ≥30 wt %, ≥35 wt %, ≥40 wt %, ≥45 wt %, ≥50 wt %, ≥55 wt %, ≥60 wt %, ≥65 wt %, ≥70 wt %, ≥75 wt %, ≥80 wt %, ≥85 wt %, ≥90 wt %, ≥95 wt %, ≥96 wt %, ≥97 wt %, ≥98 wt % or ≥99 wt % of one or more elements selected from the group consisting of group IV elements, for example Si and/or C, based on the total weight of the hydrogen storage material.

E12. A cell according to any of the preceding embodiments where the negative electrode comprises ≥30% by weight of the one or more group IV elements; for example ≥35%, ≥40%, ≥45%, ≥50%, ≥55%, ≥60%, ≥65%, ≥70%, ≥75%≥80%, ≥85% or ≥90% by weight of the one or more group IV elements, for example Si and/or C, based on the total weight of the negative electrode.

E13. A cell according to any of the preceding embodiments where the negative electrode further comprises one or more components selected from the group consisting of binders, conductive materials and other additives.

E14. A cell according to any of the preceding embodiments where the negative electrode comprises a solid electrolyte interface capable of allowing transport of protons.

E15. An cell according to any of the preceding embodiments where the hydrogen storage material includes one or more further elements selected from the group consisting of structural modifiers (elements to promote the amorphous phase of a material), hydrogen bond strength modifiers and solid electrolyte interface (SEI) modifiers; for example one or more further elements selected from the group consisting of B, alkaline earth metals, transition metals, rare earth metals, other metals of groups III or V of the periodic table, O, F, P, Cl and the like.

E16. A cell according to any of the preceding embodiments where the electrolyte composition which is neutral or acidic, for example having a pH of about 7 or lower; for example from about 1, from about 2, from about 3, from about 4, from about 5 or from about 6 to about 7.

E17. A cell according to any of the preceding embodiments where the electrolyte composition comprises one or more ionic compounds selected from the group consisting of protic acids, protic ammonium compounds, protic oxonium compounds, aprotic ammonium compounds, aprotic oxonium compounds, aprotic phosphonium compounds and alkali or alkali earth metal salts.

E18. A cell according to any of the preceding embodiments where the electrolyte composition comprises an ionic compound containing a cation selected from the group consisting of $NH_4^+$ (ammonium), methylammonium, ethylammonium, dimethylammonium, diethylammonium, trimethylammonium ($NMe_3H^+$), triethylammonium, tributylammonium, diethylmethylammonium, hydroxyethylammonium, methoxymethylammonium, dibutylammonium, methylbutylammonium, anilinium, pyridinium, 2-methylpyridinium, imidazolium, 1-methylimidazolium, 1,2-dimethylimidazolium, imidazolinium, 1-ethylimidazolium, 1-(4-sulfobutyl)-3-methylimidazolium, 1-allylimidazolium, quinolinium, isoquinolinium, pyrrolinium, pyrrolininium or pyrrolidinium;

1-butyl-1-methylpyrrolidinium, tetramethylammonium, tetraethylammonium, tetra-n-butylammonium, n-butyl-tri-ethylammonium, benzyl-tri-methylammonium, tri-n-butylmethylammonium, benzyl-tri-ethylammonium, 1-methylpyridinium, 1-butyl-3,5-dimethylpyridinium, 1,2, 4-trimethylpyrazolium, trimethylhydroxyethylammonium (choline), tri-(hydroxyethyl)methylammonium, dimethyl-di(polyoxyethylene)ammonium, 1,2,3-trimethylimidazolium, 1-butyl-3-methylimidazolium, 1-ethyl-2,3-dimethylimidazolium, 1-allyl-3-methylimidazolium, 1-hydroxyethyl-3-methylimidazolium, 1,3-dimethylimidazolium, 1-ethyl-1-methylpiperidinium, 4-ethyl-4-methylmorpholinium, 1-(cyanomethyl)-3-methylimidazolium, 1-(3-cyanopropyl)pyridinium, 1,3-bis(cyanomethyl)imidazolium, 1-hexyl-3-methylimidazolium or 1-ethyl-3-methylimidazolium; and methyltriphenylphosphonium, tetraphenylphosphonium, tetrabutylphosphonium, tributylmethylphosphonium, triethylmethylphosphonium, trihexyltetradecylphosphonium, triphenylpropylphosphonium or tetrakis(hydroxymethyl)phosphonium;

for instance, the cation is 1-ethyl-3-methylimidazolium, 1-hexyl-3-methylimidazolium, 1-butyl-1-methylpyrrolidinium or trihexyl(tetradecyl)phosphonium.

E19. A cell according to any of the preceding embodiments where the electrolyte composition comprises an ionic compound containing an anion selected from the group consisting of carboxylates, imides, methides, nitrate, bifluoride, halides, borates, phosphates, phosphinates, phosphonates, sulfonates, sulfates, carbonates and aluminates.

E20. A cell according to any of the preceding embodiments where the electrolyte composition comprises an ionic compound containing an anion selected from the group consisting of $[F_zB(C_mF_{2m+1})_{4-z}]^-$, $[F_yP(C_mF_{2m+1})_{6-y}]^-$, $[(C_mF_{2m+1})_2P(O)O]^-$, $[C_mF_{2m+1}P(O)O_2]^{2-}$, $[O—C(O)—C_mF_{2m+1}]^-$, $[O—S(O)_2—C_mF_{2m+1}]^-$, $[N(C(O)—C_mF_{2m+1})_2]^-$, $[N(S(O)_2—C_mF_{2m+1})_2]^-$, $[N(C(O)—C_mF_{2m+1})(S(O)_2—C_mF_{2m+1})]^-$, $[N(C(O)—C_mF_{2m+1})(C(O)F)]^-$, $[N(S(O)_2—C_mF_{2m+1})(S(O)_2F)]^-$, $[N(S(O)_2F)_2]^-$, $[C(C(O)—C_mF_{2m+1})_3]^-$, $[C(S(O)_2—C_mF_{2m+1})_3]^-$,

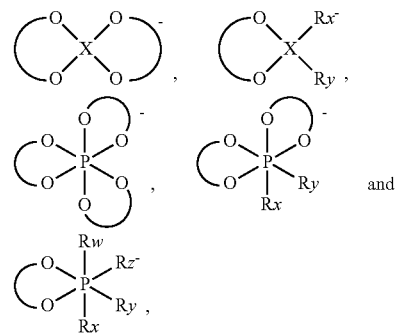

where
y is an integer of 1 to 6,
m is an integer of 1 to 8, for instance 1 to 4,
z is an integer of 1 to 4,
X is B or Al and
$R_w$, $R_x$, $R_y$ and $R_z$ are independently halogen, $C_1$-$C_{20}$alkyl, $C_1$-$C_{20}$alkyl which is partly or fully fluorinated, $C_1$-$C_{20}$alkoxy, $C_1$-$C_{20}$alkoxy which is partly or fully fluorinated, $C_1$-$C_{20}$alkyl-COO or $C_1$-$C_{20}$alkyl-COO which is partly or fully fluorinated and

is independently a bidentate group derived from the —OH groups of a 1,2- or 1,3-diol, a 1,2- or 1,3-dicarboxylic acid or from a 1,2- or 1,3-hydroxycarboxylic acid and where any one $CF_2$ group may be replaced by O, $S(O)_2$, NR or $CH_2$.

E21. A cell according to any of the preceding embodiments where the electrolyte composition comprises an ionic compound containing an anion selected from the group consisting of $F_2P(C_2F_5)_4^-$, $F_3P(C_2F_5)_3^-$, $F_4P(C_2F_5)_2^-$, $F_2P(C_3F_7)_4^-$, $F_3P(C_3F_7)_3^-$, $F_4P(C_3F_7)_2^-$, $F_2P(C_4F_9)_4^-$, $F_3P(C_4F_9)_3^-$, $F_4P(C_4F_9)_2^-$, perfluoroalkylcarboxylate, perfluoroalkylsulfonate, bis(perfluoroalkylsulfonyl)imide, (perfluoroalkylsulfonyl)(perfluoroalkylcarboxyl)imide, tris(perfluoroalkylsulfonyl)methide, trifluoroacetate, trifluoromethanesulfonate (triflate), bis(trifluoromethylsulfonyl)imide, tris(trifluoromethylsulfonyl)methide, tetrafluoroborate or a spiro-oxo borate or spiro-oxo phosphate, for example bisoxalatoborate (BOB), difluorooxalatoborate (dFOB), di(trifluoroacetato)oxalatoborate (d(Ac)OB), trisoxalatophosphate, tetrafluorooxalatophosphate and di(trifluoroacetato)oxalatoaluminate.

E22. A cell according to any of the preceding embodiments where the electrolyte composition comprises an ionic compound containing a carboxylate anion of formula $RCOO^-$ where R is hydrogen or hydrocarbyl; such as formate, acetate (ethanoate), acrylate, propanoate, n-butanoate, i-butanoate, n-pentanoate, i-pentanoate, octanoate, decanoate, benzoate, salicylate, thiosalicylate, 2-, 3- or 4-nitrobenzoate; citrate, oxalate, tartrate, glycolate, gluconate, malate, mandelate, a carboxylate of nitrilotriacetic acid, a carboxylate of N-(2-hydroxyethyl)-ethylenediaminetriacetic acid, a carboxylate of ethylenediaminetetraacetic acid, a carboxylate of diethylenetriaminepentaacetic acid or a haloalkylcarboxylate such as fluoroacetate, difluoroacetate, trifluoroacetate, chloroacetate, dichloroacetate or trichloroacetate.

E23. A cell according to any of the preceding embodiments where the electrolyte composition comprises an ionic compound containing an imide anion such as dicyanamide, $N(SO_2F)_2^-$ ((bisfluorosulfonyl)imide), a bis(perfluoroalkylsulfonyl)imide such as $[N(SO_2CF_3)_2]^-$ (bistriflimide), bis(pentafluoroethylsulfonyl)imide or $N(CF_3SO_2)(CF_3(CF_2)_3S_2)^-$ or a (perfluoroalkylsulfonyl)(perfluoroalkylcarboxyl)imide; or a methide such as a tris(perfluoroalkylsulfonyl)methide, for example tris(trifluoromethylsulfonyl)methide, $C(CF_3SO_2)_3^-$; or bifluoride ($HF_2^-$); or chloride, bromide, iodide or fluoride; or a borate such as orthoborate, tetrahydroxyborate, tetraborate, tetraphenylborate, $[B(3,5-(CF_3)_2C_6H_3)_4]^-$ (BARF), $B(C_2O_4)_2^-$ (bis(oxalato)borate) (BOB), difluoro(oxalato)borate (dFOB), di(trifluoroacetato)oxalatoborate (D(Ac)OB), $B(C_6F_5)_4^-$ or $BF_4^-$ (tetrafluoroborate); or a phosphate such as dihydrogen phosphate, hydrogen phosphate, alkyl phosphate, dialkyl phosphate, phosphate, $PF_6^-$ (hexafluorophosphate), $HPO_3F^-$ (fluorohydrogen phosphate), trisoxalatophosphate (TOP), tetrafluorooxalatophosphate (TFOP) or a fluoro(perfluoroalkyl)phosphate such as $F_2P(C_2F_5)_4^-$, $F_3P(C_2F_5)_3^-$ (tris(pentafluoroethyl)trifluorophosphate or FAP), $F_4P(C_2F_5)_2^-$, $F_2P(C_3F_7)_4^-$, $F_3P(C_3F_7)_3^-$, $F_4P(C_3F_7)_2^-$, $F_2P(C_4F_9)_4^-$, $F_3P(C_4F_9)_3^-$ or $F_4P(C_4F_9)_2^-$; or a sulfonate such as an alkylsulfonate, arylsulfonate or perfluoroalkylsulfonate, for instance trifluoromethanesulfonate (triflate), p-toluenesulfonate (tosylate) or methanesulfonate (mesylate); or a sulfate such as hydrogensulfate, sulfate, thiosulfate or an alkylsulfate such as methylsulfate or ethylsulfate; or a carbonate anion such as carbonate, hydrogencarbonate or an alkylcarbonate such as methylcarbonate, ethylcarbonate or butylcarbonate; or an aluminate such as $Al(OC(CF_3)_3)_4^-$, di(trifluoroacetato)oxalatoaluminate (d(Ac)OAl), tetrachloroaluminate, tetrafluoroaluminate, tetraiodoaluminate or tetrabromoaluminate.

E24. A cell according to any of the preceding embodiments where the electrolyte composition comprises an ionic liquid.

E25. A cell according to any of the preceding embodiments where the electrolyte composition comprises an ionic liquid selected from the group consisting of diethylmethylammonium trifluoromethanesulfonate (DEMA TfO), ethylammonium nitrate, triethylammonium methanesulfonate, 2-methylpyridinium trifluoromethanesulfonate, ammonium fluoride, methylammonium nitrate, hydroxyethylammonium nitrate, ethylammonium nitrate, dimethylammonium nitrate, 1-methylimidazolium nitrate, 1-ethylimidazolium nitrate, t-butylammonium tetrafluoroborate, hydroxyethylammonium tetrafluoroborate, methylbutylammonium tetrafluoroborate, triethylammonium tetrafluoroborate, imidazolium tetrafluoroborate, 1-methylimidazolium tetrafluoroborate, 1,2-dimethylimidazolium tetrafluoroborate, t-butylammonium triflate, 2-fluoropyridinium triflate, hydroxyethylammonium triflate, 1,2-dimethylimidazolium triflate, imidazolium triflate, 1-methylimidazolium hydrogensulfate, 1-methylimidazolium chloride, 1-methylimidazolium triflate, hydronium triflate, methylammonium mesylate, ethylammonium mesylate, butylammonium mesylate, methoxyethylammonium mesylate, dimethylammonium mesylate, dibutylammonium mesylate, triethylammonium mesylate, dimethylethylammonium mesylate, hydronium hydrogensulfate, ammonium hydrogensulfate, methylammonium hydrogensulfate, ethylammonium hydrogensulfate, propylammonium hydrogensulfate, n-butylammonium hydrogensulfate, t-butylammonium hydrogensulfate, dimethylammonium hydrogensulfate, diethylammonium hydrogensulfate, di-n-butylammonium hydrogensulfate, methylbutylammonium hydrogensulfate, ethylbutylammonium hydrogensulfate, trimethylammonium hydrogensulfate, triethylammonium hydrogensulfate, tributylammonium hydrogensulfate, dimethylethylammonium hydrogensulfate, dibutylammonium fluorohydrogen phosphate, triethylammonium fluorohydrogen phosphate, tributylammonium fluorohydrogen phosphate, hydronium dihydrogen phosphate, methylammonium dihydrogen phosphate, ethylammonium dihydrogen phosphate, propylammonium dihydrogen phosphate, n-butylammonum dihydrogen phosphate, methoxyethylammonium dihydrogen phosphate, dimethylammonium dihydrogen phosphate, dibutylammonium dihydrogen phosphate, methylbutylammonium dihydrogen phosphate, ammonium bifluoride, methylammonium bifluoride, ethylammonium bifluoride and dimethylammonium bifluoride.

E26. A cell according to any of the preceding embodiments where the electrolyte composition comprises an ionic liquid selected from the group consisting of 1-ethyl-3-methylimidazolium trifluoromethanesulfonate (EMIM TfO), 1-ethyl-3-methylimidazolium tetrafluoroborate (EMIM $BF_4$), 1-ethyl-3-methylimidazolium bis(trifluoromethylsulfonyl)imide (EMIM TFSI), 1-ethyl-3-methylimidazolium acetate (EMIM Ac), 1-butyl-3-methylimidazolium trifluoromethanesulfonate (BMIM TfO), 1-butyl-3-methylimidazolium acetate (BMIM Ac), 1-butyl-3-methylimidazolium bis(trifluoromethylsulfonyl)imide (BMIM TFSI), tri-n-butylmethylammonium methylsulfate, 1-ethyl-2,3-dimethylimidazolium ethylsulfate, 1-butyl-3-methylimidazolium thiocyanate, 1-butyl-3-methylimidazolium tetrachloroaluminate, 1-butyl-3-methylimidazolium methylsulfate, 1-butyl-3-methylimidazolium methanesulfonate, 1-butyl-3-methylimidazolium hydrogencarbonate, 1-butyl-3- methylimidazolium hydrogensulfate, 1-butyl-3-methylimidazolium chloride, 1,2,3-trimethylimidazolium methylsulfate, tris-(hydroxyethyl)methylammonium methylsulfate, 1,2,4-trimethylpyrazolium methylsulfate, 1,3-dimethylimidazolium hydrogencarbonate, 1-ethyl-3-methylimidazolium hydrogencarbonate, 1-ethyl-3-methylimidazolium chloride, 1-ethyl-3-methylimidazolium tetrachloroaluminate, 1-ethyl-3-methylimidazolium thiocyanate, 1-ethyl-3-methylimidazolium methanesulfonate, 1-ethyl-3-methylimidazolium hydrogensulfate, 1-ethyl-3-methylimidazolium ethylsulfate, 1-ethyl-3-methylimidazolium nitrate, 1-butylpyridinium chloride, 1-ethyl-3-methylimidazolium dicyanamide, 1-ethyl-3-methylimidazolium hexafluorophosphate, 1-butyl-3,5-dimethylpyridinium bromide, 1-ethyl-3-methylimidazolium bis(pentafluoroethylsulfonyl)imide, 1-ethyl-2,3-dimethylimidazolium methylcarbonate, carboxymethyl-tributylphosphonium bis(trifluoromethylsulfonyl)imide, N-carboxyethyl-methylpyrrolidinium bis(trifluoromethylsulfonyl)imide, N-carboxymethyl-trimethylammonium bis(trifluoromethylsulfonyl)imide, N-carboxymethyl-methylpyridinium bis(trifluoromethylsulfonyl)imide, hexyltrimethylammonium bis(trifluromethylsulfonyl)imide, tetrabutylphosphonium methanesulfonate, triethylmethylammonium methylcarbonate, 1-ethyl-1-methylpiperidinium methylcarbonate, 4-ethyl-4-methylmorpholinium methylcarbonate, 1-butyl-1-methylpyrrolidinium methylcarbonate, triethylmethylammonium dibutylphosphate, tributylmethylphosphonium dibutylphosphate, triethylmethylphosphonium dibutylphosphate, tetrabutylphosphonium tetrafluoroborate, tetrabutylphosphonium p-toluenesulfonate, tributylmethylphosphonium methylcarbonate, 1-ethyl-3-methylimidazolium hydrogencarbonate, tributylmethylammonium methylcarbonate, tributylmethylammonium dibutylphosphate, 1-ethyl-3-methylimidazolium dibutylphosphate, 1-butyl-3-methylimidazolium dibutylphosphate, 1-(cyanomethyl)-3-methylimidazolium chloride, 1-(3-cyanopropyl)-3-methylimidazolium chloride, 1-(3-cyanopropyl)-3-methylimidazolium bis(trifluoromethylsulfonyl)imide, 1-(3-cyanopropyl)-3-methylimidazolium dicyanamide, 1-(3-cyanopropyl)pyridinium chloride, 1-(3-cyanopropyl)pyridinium bis(trifluoromethylsulfonyl)imide, 1,3-bis(cyanomethyl)imidazolium chloride, 1,3-bis(cyanomethyl)imidazolium bis(trifluoromethylsulfonyl)imide, 1,3-bis(cyanopropyl)imidazolium chloride, 1,3-bis(3-cyanopropyl)imidazolium bis(trifluoromethylsulfonyl)imide, 1-butyl-3-methylimidazolium hexafluorophosphate, 1-butyl-3-methylimidazolium tetrafluoroborate, 1-ethyl-3-methylimidazolium tetrafluoroborate, 1-ethyl-3-methylimidazolium chloride, 1-ethyl-3-methylimidazolium bromide, 1-butyl-3-methylimidazolium bromide, 1-hexyl-3-methylimidazolium chloride, tributylmethylphosphonium methylsulfate, triethylmethylphosphonium dibutylphosphate, trihexyltetradecylphosphonium bis(trifluromethylsulfonyl)imide, trihexyltetradecylphosphonium bis(2,4,4-trimethylphenyl)phosphinate, trihexyltetradecylphosphonium bromide, trihexyltetradecylphosphonium chloride, trihexyltetradecylphosphonium decanoate, trihexyltetradecylphosphonium dicyanamide, 3-(triphenylphosphonio)propane-1-sulfonate and 3-(triphenylphosphonio)propane-1-sulfonic acid tosylate.

E27. A cell according to any of the preceding embodiments where the electrolyte composition comprises a protic acid; for example a protic acid such as hydrochloric acid, nitric acid, phosphoric acid, sulfuric acid, boric acid, hydrofluoric acid, hydrobromic acid, hydroiodic acid, perchloric acid or periodic acid; or a bisulfate such as sodium bisulfate, potassium bisulfate or ammonium bisulfate; or $HAsF_6$, $HBF_4$, $H(OEt_2)BF_4$, $HPF_6$, $H[N(SO_2CF_3)_2]$ or $H[N(SO_2CF_2CF_3)_2]$.

E28. A cell according to any of the preceding embodiments where the electrolyte composition comprises an organic protic acid such as a carboxylic acid of formula RCOOH where R is hydrogen or hydrocarbyl, for example formic acid, acetic acid, acrylic acid, fluoroacetic acid, difluoroacetic acid, trifluoroacetic acid, chloroacetic acid, dichloroacetic acid, trichloroacetic acid, propanoic acid, butyric acid, 3-methylbutanoic acid, valeric acid, hexanoic acid, heptanoic acid, caprylic acid, nonanoic acid, benzoic acid, salicylic acid, 2-, 3- or 4-nitrobenzoic acid; citric acid, oxalic acid, tartaric acid, glycolic acid, gluconic acid, malic acid, mandelic acid, nitrilotriacetic acid, N-(2-hydroxyethyl)-ethylenediaminetriacetic acid, ethylenediaminetetraacetic acid or diethyleneaminepentaacetic acid.

E29. A cell according to any of the preceding embodiments where the electrolyte composition comprises a protic sulfonic acid of formula $RSO_3H$ where R is alkyl or aryl or alkyl or aryl substituted by one to three halogens, such as p-toluenesulfonic acid, phenylsulfonic acid, methanesulfonic acid or trifluoromethanesulfonic acid.

E30. A cell according to any of the preceding embodiments where the electrolyte composition comprises a protic acid which is an oxonium ion associated with a highly non-coordinating ion such as Brookhart's acid (BARF acid), $[H(OEt_2)_2][B[3,5-(CF_3)_2C_6H_3]_4]$, $[H(OEt_2)_2][B(C_6F_5)_4]$ (oxonium acid) or $[H(OEt_2)_2][Al(OC(CF_3)_3)_4]$.

E31. A cell according to any of the preceding embodiments where the electrolyte composition comprises at least two different ionic compounds; for example, where the electrolyte composition comprises a protic ionic compound and an aprotic ionic compound;
two different protic ionic compounds;
two different aprotic ionic compounds;
two different salts;
two different ionic liquids;
a salt and an ionic liquid, for example a protic or aprotic ammonium salt or an alkali metal salt such as an alkai metal halide;
a protic acid, protic ammonium compound or a protic oxonium compound and an ionic liquid, for example a carboxylic acid and an ionic liquid.

E32. A cell according to any of the preceding embodiments where the electrolyte composition comprises two different ionic compounds which contain an identical cation or an identical anion.

E33. A cell according to any of the preceding embodiments where electrolyte composition comprises two different ionic compounds with a weight:weight ratio of from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E34. A cell according to any of the preceding embodiments where the electrolyte composition contains no organic solvent and ≤1000 ppm, ≤100 ppm or ≤10 ppm water by weight, based on the total weight of the electrolyte composition; or where the electrolyte composition contains ≤9, ≤8, ≤7, ≤6, ≤5 or ≤4 ppm water by weight, based on the total weight of the electrolyte composition.

E35. A cell according to any of embodiments 1-33 where the electrolyte composition comprises a solvent.

E36. A cell according to any of embodiments 1-33 where the electrolyte composition comprises a solvent consisting essentially of water.

E37. A cell according to any of embodiments 1-33 where the electrolyte composition comprises a solvent consisting essentially of organic solvent.

E38. A cell according to any of embodiments 1-33 where the electrolyte composition comprises a solvent comprising water and an organic solvent.

E39. A cell according to embodiment 38 where the weight: weight ratio of water to organic solvent is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E40. A cell according to any of embodiments 37-39 where the organic solvent comprises one or more solvents selected from the group consisting of organic carbonates, ethers, glymes, ortho esters, polyalklene glycols, esters, lactones, glycols, formates, sulfones, sulfoxides, amides, alcohols, ketones, nitro solvents and nitrile solvents.

E41. A cell according to embodiment 40 where the electrolyte composition comprises an organic solvent such as an organic carbonate, for example a cyclic or acyclic organic carbonate such as ethylene carbonate (EC), propylene carbonate (PC), trimethylene carbonate, 1,2-butylene carbonate (BC), dimethyl carbonate (DMC), diethyl carbonate (DEC), ethylmethyl carbonate (EMC), vinylene carbonate, difluoroethylene carbonate or monofluoroethylene carbonate; or an ether or glyme such as dimethoxymethane (DMM), diethoxymethane, 1,2-dimethoxyethane (DME or ethyleneglycol dimethylether or glyme), diglyme, triglyme, tetraglyme, ethyleneglycol diethylether (DEE), ethyleneglycol dibutylether, diethyleneglycol diethylether, tetrahydrofuran (THF), 2-methyltetrahydrofuran (2-MeTHF), 1,3-dioxane, 1,3-dioxolane (DIOX), 4-methyl-1,3-dioxolane (4-MeDIOX), 2-methyl-1,3-dioxolane (2-MeDIOX), 1,4-dioxane, dimethylether, ethylmethylether, diethylether, di-n-butylether, di-t-butylether, di-isopropylether, methyl-t-butylether, ethyl-t-butylether or t-amyl-methylether; or an ortho ester such as trimethoxymethane, triethoxymethane, 1,4-dimethyl-3,5,8-trioxabicyclo[2.2.2]octane or 4-ethyl-1-methyl-3,5,8-trioxabicyclo[2.2.2]octane; or a polyalkylene glycol, that is a homo- or cooligomer or homo- or copolymer of $C_1$-$C_4$alkylene glycols, such as polyethylene glycol (PEG) or monomethyl, dimethyl or diethyl (end-capped) polyethylene glycol with weight average molecular weights (Mw) for example from about 200 to about 1200 g/mol, from about 200 to about 1000 g/mol, from about 200 to about 900 g/mol, from about 200 to about 700 g/mol or from about 200 to about 500 g/mol, for example oligomers of 4 monomers or more, for instance tetraethylene glycol, fluorinated tetraethylene glycol or tetrapropylene glycol, for instance PEG 200, PEG 300, PEG 400, PEG 500, PEG 600, PEG 700, PEG 800, PEG 900 or PEG 1000; or an ester or lactone such as γ-butyrolactone (GBL), γ-valerolactone, δ-valerolactone, ethyl acetate (EA), 2-methoxyethyl acetate, 2-ethoxyethyl acetate, 2-butoxyethyl acetate, 2-(2-butoxyethoxy)ethyl acetate (diethylene glycol butyl ether acetate, DBA), ethylene glycol diacetate (EGDA), 3-ethoxy ethyl propionate (EEP), methyl butyrate (MB), n-amyl acetate (NAAC), propylene glycol methyl ether acetate (PMA), ethyl butyrate (EB), diethyl malonate or dimethyl malonate; or a dibasic ester mixture such as methyl esters of adipic, glutaric or succinic acids; or a glycol such as ethylene glycol, propylene glycol, 2-methoxyethanol, 2-ethoxyethanol, 2-propoxyethanol, 2-isopropoxyethanol, 2-butoxyethanol (ethylene glycol butyl ether, EB), 2-phenoxyethanol, 2-benzyloxyethanol, 2-(2-methoxyethoxy)ethanol, 2-(2-ethoxyethoxy)ethanol, 2-(2-butoxyethoxy)ethanol (diethylene glycol butyl ether, DB), propylene glycol butyl ether (PB), propylene glycol methyl ether (PM), triethylene glycol (TEG), dipropylene glycol methyl ether (DPM), diethylene glycol methyl ether, 1,3-butanediol, 1,4-butanediol, 1,5-pentanediol, perfluoro-1,4-butanediol, perfluoro-1,5-butanediol, fluorinated diethylene glycol methyl ether, fluorinated triethylene glycol, fluorinated triethylene glycol methyl ether or fluorinated diethylene glycol butyl ether; or a formate such as methyl formate, ethyl formate, isobutyl formate or tert-butyl formate; or a sulfone or sulfoxide such as methylsulfonylmethane (MSM or dimethylsulfone), ethylmethylsulfone, sulfolane or dimethylsulfoxide (DMSO); or an amide such as dimethylformamide (DMF), dimethylacetamide (DMA), N-methylpyrrolidone (NMP), 2-pyrrolidone, 1,3-dimethyl-2-imidazolidinone (DMI), hexamethylphosphoramide (HMPA) or N,N'-dimethyl-N,N'-trimethyleneurea (1,3-dimethyl-3,4,5,6-tetrahydro-2(1H)-pyrimidinone (DMPU)); or an alcohol such as benzylalcohol (BA), ethanol, trifluoroethanol (2,2,2-trifluoroethanol), methanol, isopropanol, t-butanol or n-butanol; or a ketone such as methylethylketone (MEK) or methylisoamylketone (MIAK); or a nitro solvent such as nitrobenzene, nitromethane or nitroethane; or a nitrile solvent such as acetonitrile, propionitrile, butyronitrile or adiponitrile.

E42. A cell according to any of embodiments 1-33 and 35-41 where the electrolyte composition comprises a solvent and where the weight:weight ratio of ionic compounds in total to solvent is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E43. A cell according to any of embodiments 1-42 where the electrolyte composition further comprises one or more additives selected from the group consisting of corrosion inhibitors, solid electrolyte interface (SEI) improvers, proton evolution improvers, self-discharge inhibitors, anti-gassing agents, viscosity adjusting agents, cathode protection agents, salt stabilizers, conductivity improvers and solvating agents.

E44. A cell according to any of embodiments 1-43 where the electrolyte composition contains one or more additives selected from the group consisting of fluorinated oil, sodium stannate, sodium citrate or polyacrylic acids;

HF or KF, oxides or hydroxides of rare earths such as Y, metal porphines, for example Ni or Fe porphine, vinylene carbonate, vinylethylene carbonate, methylene ethylene carbonate or fluoro-ethylene carbonate;

polyglycols, polyglycol alkyl ethers, polyglycol alkyl phosphate esters or polysorbates such as polyethylene glycol (PEG), polypropylene glycol, polysorbate 20, polysorbate 40 or polysorbate 80 or a mixture of PEG 600 and polysorbate 20 or a mixture of PEG 600 and ZnO; phosphate ester-based surfactants, propane sultone or fluoropropane sultone; and DMSO;
for example at a level of from about 0.1% to about 15% by weight, based on the total weight of the electrolyte composition.

E45. A rechargeable electrochemical cell according to any of the preceding embodiments comprising a positive electrode, a casing having the electrodes positioned therein and the electrolyte composition in contact with the electrodes, where the gravimetric energy density of the cell is >100 Wh/kg, ≥110 Wh/kg, ≥115, ≥120, ≥125, ≥130, ≥135, ≥140, ≥145, ≥150, ≥155, ≥160, ≥165, ≥170, ≥175, ≥180, ≥185, ≥190, ≥195 or ≥200 Wh/kg and/or
where the volumetric energy density of the cell is >250 Wh/L, for instance, ≥260 Wh/kg, ≥265, ≥270, ≥275, ≥280, ≥285, ≥290, ≥295, ≥300, ≥305, ≥310, ≥315, ≥320, ≥325, ≥330, ≥335, ≥340, ≥345 or ≥350 Wh/kg and/or
where the discharge capacity of the hydrogen storage material is ≥800 mAh/g over 20 cycles or more (over at least 20 cycles), for example ≥810, ≥820, ≥825, ≥830, ≥835, ≥840, ≥845, ≥850, ≥855, ≥860, ≥865, ≥870, ≥875, ≥880 or ≥895 mAh/g over 20 cycles or more.

E46. A rechargeable electrochemical cell according to any of the preceding embodiments comprising a positive electrode, a casing having the electrodes positioned therein and the electrolyte composition in contact with the electrodes, where the reversible half cell charge/discharge electrochemical reaction at the negative electrode is

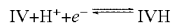

or

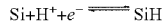

where
IV is a group IV element-based hydrogen storage material and
Si is a silicon-based hydrogen storage material.

E47. A cell according to any of the preceding embodiments comprising a positive electrode, the positive electrode comprising one or more cathode active materials selected from the group consisting of transition metals, transition metal oxides, transition metal hydroxides, transition metal oxide/hydroxides and transition metal fluorides; for example one or more materials selected from the group consisting of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;
oxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;
hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;
oxide/hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au; and
fluorides Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au.

Following are some more embodiments of the invention.

E1. A rechargeable electrochemical cell comprising a stable group IV element-based hydrogen storage negative electrode; for example a stable silicon-based or carbon-based hydrogen storage negative electrode; for example where the negative electrode comprises a hydrogen storage material comprising >27 wt % or one or more elements selected from the group consisting of C, Si, Ge and Sn, based on the total weight of the hydrogen storage material;
the cell also comprising a positive electrode, a casing having the electrodes positioned therein and an electrolyte composition in contact with the electrodes, where the reversible half cell charge/discharge electrochemical reaction at the negative electrode is

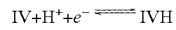

or

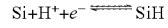

where
IV is a group IV element-based hydrogen storage material and
Si is a silicon-based hydrogen storage material.

E2. A cell according to embodiment 1 where the negative electrode comprises a hydrogen storage material comprising >27 wt % of one or more elements selected from the group consisting of C, Si, Ge and Sn; for example comprising >27 wt % silicon or >27 wt % carbon, based on the total weight of the hydrogen storage material.

E3. A cell according to embodiments 1 or 2 where the hydrogen storage material comprises amorphous silicon, microcrystalline silicon, nanocrystalline silicon, monocrystalline silicon, polycrystalline silicon, protocrystalline silicon or porous silicon.

E4. A cell according to any of the preceding embodiments where the hydrogen storage material comprises amorphous silicon.

E5. A cell according to any of the preceding embodiments where the hydrogen storage material comprises carbon; for example carbon in the form of natural graphite, artificial graphite, expanded graphite, graphene, carbon fiber, hard carbon, soft carbon, non-graphitizable carbon, carbon black, carbon nanotube, fullerene, activated carbon, crystalline carbon or amorphous carbon.

E6. A cell according to any of the preceding embodiments where the hydrogen storage material comprises an alloy of silicon and one or more of carbon, germanium and tin, for example amorphous silicon carbide or an alloy of silicon and germanium or an alloy of silicon and tin.

E7. A cell according to any of the preceding embodiments where the hydrogen storage material is hydrogenated prior to assembly of the cell (a pre-hydrogenated negative electrode); for example where the hydrogen storage material is hydrogenated amorphous silicon (a-Si:H) or hydrogenated amorphous silicon carbide (a-Si$_{1-x}$C$_x$:H, where x is for example from about 0.01 to about 0.99, from about 0.05 to about 0.95 or from about 0.1 to about 0.9).

E8. A cell according to any of the preceding embodiments where the hydrogen storage material, for example amorphous silicon, is comprised in a film, for example a film with a thickness >20 nm, ≥50 nm, ≥90 nm, ≥120 nm or ≥180 nm or from about 90 nm to about 10 μm, from about 100 nm to about 5 μm, from about 150 nm to about 3 μm, from about 150 nm to about 2 μm or from about 150 nm to about 1 μm.

E9. A cell according to any of the preceding embodiments where the hydrogen storage material is comprised in a film in adherence to a substrate, for example a substrate selected from metal, glass, inorganics and plastic.

E10. A cell according to any of the preceding embodiments where the hydrogen storage material comprises one or more further elements, for example one or more elements selected from the group consisting B, Al, Ga, In, As, Sb, Te and transition metals.

E11. A cell according to any of the preceding embodiments where the hydrogen storage material contains ≥28 wt %, ≥29 wt %, ≥30 wt %, ≥35 wt %, ≥40 wt %, ≥45 wt %, ≥50 wt %, ≥55 wt %, ≥60 wt %, ≥65 wt %, ≥70 wt %, ≥75 wt %, ≥80 wt %, ≥85 wt %, ≥90 wt %, ≥95 wt %, ≥96 wt %, ≥97 wt %, ≥98 wt % or ≥99 wt % of one or more elements selected from the group consisting of group IV elements, for example Si and/or C, based on the total weight of the hydrogen storage material.

E12. A cell according to any of the preceding embodiments where the negative electrode comprises ≥30% by weight of the one or more group IV elements; for example ≥35%, ≥40%, ≥45%, ≥50%, ≥55%, ≥60%, ≥65%, ≥70%, ≥75%≥80%, ≥85% or ≥90% by weight of the one or more group IV elements, for example Si and/or C, based on the total weight of the negative electrode.

E13. A cell according to any of the preceding embodiments where the negative electrode further comprises one or more components selected from the group consisting of binders, conductive materials and other additives.

E14. A cell according to any of the preceding embodiments where the negative electrode comprises a solid electrolyte interface capable of allowing transport of protons.

E15. An cell according to any of the preceding embodiments where the hydrogen storage material includes one or more further elements selected from the group consisting of structural modifiers (elements to promote the amorphous phase of a material), hydrogen bond strength modifiers and solid electrolyte interface (SEI) modifiers; for example one or more further elements selected from the group consisting of B, alkaline earth metals, transition metals, rare earth metals, other metals of groups III or V of the periodic table, O, F, P, Cl and the like.

E16. A cell according to any of the preceding embodiments where the electrolyte composition which is neutral or acidic, for example having a pH of about 7 or lower; for example from about 1, from about 2, from about 3, from about 4, from about 5 or from about 6 to about 7.

E17. A cell according to any of the preceding embodiments where the electrolyte composition comprises one or more ionic compounds selected from the group consisting of protic acids, protic ammonium compounds, protic oxonium compounds, aprotic ammonium compounds, aprotic oxonium compounds, aprotic phosphonium compounds and alkali or alkali earth metal salts.

E18. A cell according to any of the preceding embodiments where the electrolyte composition comprises an ionic compound containing a cation selected from the group consisting of $NH_4^+$ (ammonium), methylammonium, ethylammonium, dimethylammonium, diethylammonium, trimethylammonium ($NMe_3H^+$), triethylammonium, tributylammonium, diethylmethylammonium, hydroxyethylammonium, methoxymethylammonium, dibutylammonium, methylbutylammonium, anilinium, pyridinium, 2-methylpyridinium, imidazolium, 1-methylimidazolium, 1,2-dimethylimidazolium, imidazolinium, 1-ethylimidazolium, 1-(4-sulfobutyl)-3-methylimidazolium, 1-allylimidazolium, quinolinium, isoquinolinium, pyrrolinium, pyrrolininium or pyrrolidinium;
1-butyl-1-methylpyrrolidinium, tetramethylammonium, tetraethylammonium, tetra-n-butylammonium, n-butyl-tri-ethylammonium, benzyl-tri-methylammonium, tri-n-butylmethylammonium, benzyl-tri-ethylammonium, 1-methylpyridinium, 1-butyl-3,5-dimethylpyridinium, 1,2,4-trimethylpyrazolium, trimethylhydroxyethylammonium (choline), tri-(hydroxyethyl)methylammonium, dimethyl-di(polyoxyethylene)ammonium, 1,2,3-trimethylimidazolium, 1-butyl-3-methylimidazolium, 1-ethyl-2,3-dimethylimidazolium, 1-allyl-3-methylimidazolium, 1-hydroxyethyl-3-methylimidazolium, 1,3-dimethylimidazolium, 1-ethyl-1-methylpiperidinium, 4-ethyl-4-methylmorpholinium, 1-(cyanomethyl)-3-methylimidazolium, 1-(3-cyanopropyl)pyridinium, 1,3-bis(cyanomethyl)imidazolium, 1-hexyl-3-methylimidazolium or 1-ethyl-3-methylimidazolium; and methyltriphenylphosphonium, tetraphenylphosphonium, tetrabutylphosphonium, tributylmethylphosphonium, triethylmethylphosphonium, trihexyltetradecylphosphonium, triphenylpropylphosphonium or tetrakis(hydroxymethyl)phosphonium;
for instance, the cation is 1-ethyl-3-methylimidazolium, 1-hexyl-3-methylimidazolium, 1-butyl-1-methylpyrrolidinium or trihexyl(tetradecyl)phosphonium.

E19. A cell according to any of the preceding embodiments where the electrolyte composition comprises an ionic compound containing an anion selected from the group consisting of carboxylates, imides, methides, nitrate, bifluoride, halides, borates, phosphates, phosphinates, phosphonates, sulfonates, sulfates, carbonates and aluminates.

E20. A cell according to any of the preceding embodiments where the electrolyte composition comprises an ionic compound containing an anion selected from the group consisting of $[F_zB(C_mF_{2m+1})_{4-z}]^-$, $[F_yP(C_mF_{2m+1})_{6-y}]^-$, $[(C_mF_{2m+1})_2P(O)O]^-$, $[C_mF_{2m+1}P(O)O_2]^{2-}$, $[O-C(O)-C_mF_{2m+1}]^-$, $[O-S(O)_2-C_mF_{2m+1}]^-$, $[N(C(O)-C_mF_{2m+1})_2]^-$, $[N(S(O)_2-C_mF_{2m+1})_2]^-$, $[N(C(O)-C_mF_{2m+1})(S(O)_2-C_mF_{2m+1})]^-$, $[N(C(O)-C_mF_{2m+1})(C(O)F)]^-$, $[N(S(O)_2-C_mF_{2m+1})(S(O)_2F)]^-$, $[N(S(O)_2F)_2]^-$, $[C(C(O)-C_mF_{2m+1})_3]^-$, $[C(S(O)_2-C_mF_{2m+1})_3]^-$,

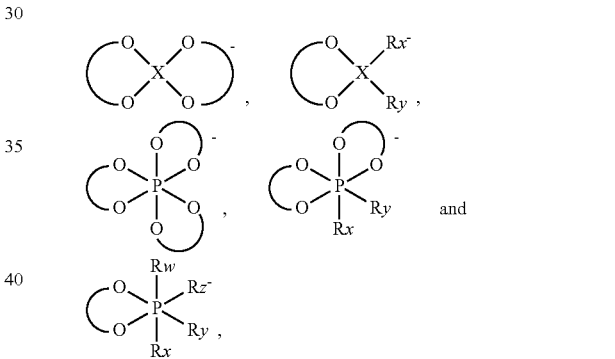

where
y is an integer of 1 to 6,
m is an integer of 1 to 8, for instance 1 to 4,
z is an integer of 1 to 4,
X is B or Al and
$R_w$, $R_x$, $R_y$ and $R_z$ are independently halogen, $C_1$-$C_{20}$alkyl, $C_1$-$C_{20}$alkyl which is partly or fully fluorinated, $C_1$-$C_{20}$alkoxy, $C_1$-$C_{20}$alkoxy which is partly or fully fluorinated, $C_1$-$C_{20}$alkyl-COO or $C_1$-$C_{20}$alkyl-COO which is partly or fully fluorinated and is independently a bidentate group derived from the —OH groups of a 1,2- or 1,3-diol, a 1,2- or 1,3-dicarboxylic acid or from a 1,2- or 1,3-hydroxycarboxylic acid and where any one $CF_2$ group may be replaced by O, $S(O)_2$, NR or $CH_2$.

E21. A cell according to any of the preceding embodiments where the electrolyte composition comprises an ionic compound containing an anion selected from the group consisting of $F_2P(C_2F_5)_4^-$, $F_3P(C_2F_5)_3^-$, $F_4P(C_2F_5)_2^-$, $F_2P(C_3$ $F_7)_4^-$, $F_3P(C_3F_7)_3^-$, $F_4P(C_3F_7)_2^-$, $F_2P(C_4F_9)_4^-$, $F_3P(C_4F_9)_3^-$, $F_4P(C_4F_9)_2^-$, perfluoroalkylcarboxylate, perfluoroalkylsulfonate, bis(perfluoroalkylsulfonyl)imide, (perfluoroalkylsulfonyl)(perfluoroalkylcarboxyl)imide, tris(perfluoroalkylsulfonyl)methide, trifluoroacetate, trifluoromethanesulfonate (triflate), bis(trifluoromethylsulfonyl)imide, tris(trifluoromethylsulfonyl)methide, tetrafluoroborate or a spiro-oxo borate or spiro-oxo phosphate, for example bisoxalatoborate (BOB), difluorooxalatoborate (dFOB), di(trifluoroacetato)oxalatoborate (d(Ac)OB), trisoxalatophosphate, tetrafluorooxalatophosphate and di(trifluoroacetato)oxalatoaluminate.

E22. A cell according to any of the preceding embodiments where the electrolyte composition comprises an ionic compound containing a carboxylate anion of formula $RCOO^-$ where R is hydrogen or hydrocarbyl; such as formate, acetate (ethanoate), acrylate, propanoate, n-butanoate, i-butanoate, n-pentanoate, i-pentanoate, octanoate, decanoate, benzoate, salicylate, thiosalicylate, 2-, 3- or 4-nitrobenzoate; citrate, oxalate, tartrate, glycolate, gluconate, malate, mandelate, a carboxylate of nitrilotriacetic acid, a carboxylate of N-(2-hydroxyethyl)-ethylenediaminetriacetic acid, a carboxylate of ethylenediaminetetraacetic acid, a carboxylate of diethylenetriaminepentaacetic acid or a haloalkylcarboxylate such as fluoroacetate, difluoroacetate, trifluoroacetate, chloroacetate, dichloroacetate or trichloroacetate.

E23. A cell according to any of the preceding embodiments where the electrolyte composition comprises an ionic compound containing an imide anion such as dicyanamide, $N(SO_2F)_2^-$ ((bisfluorosulfonyl)imide), a bis(perfluoroalkylsulfonyl)imide such as $[N(SO_2CF_3)_2]^-$ (bistriflimide), bis(pentafluoroethylsulfonyl)imide or $N(CF_3SO_2)(CF_3(CF_2)_3SO_2)^-$ or a (perfluoroalkylsulfonyl)(perfluoroalkylcarboxyl)imide; or a methide such as a tris(perfluoroalkylsulfonyl)methide, for example tris(trifluoromethylsulfonyl)methide, $C(CF_3SO_2)_3^-$; or bifluoride ($HF_2^-$); or chloride, bromide, iodide or fluoride; or a borate such as orthoborate, tetrahydroxyborate, tetraborate, tetraphenylborate, $[B(3,5-(CF_3)_2C_6H_3)_4]^-$ (BARF), $B(C_2O_4)_2^-$ (bis(oxalato)borate) (BOB), difluoro(oxalato)borate (dFOB), di(trifluoroacetato)oxalatoborate (D(Ac)OB), $B(C_6F_5)_4^-$ or $BF_4^-$ (tetrafluoroborate); or a phosphate such as dihydrogen phosphate, hydrogen phosphate, alkyl phosphate, dialkyl phosphate, phosphate, $PF_6^-$ (hexafluorophosphate), $HPO_3F^-$ (fluorohydrogen phosphate), trisoxalatophosphate (TOP), tetrafluorooxalatophosphate (TFOP) or a fluoro(perfluoroalkyl)phosphate such as $F_2P(C_2F_5)_4^-$, $F_3P(C_2F_5)_3^-$ (tris(pentafluoroethyl)trifluorophosphate or FAP), $F_4P(C_2F_5)_2^-$, $F_2P(C_3F_7)_4^-$, $F_3P(C_3F_7)_3^-$, $F_4P(C_3F_7)_2^-$, $F_2P(C_4F_9)_4^-$, $F_3P(C_4F_9)_3^-$ or $F_4P(C_4F_9)_2^-$; or a sulfonate such as an alkylsulfonate, arylsulfonate or perfluoroalkylsulfonate, for instance trifluoromethanesulfonate (triflate), p-toluenesulfonate (tosylate) or methanesulfonate (mesylate); or a sulfate such as hydrogensulfate, sulfate, thiosulfate or an alkylsulfate such as methylsulfate or ethylsulfate; or a carbonate anion such as carbonate, hydrogencarbonate or an alkylcarbonate such as methylcarbonate, ethylcarbonate or butylcarbonate; or an aluminate such as $Al(OC(CF_3)_3)_4^-$, di(trifluoroacetato)oxalatoaluminate (d(Ac)OAl), tetrachloroaluminate, tetrafluoroaluminate, tetraiodoaluminate or tetrabromoaluminate.

E24. A cell according to any of the preceding embodiments where the electrolyte composition comprises an ionic liquid.

E25. A cell according to any of the preceding embodiments where the electrolyte composition comprises an ionic liquid selected from the group consisting of diethylmethylammonium trifluoromethanesulfonate (DEMA TfO), ethylammonium nitrate, triethylammonium methanesulfonate, 2-methylpyridinium trifluoromethanesulfonate, ammonium fluoride, methylammonium nitrate, hydroxyethylammonium nitrate, ethylammonium nitrate, dimethylammonium nitrate, 1-methylimidazolium nitrate, 1-ethylimidazolium nitrate, t-butylammonium tetrafluoroborate, hydroxyethylammonium tetrafluoroborate, methylbutylammonium tetrafluoroborate, triethylammonium tetrafluoroborate, imidazolium tetrafluoroborate, 1-methylimidazolium tetrafluoroborate, 1,2-dimethylimidazolium tetrafluoroborate, t-butylammonium triflate, 2-fluoropyridinium triflate, hydroxyethylammonium triflate, 1,2-dimethylimidazolium triflate, imidazolium triflate, 1-methylimidazolium hydrogensulfate, 1-methylimidazolium chloride, 1-methylimidazolium triflate, hydronium triflate, methylammonium mesylate, ethylammonium mesylate, butylammonium mesylate, methoxyethylammonium mesylate, dimethylammonium mesylate, dibutylammonium mesylate, triethylammonium mesylate, dimethylethylammonium mesylate, hydronium hydrogensulfate, ammonium hydrogensulfate, methylammonium hydrogensulfate, ethylammonium hydrogensulfate, propylammonium hydrogensulfate, n-butylammonium hydrogensulfate, t-butylammonium hydrogensulfate, dimethylammonium hydrogensulfate, diethylammonium hydrogensulfate, di-n-butylammonium hydrogensulfate, methylbutylammonium hydrogensulfate, ethylbutylammonium hydrogensulfate, trimethylammonium hydrogensulfate, triethylammonium hydrogensulfate, tributylammonium hydrogensulfate, dimethylethylammonium hydrogensulfate, dibutylammonium fluorohydrogen phosphate, triethylammonium fluorohydrogen phosphate, tributylammonium fluorohydrogen phosphate, hydronium dihydrogen phosphate, methylammonium dihydrogen phosphate, ethylammonium dihydrogen phosphate, propylammonium dihydrogen phosphate, n-butylammonum dihydrogen phosphate, methoxyethylammonium dihydrogen phosphate, dimethylammonium dihydrogen phosphate, dibutylammonium dihydrogen phosphate, methylbutylammonium dihydrogen phosphate, ammonium bifluoride, methylammonium bifluoride, ethylammonium bifluoride and dimethylammonium bifluoride.

E26. A cell according to any of the preceding embodiments where the electrolyte composition comprises an ionic liquid selected from the group consisting of 1-ethyl-3-methylimidazolium trifluoromethanesulfonate (EMIM TfO), 1-ethyl-3-methylimidazolium tetrafluoroborate (EMIM $BF_4$), 1-ethyl-3-methylimidazolium bis(trifluoromethylsulfonyl)imide (EMIM TFSI), 1-ethyl-3-methylimidazolium acetate (EMIM Ac), 1-butyl-3-methylimidazolium trifluoromethanesulfonate (BMIM TfO), 1-butyl-3-methylimidazolium acetate (BMIM Ac), 1-butyl-3-methylimidazolium bis(trifluoromethylsulfonyl)imide (BMIM TFSI), tri-n-butylmethylammonium methylsulfate, 1-ethyl-2,3-dimethylimidazolium ethylsulfate, 1-butyl-3-methylimidazolium thiocyanate, 1-butyl-3-methylimidazolium tetrachloroaluminate, 1-butyl-3-methylimidazolium methylsulfate, 1-butyl-3-methylimidazolium methanesulfonate, 1-butyl-3-methylimidazolium hydrogencarbonate, 1-butyl-3-methylimidazolium hydrogensulfate, 1-butyl-3-methylimidazolium chloride, 1,2,3-trimethylimidazolium methylsulfate, tris-(hydroxyethyl)methylammonium methylsulfate, 1,2,4-trimethylpyrazolium methylsulfate, 1,3-dimethylimdiazolium hydrogencarbonate, 1-ethyl-3-methylimidazolium hydrogencarbonate, 1-ethyl-3- methylimidazolium chloride, 1-ethyl-3-methylimidazolium tetrachloroaluminate, 1-ethyl-3-methylimidazolium thiocyanate, 1-ethyl-3-methylimidazolium methanesulfonate, 1-ethyl-3-methylimidazolium hydrogensulfate, 1-ethyl-3-methylimidazolium ethylsulfate, 1-ethyl-3-methylimidazolium nitrate, 1-butylpyridinium chloride, 1-ethyl-3-methylimidazolium dicyanamide, 1-ethyl-3-methylimidazolium hexafluorophosphate, 1-butyl-3,5-dimethylpyridinium bromide, 1-ethyl-3-methylimidazolium bis(pentafluoroethylsulfonyl)imide, 1-ethyl-2,3-dimethylimidazolium methylcarbonate, carboxymethyl-tributylphosphonium bis(trifluoromethylsulfonyl)imide, N-carboxyethyl-methylpyrrolidinium bis(trifluoromethylsulfonyl)imide, N-carboxymethyl-trimethylammonium bis(trifluoromethylsulfonyl)imide, N-carboxymethyl-methylpyridinium bis(trifluoromethylsulfonyl)imide, hexyltrimethylammonium bis(trifluromethylsulfonyl)imide, tetrabutylphosphonium methanesulfonate, triethylmethylammonium methylcarbonate, 1-ethyl-1-methylpiperidinium methylcarbonate, 4-ethyl-4-methylmorpholinium methylcarbonate, 1-butyl-1-methylpyrrolidinium methylcarbonate, triethylmethylammonium dibutylphosphate, tributylmethylphosphonium dibutylphosphate, triethylmethylphosphonium dibutylphosphate, tetrabutylphosphonium tetrafluoroborate, tetrabutylphosphonium p-toluenesulfonate, tributylmethylphosphonium methylcarbonate, 1-ethyl-3-methylimidazolium hydrogencarbonate, tributylmethylammonium methylcarbonate, tributylmethylammonium dibutylphosphate, 1-ethyl-3-methylimidazolium dibutylphosphate, 1-butyl-3-methylimidazolium dibutylphosphate, 1-(cyanomethyl)-3-methylimidazolium chloride, 1-(3-cyanopropyl)-3-methylimidazolium chloride, 1-(3-cyanopropyl)-3-methylimidazolium bis(trifluoromethylsulfonyl)imide, 1-(3-cyanopropyl)-3-methylimidazolium dicyanamide, 1-(3-cyanopropyl)pyridinium chloride, 1-(3-cyanopropyl)pyridinium bis(trifluoromethylsulfonyl)imide, 1,3-bis(cyanomethyl)imidazolium chloride, 1,3-bis(cyanomethyl)imidazolium bis(trifluoromethylsulfonyl)imide, 1,3-bis(cyanopropyl)imidazolium chloride, 1,3-bis(3-cyanopropyl)imidazolium bis(trifluoromethylsulfonyl)imide, 1-butyl-3-methylimidazolium hexafluorophosphate, 1-butyl-3-methylimidazolium tetrafluoroborate, 1-ethyl-3-methylimidazolium tetrafluoroborate, 1-ethyl-3-methylimidazolium chloride, 1-ethyl-3-methylimidazolium bromide, 1-butyl-3-methylimidazolium bromide, 1-hexyl-3-methylimidazolium chloride, tributylmethylphosphonium methylsulfate, triethylmethylphosphonium dibutylphosphate, trihexyltetradecylphosphonium bis(trifluromethylsulfonyl)imide, trihexyltetradecylphosphonium bis(2,4,4-trimethylphenyl)phosphinate, trihexyltetradecylphosphonium bromide, trihexyltetradecylphosphonium chloride, trihexyltetradecylphosphonium decanoate, trihexyltetradecylphosphonium dicyanamide, 3-(triphenylphosphonio)propane-1-sulfonate and 3-(triphenylphosphonio)propane-1-sulfonic acid tosylate.

E27. A cell according to any of the preceding embodiments where the electrolyte composition comprises a protic acid; for example a protic acid such as
hydrochloric acid, nitric acid, phosphoric acid, sulfuric acid, boric acid, hydrofluoric acid, hydrobromic acid, hydroiodic acid, perchloric acid or periodic acid; or
a bisulfate such as sodium bisulfate, potassium bisulfate or ammonium bisulfate; or
$HAsF_6$, $HBF_4$, $H(OEt_2)BF_4$, $HPF_6$, $H[N(SO_2CF_3)_2]$ or $H[N(SO_2CF_2CF_3)_2]$.

E28. A cell according to any of the preceding embodiments where the electrolyte composition comprises an organic protic acid such as a carboxylic acid of formula RCOOH where R is hydrogen or hydrocarbyl, for example formic acid, acetic acid, acrylic acid, fluoroacetic acid, difluoroacetic acid, trifluoroacetic acid, chloroacetic acid, dichloroacetic acid, trichloroacetic acid, propanoic acid, butyric acid, 3-methylbutanoic acid, valeric acid, hexanoic acid, heptanoic acid, caprylic acid, nonanoic acid, benzoic acid, salicylic acid, 2-, 3- or 4-nitrobenzoic acid; citric acid, oxalic acid, tartaric acid, glycolic acid, gluconic acid, malic acid, mandelic acid, nitrilotriacetic acid, N-(2-hydroxyethyl)-ethylenediaminetriacetic acid, ethylenediaminetetraacetic acid or diethyleneaminepentaacetic acid.

E29. A cell according to any of the preceding embodiments where the electrolyte composition comprises a protic sulfonic acid of formula $RSO_3H$ where R is alkyl or aryl or alkyl or aryl substituted by one to three halogens, such as p-toluenesulfonic acid, phenylsulfonic acid, methanesulfonic acid or trifluoromethanesulfonic acid.

E30. A cell according to any of the preceding embodiments where the electrolyte composition comprises a protic acid which is an oxonium ion associated with a highly non-coordinating ion such as Brookhart's acid (BARF acid), $[H(OEt_2)_2][B[3,5-(CF_3)_2C_6H_3]_4]$, $[H(OEt_2)_2][B(C_6F_5)_4]$ (oxonium acid) or $[H(OEt_2)_2][Al(OC(CF_3)_3)_4]$.

E31. A cell according to any of the preceding embodiments where the electrolyte composition comprises at least two different ionic compounds; for example, where the electrolyte composition comprises
a protic ionic compound and an aprotic ionic compound;
two different protic ionic compounds;
two different aprotic ionic compounds;
two different salts;
two different ionic liquids;
a salt and an ionic liquid, for example a protic or aprotic ammonium salt or an alkali metal salt such as an alkai metal halide;
a protic acid, protic ammonium compound or a protic oxonium compound and an ionic liquid, for example a carboxylic acid and an ionic liquid.

E32. A cell according to any of the preceding embodiments where the electrolyte composition comprises two different ionic compounds which contain an identical cation or an identical anion.

E33. A cell according to any of the preceding embodiments where electrolyte composition comprises two different ionic compounds with a weight:weight ratio of from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E34. A cell according to any of the preceding embodiments where the electrolyte composition contains no organic solvent and ≤1000 ppm, ≤100 ppm or ≤10 ppm water by weight, based on the total weight of the electrolyte composition; or where the electrolyte composition contains ≤9, ≤8, ≤7, ≤6, ≤5 or ≤4 ppm water by weight, based on the total weight of the electrolyte composition.

E35. A cell according to any of embodiments 1-33 where the electrolyte composition comprises a solvent.

E36. A cell according to any of embodiments 1-33 where the electrolyte composition comprises a solvent consisting essentially of water.

E37. A cell according to any of embodiments 1-33 where the electrolyte composition comprises a solvent consisting essentially of organic solvent.

E38. A cell according to any of embodiments 1-33 where the electrolyte composition comprises a solvent comprising water and an organic solvent.

E39. A cell according to embodiment 38 where the weight:weight ratio of water to organic solvent is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E40. A cell according to any of embodiments 37-39 where the organic solvent comprises one or more solvents selected from the group consisting of organic carbonates, ethers, glymes, ortho esters, polyalklene glycols, esters, lactones, glycols, formates, sulfones, sulfoxides, amides, alcohols, ketones, nitro solvents and nitrile solvents.

E41. A cell according to embodiment 40 where the electrolyte composition comprises an organic solvent such as an organic carbonate, for example a cyclic or acyclic organic carbonate such as ethylene carbonate (EC), propylene carbonate (PC), trimethylene carbonate, 1,2-butylene carbonate (BC), dimethyl carbonate (DMC), diethyl carbonate (DEC), ethylmethyl carbonate (EMC), vinylene carbonate, difluoroethylene carbonate or monofluoroethylene carbonate; or an ether or glyme such as dimethoxymethane (DMM), diethoxymethane, 1,2-dimethoxyethane (DME or ethyleneglycol dimethylether or glyme), diglyme, triglyme, tetraglyme, ethyleneglycol diethylether (DEE), ethyleneglycol dibutylether, diethyleneglycol diethylether, tetrahydrofuran (THF), 2-methyltetrahydrofuran (2-MeTHF), 1,3-dioxane, 1,3-dioxolane (DIOX), 4-methyl-1,3-dioxolane (4-MeDIOX), 2-methyl-1,3-dioxolane (2-MeDIOX), 1,4-dioxane, dimethylether, ethylmethylether, diethylether, di-n-butylether, di-t-butylether, di-isopropylether, methyl-t-butylether, ethyl-t-butylether or t-amyl-methylether; or an ortho ester such as trimethoxymethane, triethoxymethane, 1,4-dimethyl-3,5,8-trioxabicyclo[2.2.2]octane or 4-ethyl-1-methyl-3,5,8-trioxabicyclo[2.2.2]octane; or a polyalkylene glycol, that is a homo- or cooligomer or homo- or copolymer of $C_1$-$C_4$alkylene glycols, such as polyethylene glycol (PEG) or monomethyl, dimethyl or diethyl (end-capped) polyethylene glycol with weight average molecular weights (Mw) for example from about 200 to about 1200 g/mol, from about 200 to about 1000 g/mol, from about 200 to about 900 g/mol, from about 200 to about 700 g/mol or from about 200 to about 500 g/mol, for example oligomers of 4 monomers or more, for instance tetraethylene glycol, fluorinated tetraethylene glycol or tetrapropylene glycol, for instance PEG 200, PEG 300, PEG 400, PEG 500, PEG 600, PEG 700, PEG 800, PEG 900 or PEG 1000; or an ester or lactone such as γ-butyrolactone (GBL), γ-valerolactone, δ-valerolactone, ethyl acetate (EA), 2-methoxyethyl acetate, 2-ethoxyethyl acetate, 2-butoxyethyl acetate, 2-(2-butoxyethoxy)ethyl acetate (diethylene glycol butyl ether acetate, DBA), ethylene glycol diacetate (EGDA), 3-ethoxy ethyl propionate (EEP), methyl butyrate (MB), n-amyl acetate (NAAC), propylene glycol methyl ether acetate (PMA), ethyl butryate (EB), diethyl malonate or dimethyl malonate; or a dibasic ester mixture such as methyl esters of adipic, glutaric or succinic acids; or a glycol such as ethylene glycol, propylene glycol, 2-methoxyethanol, 2-ethoxyethanol, 2-propoxyethanol, 2-isopropoxyethanol, 2-butoxyethanol (ethylene glycol butyl ether, EB), 2-phenoxyethanol, 2-benzyloxyethanol, 2-(2-methoxyethoxy)ethanol, 2-(2-ethoxyethoxy)ethanol, 2-(2-butoxyethoxy)ethanol (diethylene glycol butyl ether, DB), propylene glycol butyl ether (PB), propylene glycol methyl ether (PM), triethylene glycol (TEG), dipropylene glycol methyl ether (DPM), diethylene glycol methyl ether, 1,3-butanediol, 1,4-butanediol, 1,5-pentanediol, perfluoro-1,4-butanediol, perfluoro-1,5-butanediol, fluorinated diethylene glycol methyl ether, fluorinated triethylene glycol, fluorinated triethylene glycol methyl ether or fluorinated diethylene glycol butyl ether; or a formate such as methyl formate, ethyl formate, isobutyl formate or tert-butyl formate; or a sulfone or sulfoxide such as methylsulfonylmethane (MSM or dimethylsulfone), ethylmethylsulfone, sulfolane or dimethylsulfoxide (DMSO); or an amide such as dimethylformamide (DMF), dimethylacetamide (DMA), N-methylpyrrolidone (NMP), 2-pyrrolidone, 1,3-dimethyl-2-imidazolidinone (DMI), hexamethylphosphoramide (HMPA) or N,N'-dimethyl-N,N'-trimethyleneurea (1,3-dimethyl-3,4,5,6-tetrahydro-2(1H)-pyrimidinone (DMPU)); or an alcohol such as benzylalcohol (BA), ethanol, trifluoroethanol (2,2,2-trifluoroethanol), methanol, isopropanol, t-butanol or n-butanol; or a ketone such as methylethylketone (MEK) or methyl-isoamylketone (MIAK); or a nitro solvent such as nitrobenzene, nitromethane or nitroethane; or a nitrile solvent such as acetonitrile, propionitrile, butyronitrile or adiponitrile.

E42. A cell according to any of embodiments 1-33 and 35-41 where the electrolyte composition comprises a solvent and where the weight:weight ratio of ionic compounds in total to solvent is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E43. A cell according to any of embodiments 1-42 where the electrolyte composition further comprises one or more additives selected from the group consisting of corrosion inhibitors, solid electrolyte interface (SEI) improvers, proton evolution improvers, self-discharge inhibitors, anti-gassing agents, viscosity adjusting agents, cathode protection agents, salt stabilizers, conductivity improvers and solvating agents.

E44. A cell according to any of embodiments 1-43 where the electrolyte composition contains one or more additives selected from the group consisting of fluorinated oil, sodium stannate, sodium citrate or polyacrylic acids;

HF or KF, oxides or hydroxides of rare earths such as Y, metal porphines, for example Ni or Fe porphine, vinylene carbonate, vinylethylene carbonate, methylene ethylene carbonate or fluoro-ethylene carbonate;

polyglycols, polyglycol alkyl ethers, polyglycol alkyl phosphate esters or polysorbates such as polyethylene glycol (PEG), polypropylene glycol, polysorbate 20, polysorbate 40 or polysorbate 80 or a mixture of PEG 600 and polysorbate 20 or a mixture of PEG 600 and ZnO; phosphate ester-based surfactants, propane sultone or fluoropropane sultone; and

DMSO;

for example at a level of from about 0.1% to about 15% by weight, based on the total weight of the electrolyte composition.

E45. A rechargeable electrochemical cell according to any of the preceding embodiments comprising a positive electrode, a casing having the electrodes positioned therein and the electrolyte composition in contact with the electrodes, where the gravimetric energy density of the cell is >100 Wh/kg, ≥110 Wh/kg, ≥115, ≥120, ≥125, ≥130, ≥135, ≥140, ≥145, ≥150, ≥155, ≥160, ≥165, ≥170, ≥175, ≥180, ≥185, ≥190, ≥195 or ≥200 Wh/kg and/or where the volumetric energy density of the cell is >250 Wh/L, for instance, ≥260 Wh/kg, ≥265, ≥270, ≥275, ≥280, ≥285, ≥290, ≥295, ≥300, ≥305, ≥310, ≥315, ≥320, ≥325, ≥330, ≥335, ≥340, ≥345 or ≥350 Wh/kg and/or where the discharge capacity of the hydrogen storage material is ≥800 mAh/g over 20 cycles or more (over at least 20 cycles), for example ≥810, ≥820, ≥825, ≥830, ≥835, ≥840, ≥845, ≥850, ≥855, ≥860, ≥865, ≥870, ≥875, ≥880 or ≥895 mAh/g over 20 cycles or more.

E46. A cell according to any of the preceding embodiments comprising a positive electrode, the positive electrode comprising one or more cathode active materials selected from the group consisting of transition metals, transition metal oxides, transition metal hydroxides, transition metal oxide/hydroxides and transition metal fluorides; for example one or more materials selected from the group consisting of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;

oxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;

hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;

oxide/hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au; and fluorides Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au.

Below are more embodiments of the invention.

E1. A rechargeable electrochemical cell comprising a stable group IV element-based hydrogen storage negative electrode; for example a stable silicon-based or carbon-based hydrogen storage negative electrode; for example where the electrode comprises a hydrogen storage material comprising >27 wt % of one or more elements selected from the group consisting of C, Si, Ge and Sn, based on the total weight of the hydrogen storage material;

the cell also comprising a positive electrode, a casing having the electrodes positioned therein and an electrolyte composition in contact with the electrodes, where the gravimetric energy density of the cell is >100 Wh/kg, ≥110 Wh/kg, ≥115, ≥120, ≥125, ≥130, ≥135, ≥140, ≥145, ≥150, ≥155, ≥160, ≥165, ≥170, ≥175, ≥180, ≥185, ≥190, ≥195 or ≥200 Wh/kg and/or where the volumetric energy density of the cell is >250 Wh/L, for instance, ≥260 Wh/kg, ≥265, ≥270, ≥275, ≥280, ≥285, ≥290, ≥295, ≥300, ≥305, ≥310, ≥315, ≥320, ≥325, ≥330, ≥335, ≥340, ≥345 or ≥350 Wh/kg and/or where the discharge capacity of the hydrogen storage material is ≥800 mAh/g over 20 cycles or more (over at least 20 cycles), for example ≥810, ≥820, ≥825, ≥830, ≥835, ≥840, ≥845, ≥850, ≥855, ≥860, ≥865, ≥870, ≥875, ≥880 or ≥895 mAh/g over 20 cycles or more.

E2. A cell according to embodiment 1 where the negative electrode comprises a hydrogen storage material comprising >27 wt % of one or more elements selected from the group consisting of C, Si, Ge and Sn; for example comprising >27 wt % silicon or >27 wt % carbon, based on the total weight of the hydrogen storage material.

E3. A cell according to embodiments 1 or 2 where the hydrogen storage material comprises amorphous silicon, microcrystalline silicon, nanocrystalline silicon, monocrystalline silicon, polycrystalline silicon, protocrystalline silicon or porous silicon.

E4. A cell according to any of the preceding embodiments where the hydrogen storage material comprises amorphous silicon.

E5. A cell according to any of the preceding embodiments where the hydrogen storage material comprises carbon; for example carbon in the form of natural graphite, artificial graphite, expanded graphite, graphene, carbon fiber, hard carbon, soft carbon, non-graphitizable carbon, carbon black, carbon nanotube, fullerene, activated carbon, crystalline carbon or amorphous carbon.

E6. A cell according to any of the preceding embodiments where the hydrogen storage material comprises an alloy of silicon and one or more of carbon, germanium and tin, for example amorphous silicon carbide or an alloy of silicon and germanium or an alloy of silicon and tin.

E7. A cell according to any of the preceding embodiments where the hydrogen storage material is hydrogenated prior to assembly of the cell (a pre-hydrogenated negative electrode); for example where the hydrogen storage material is hydrogenated amorphous silicon (a-Si:H) or hydrogenated amorphous silicon carbide (a-$Si_{1-x}C_x$:H, where x is for example from about 0.01 to about 0.99, from about 0.05 to about 0.95 or from about 0.1 to about 0.9).

E8. A cell according to any of the preceding embodiments where the hydrogen storage material, for example amorphous silicon, is comprised in a film, for example a film with a thickness >20 nm, ≥50 nm, ≥90 nm, ≥120 nm or ≥180 nm or from about 90 nm to about 10 μm, from about 100 nm to about 5 μm, from about 150 nm to about 3 μm, from about 150 nm to about 2 μm or from about 150 nm to about 1 μm.

E9. A cell according to any of the preceding embodiments where the hydrogen storage material is comprised in a film in adherence to a substrate, for example a substrate selected from metal, glass, inorganics and plastic.

E10. A cell according to any of the preceding embodiments where the hydrogen storage material comprises one or more further elements, for example one or more elements selected from the group consisting B, Al, Ga, In, As, Sb, Te and transition metals.

E11. A cell according to any of the preceding embodiments where the hydrogen storage material contains ≥28 wt %, ≥29 wt %, ≥30 wt %, ≥35 wt %, ≥40 wt %, ≥45 wt %, ≥50 wt %, ≥55 wt %, ≥60 wt %, ≥65 wt %, ≥70 wt %, ≥75 wt %, ≥80 wt %, ≥85 wt %, ≥90 wt %, ≥95 wt %, ≥96 wt %, ≥97 wt %, ≥98 wt % or ≥99 wt % of one or more elements selected from the group consisting of group IV elements, for example Si and/or C, based on the total weight of the hydrogen storage material.

E12. A cell according to any of the preceding embodiments where the negative electrode comprises ≥30% by weight of the one or more group IV elements; for example ≥35%, ≥40%, ≥45%, ≥50%, ≥55%, ≥60%, ≥65%, ≥70%, ≥75%≥80%, ≥85% or ≥90% by weight of the one or more group IV elements, for example Si and/or C, based on the total weight of the negative electrode.

E13. A cell according to any of the preceding embodiments where the negative electrode further comprises one or more components selected from the group consisting of binders, conductive materials and other additives.

E14. A cell according to any of the preceding embodiments where the negative electrode comprises a solid electrolyte interface capable of allowing transport of protons.

E15. An cell according to any of the preceding embodiments where the hydrogen storage material includes one or more further elements selected from the group consisting of structural modifiers (elements to promote the amorphous phase of a material), hydrogen bond strength modifiers and solid electrolyte interface (SEI) modifiers; for example one or more further elements selected from the group consisting of B, alkaline earth metals, transition metals, rare earth metals, other metals of groups III or V of the periodic table, O, F, P, Cl and the like.

E16. A cell according to any of the preceding embodiments where the electrolyte composition is neutral or acidic, for example having a pH of about 7 or lower; for example from about 1, from about 2, from about 3, from about 4, from about 5 or from about 6 to about 7.

E17. A cell according to any of the preceding embodiments where the electrolyte composition comprises one or more ionic compounds selected from the group consisting of protic acids, protic ammonium compounds, protic oxonium compounds, aprotic ammonium compounds, aprotic oxonium compounds, aprotic phosphonium compounds and alkali or alkali earth metal salts.

E18. A cell according to any of the preceding embodiments where the electrolyte composition comprises an ionic compound containing a cation selected from the group consisting of $NH_4^+$ (ammonium), methylammonium, ethylammonium, dimethylammonium, diethylammonium, trimethylammonium ($NMe_3H^+$), triethylammonium, tributylammonium, diethylmethylammonium, hydroxyethylammonium, methoxymethylammonium, dibutylammonium, methylbutylammonium, anilinium, pyridinium, 2-methylpyridinium, imidazolium, 1-methylimidazolium, 1,2-dimethylimidazolium, imidazolinium, 1-ethylimidazolium, 1-(4-sulfobutyl)-3-methylimidazolium, 1-allylimidazolium, quinolinium, isoquinolinium, pyrrolinium, pyrrolininium or pyrrolidinium;

1-butyl-1-methylpyrrolidinium, tetramethylammonium, tetraethylammonium, tetra-n-butylammonium, n-butyl-tri-ethylammonium, benzyl-tri-methylammonium, tri-n-butylmethylammonium, benzyl-tri-ethylammonium, 1-methylpyridinium, 1-butyl-3,5-dimethylpyridinium, 1,2,4-trimethylpyrazolium, trimethylhydroxyethylammonium (choline), tri-(hydroxyethyl)methylammonium, dimethyl-di(polyoxyethylene)ammonium, 1,2,3-trimethylimidazolium, 1-butyl-3-methylimidazolium, 1-ethyl-2,3-dimethylimidazolium, 1-allyl-3-methylimidazolium, 1-hydroxyethyl-3-methylimidazolium, 1,3-dimethylimidazolium, 1-ethyl-1-methylpiperidinium, 4-ethyl-4-methylmorpholinium, 1-(cyanomethyl)-3-methylimidazolium, 1-(3-cyanopropyl)pyridinium, 1,3-bis(cyanomethyl)imidazolium, 1-hexyl-3-methylimidazolium or 1-ethyl-3-methylimidazolium; and methyltriphenylphosphonium, tetraphenylphosphonium, tetrabutylphosphonium, tributylmethylphosphonium, triethylmethylphosphonium, trihexyltetradecylphosphonium, triphenylpropylphosphonium or tetrakis(hydroxymethyl)phosphonium;

for instance, the cation is 1-ethyl-3-methylimidazolium, 1-hexyl-3-methylimidazolium, 1-butyl-1-methylpyrrolidinium or trihexyl(tetradecyl)phosphonium.

E19. A cell according to any of the preceding embodiments where the electrolyte composition comprises an ionic compound containing an anion selected from the group consisting of carboxylates, imides, methides, nitrate, bifluoride, halides, borates, phosphates, phosphinates, phosphonates, sulfonates, sulfates, carbonates and aluminates.

E20. A cell according to any of the preceding embodiments where the electrolyte composition comprises an ionic compound containing an anion selected from the group consisting of $[F_zB(C_mF_{2m+1})_{4-z}]^-$, $[F_yP(C_mF_{2m+1})_{6-y}]^-$, $[(C_mF_{2m+1})_2P(O)O]^-$, $[C_mF_{2m+1}P(O)O_2]^{2-}$, $[O-C(O)-C_mF_{2m+1}]^-$, $[O-S(O)_2-C_mF_{2m+1}]^-$, $[N(C(O)-C_mF_{2m+1})_2]^-$, $[N(S(O)_2-C_mF_{2m+1})_2]^-$, $[N(C(O)-C_mF_{2m+1})(S(O)_2-C_mF_{2m+1})]^-$, $[N(C(O)-C_mF_{2m+1})(C(O)F)]^-$, $[N(S(O)_2-C_mF_{2m+1})(S(O)_2F)]^-$, $[N(S(O)_2F)_2]^-$, $[C(C(O)-C_mF_{2m+1})_3]^-$, $[C(S(O)_2-C_mF_{2m+1})_3]^-$,

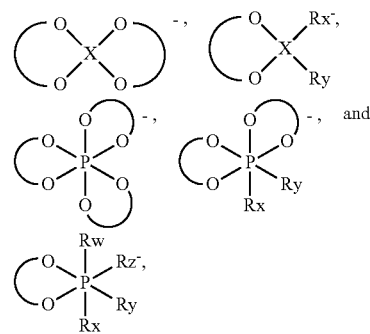

where
y is an integer of 1 to 6,
m is an integer of 1 to 8, for instance 1 to 4,
z is an integer of 1 to 4,
X is B or Al and
$R_w$, $R_x$, $R_y$ and $R_z$ are independently halogen, $C_1$-$C_{20}$alkyl, $C_1$-$C_{20}$alkyl which is partly or fully fluorinated, $C_1$-$C_{20}$alkoxy, $C_1$-$C_{20}$alkoxy which is partly or fully fluorinated, $C_1$-$C_{20}$alkyl-COO or $C_1$-$C_{20}$alkyl-COO which is partly or fully fluorinated and

is independently a bidentate group derived from the —OH groups of a 1,2- or 1,3-diol, a 1,2- or 1,3-dicarboxylic acid or from a 1,2- or 1,3-hydroxycarboxylic acid and where any one $CF_2$ group may be replaced by O, $S(O)_2$, NR or $CH_2$.

E21. A cell according to any of the preceding embodiments where the electrolyte composition comprises an ionic compound containing an anion selected from the group consisting of $F_2P(C_2F_5)_4^-$, $F_3P(C_2F_5)_3^-$, $F_4P(C_2F_5)_2^-$, $F_2P(C_3F_7)_4^-$, $F_3P(C_3F_7)_3^-$, $F_4P(C_3F_7)_2^-$, $F_2P(C_4F_9)_4^-$, $F_3P(C_4F_9)_3^-$, $F_4P(C_4F_9)_2^-$, perfluoroalkylcarboxylate, perfluoroalkylsulfonate, bis(perfluoroalkylsulfonyl)imide, (perfluoroalkylsulfonyl)(perfluoroalkylcarboxyl)imide, tris(perfluoroalkylsulfonyl)methide, trifluoroacetate, trifluoromethanesulfonate (triflate), bis(trifluoromethylsulfonyl)imide, tris(trifluoromethylsulfonyl)methide, tetrafluoroborate or a spiro-oxo borate or spiro-oxo phosphate, for example bisoxalatoborate (BOB), difluorooxalatoborate (dFOB), di(trifluoroacetato)oxalatoborate (d(Ac)OB), trisoxalatophosphate, tetrafluorooxalatophosphate and di(trifluoroacetato)oxalatoaluminate.

E22. A cell according to any of the preceding embodiments where the electrolyte composition comprises an ionic compound containing a carboxylate anion of formula $RCOO^-$ where R is hydrogen or hydrocarbyl; such as formate, acetate (ethanoate), acrylate, propanoate, n-butanoate, i-butanoate, n-pentanoate, i-pentanoate, octanoate, decanoate, benzoate, salicylate, thiosalicylate, 2-, 3- or 4-nitrobenzoate; citrate, oxalate, tartrate, glycolate, gluconate, malate, mandelate, a carboxylate of nitrilotriacetic acid, a carboxylate of N-(2-hydroxyethyl)-ethylenediaminetriacetic acid, a carboxylate of ethylenediaminetetraacetic acid, a carboxylate of diethylenetriaminepentaacetic acid or a haloalkylcarboxylate such as fluoroacetate, difluoroacetate, trifluoroacetate, chloroacetate, dichloroacetate or trichloroacetate.

E23. A cell according to any of the preceding embodiments where the electrolyte composition comprises an ionic compound containing an imide anion such as dicyanamide, $N(SO_2F)_2^-$ ((bisfluorosulfonyl)imide), a bis(perfluoroalkylsulfonyl)imide such as $[N(SO_2CF_3)_2]^-$ (bistriflimide), bis(pentafluoroethylsulfonyl)imide or $N(CF_3SO_2)(CF_3(CF_2)SO_2)^-$ or a (perfluoroalkylsulfonyl)(perfluoroalkylcarboxyl)imide; or a methide such as a tris(perfluoroalkylsulfonyl)methide, for example tris(trifluoromethylsulfonyl)methide, $C(CF_3SO_2)_3^-$; or bifluoride ($HF_2^-$); or chloride, bromide, iodide or fluoride; or a borate such as orthoborate, tetrahydroxyborate, tetraborate, tetraphenylborate, $[B(3,5-(CF_3)_2C_6H_3)_4]^-$ (BARF), $B(C_2O_4)_2^-$ (bis(oxalato)borate) (BOB), difluoro(oxalato)borate (dFOB), di(trifluoroacetato)oxalatoborate (D(Ac)OB), $B(C_6F_5)_4^-$ or $BF_4^-$ (tetrafluoroborate); or a phosphate such as dihydrogen phosphate, hydrogen phosphate, alkyl phosphate, dialkyl phosphate, phosphate, $PF_6^-$ (hexafluorophosphate), $HPO_3F^-$ (fluorohydrogen phosphate), trisoxalatophosphate (TOP), tetrafluorooxalatophosphate (TFOP) or a fluoro(perfluoroalkyl)phosphate such as $F_2P(C_2F_5)_4^-$, $F_3P(C_2F_5)_3^-$ (tris(pentafluoroethyl)trifluorophosphate or FAP), $F_4P(C_2F_5)_2^-$, $F_2P(C_3F_7)_4^-$, $F_3P(C_3F_7)_3^-$, $F_4P(C_3F_7)_2^-$, $F_2P(C_4F_9)_4^-$, $F_3P(C_4F_9)_3^-$ or $F_4P(C_4F_9)_2^-$; or a sulfonate such as an alkylsulfonate, arylsulfonate or perfluoroalkylsulfonate, for instance trifluoromethanesulfonate (triflate), p-toluenesulfonate (tosylate) or methanesulfonate (mesylate); or a sulfate such as hydrogensulfate, sulfate, thiosulfate or an alkylsulfate such as methylsulfate or ethylsulfate; or a carbonate anion such as carbonate, hydrogencarbonate or an alkylcarbonate such as methylcarbonate, ethylcarbonate or butylcarbonate; or an aluminate such as $Al(OC(CF_3)_3)_4^-$, di(trifluoroacetato) oxalatoaluminate (d(Ac)OAl), tetrachloroaluminate, tetrafluoroaluminate, tetraiodoaluminate or tetrabromoaluminate.

E24. A cell according to any of the preceding embodiments where the electrolyte composition comprises an ionic liquid.

E25. A cell according to any of the preceding embodiments where the electrolyte composition comprises an ionic liquid selected from the group consisting of diethylmethylammonium trifluoromethanesulfonate (DEMA TfO), ethylammonium nitrate, triethylammonium methanesulfonate, 2-methylpyridinium trifluoromethanesulfonate, ammonium fluoride, methylammonium nitrate, hydroxyethylammonium nitrate, ethylammonium nitrate, dimethylammonium nitrate, 1-methylimidazolium nitrate, 1-ethylimidazolium nitrate, t-butylammonium tetrafluoroborate, hydroxyethylammonium tetrafluoroborate, methylbutylammonium tetrafluoroborate, triethylammonium tetrafluoroborate, imidazolium tetrafluoroborate, 1-methylimidazolium tetrafluoroborate, 1,2-dimethylimidazolium tetrafluoroborate, t-butylammonium triflate, 2-fluoropyridinium triflate, hydroxyethylammonium triflate, 1,2-dimethylimidazolium triflate, imidazolium triflate, 1-methylimidazolium hydrogensulfate, 1-methylimidazolium chloride, 1-methylimidazolium triflate, hydronium triflate, methylammonium mesylate, ethylammonium mesylate, butylammonium mesylate, methoxyethylammonium mesylate, dimethylammonium mesylate, dibutylammonium mesylate, triethylammonium mesylate, dimethylethylammonium mesylate, hydronium hydrogensulfate, ammonium hydrogensulfate, methylammonium hydrogensulfate, ethylammonium hydrogensulfate, propylammonium hydrogensulfate, n-butylammonium hydrogensulfate, t-butylammonium hydrogensulfate, dimethylammonium hydrogensulfate, diethylammonium hydrogensulfate, di-n-butylammonium hydrogensulfate, methylbutylammonium hydrogensulfate, ethylbutylammonium hydrogensulfate, trimethylammonium hydrogensulfate, triethylammonium hydrogensulfate, tributylammonium hydrogensulfate, dimethylethylammonium hydrogensulfate, dibutylammonium fluorohydrogen phosphate, triethylammonium fluorohydrogen phosphate, tributylammonium fluorohydrogen phosphate, hydronium dihydrogen phosphate, methylammonium dihydrogen phosphate, ethylammonium dihydrogen phosphate, propylammonium dihydrogen phosphate, n-butylammonum dihydrogen phosphate, methoxyethylammonium dihydrogen phosphate, dimethylammonium dihydrogen phosphate, dibutylammonium dihydrogen phosphate, methylbutylammonium dihydrogen phosphate, ammonium bifluoride, methylammonium bifluoride, ethylammonium bifluoride and dimethylammonium bifluoride.

E26. A cell according to any of the preceding embodiments where the electrolyte composition comprises an ionic liquid selected from the group consisting of 1-ethyl-3-methylimidazolium trifluoromethanesulfonate (EMIM TfO), 1-ethyl-3-methylimidazolium tetrafluoroborate (EMIM $BF_4$), 1-ethyl-3-methylimidazolium bis(trifluoromethylsulfonyl) imide (EMIM TFSI), 1-ethyl-3-methylimidazolium acetate (EMIM Ac), 1-butyl-3-methylimidazolium trifluoromethanesulfonate (BMIM TfO), 1-butyl-3-methylimidazolium acetate (BMIM Ac), 1-butyl-3-methylimidazolium bis(trifluoromethylsulfonyl)imide (BMIM TFSI), tri-n-butylmethylammonium methylsulfate, 1-ethyl-2,3-dimethylimidazolium ethylsulfate, 1-butyl-3-methylimidazolium thiocyanate, 1-butyl-3-methylimidazolium tetrachloroaluminate, 1-butyl-3-methylimidazolium methylsulfate, 1-butyl-3-methylimidazolium methanesulfonate, 1-butyl-3-methylimidazolium hydrogencarbonate, 1-butyl-3-methylimidazolium hydrogensulfate, 1-butyl-3-methylimidazolium chloride, 1,2,3-trimethylimidazolium methylsulfate, tris-(hydroxyethyl)methylammonium methylsulfate, 1,2,4-trimethylpyrazolium methylsulfate, 1,3-dimethylimdiazolium hydrogencarbonate, 1-ethyl-3-methylimidazolium hydrogencarbonate, 1-ethyl-3-methylimidazolium chloride, 1-ethyl-3-methylimidazolium tetrachloroaluminate, 1-ethyl-3-methylimidazolium thiocyanate, 1-ethyl-3-methylimidazolium methanesulfonate, 1-ethyl-3-methylimidazolium hydrogensulfate, 1-ethyl-3-methylimidazolium ethylsulfate, 1-ethyl-3-methylimidazolium nitrate, 1-butylpyridinium chloride, 1-ethyl-3-methylimidazolium dicyanamide, 1-ethyl-3-methylimidazolium hexafluorophosphate, 1-butyl-3,5-dimethylpyridinium bromide, 1-ethyl-3-methylimidazolium bis(pentafluoroethylsulfonyl)imide, 1-ethyl-2,3-dimethylimidazolium methylcarbonate, carboxymethyl-tributylphosphonium bis(trifluoromethylsulfonyl)imide, N-carboxyethylmethylpyrrolidinium bis(trifluoromethylsulfonyl)imide, N-carboxymethyl-trimethylammonium bis(trifluoromethylsulfonyl)imide, N-carboxymethyl-methylpyridinium bis(trifluoromethylsulfonyl)imide, hexyltrimethylammonium bis(trifluromethylsulfonyl)imide, tetrabutylphosphonium methanesulfonate, triethylmethylammonium methylcarbonate, 1-ethyl-1-methylpiperidinium methylcarbonate, 4-ethyl-4-methylmorpholinium methylcarbonate, 1-butyl-1-methylpyrrolidinium methylcarbonate, triethylmethylammonium dibutylphosphate, tributylmethylphosphonium dibutylphosphate, triethylmethylphosphonium dibutylphosphate, tetrabutylphosphonium tetrafluoroborate, tetrabutylphosphonium p-toluenesulfonate, tributylmethylphosphonium methylcarbonate, 1-ethyl-3-methylimidazolium hydrogencarbonate, tributylmethylammonium methylcarbonate, tributylmethylammonium dibutylphosphate, 1-ethyl-3-methylimidazolium dibutylphosphate, 1-butyl-3-methylimidazolium dibutylphosphate, 1-(cyanomethyl)-3-methylimidazolium chloride, 1-(3-cyanopropyl)-3-methylimidazolium chloride, 1-(3-cyanopropyl)-3-methylimidazolium bis(trifluoromethylsulfonyl)imide, 1-(3-cyanopropyl)-3-methylimidazolium dicyanamide, 1-(3-cyanopropyl)pyridinium chloride, 1-(3-cyanopropyl)pyridinium bis(trifluoromethylsulfonyl)imide, 1,3-bis(cyanomethyl)imidazolium chloride, 1,3-bis(cyanomethyl)imidazolium bis(trifluoromethylsulfonyl)imide, 1,3-bis(cyanopropyl)imidazolium chloride, 1,3-bis(3-cyanopropyl)imidazolium bis(trifluoromethylsulfonyl)imide, 1-butyl-3-methylimidazolium hexafluorophosphate, 1-butyl-3-methylimidazolium tetrafluoroborate, 1-ethyl-3-methylimidazolium tetrafluoroborate, 1-ethyl-3-methylimidazolium chloride, 1-ethyl-3-methylimidazolium bromide, 1-butyl-3-methylimidazolium bromide, 1-hexyl-3-methylimidazolium chloride, tributylmethylphosphonium methylsulfate, triethylmethylphosphonium dibutylphosphate, trihexyltetradecylphosphonium bis(trifluromethylsulfonyl)imide, trihexyltetradecylphosphonium bis(2,4,4-trimethylphenyl)phosphinate, trihexyltetradecylphosphonium bromide, trihexyltetradecylphosphonium chloride, trihexyltetradecylphosphonium decanoate, trihexyltetradecylphosphonium dicyanamide, 3-(triphenylphosphonio)propane-1-sulfonate and 3-(triphenylphosphonio)propane-1-sulfonic acid tosylate.

E27. A cell according to any of the preceding embodiments where the electrolyte composition comprises a protic acid; for example a protic acid such as
hydrochloric acid, nitric acid, phosphoric acid, sulfuric acid, boric acid, hydrofluoric acid, hydrobromic acid, hydroiodic acid, perchloric acid or periodic acid; or
a bisulfate such as sodium bisulfate, potassium bisulfate or ammonium bisulfate; or
$HAsF_6$, $HBF_4$, $H(OEt_2)BF_4$, $HPF_6$, $H[N(SO_2CF_3)_2]$ or $H[N(SO_2CF_2CF_3)_2]$.

E28. A cell according to any of the preceding embodiments where the electrolyte composition comprises an organic protic acid such as a carboxylic acid of formula RCOOH where R is hydrogen or hydrocarbyl, for example formic acid, acetic acid, acrylic acid, fluoroacetic acid, difluoroacetic acid, trifluoroacetic acid, chloroacetic acid, dichloroacetic acid, trichloroacetic acid, propanoic acid, butyric acid, 3-methylbutanoic acid, valeric acid, hexanoic acid, heptanoic acid, caprylic acid, nonanoic acid, benzoic acid, salicylic acid, 2-, 3- or 4-nitrobenzoic acid; citric acid, oxalic acid, tartaric acid, glycolic acid, gluconic acid, malic acid, mandelic acid, nitrilotriacetic acid, N-(2-hydroxyethyl)-ethylenediaminetriacetic acid, ethylenediaminetetraacetic acid or diethyleneaminepentaacetic acid.

E29. A cell according to any of the preceding embodiments where the electrolyte composition comprises a protic sulfonic acid of formula $RSO_3H$ where R is alkyl or aryl or alkyl or aryl substituted by one to three halogens, such as p-toluenesulfonic acid, phenylsulfonic acid, methanesulfonic acid or trifluoromethanesulfonic acid.

E30. A cell according to any of the preceding embodiments where the electrolyte composition comprises a protic acid which is an oxonium ion associated with a highly non-coordinating ion such as Brookhart's acid (BARF acid), $[H(OEt_2)_2][B[3,5-(CF_3)_2C_6H_3]_4]$, $[H(OEt_2)_2][B(C_6F_5)_4]$ (oxonium acid) or $[H(OEt_2)_2][Al(OC(CF_3)_3)_4]$.

E31. A cell according to any of the preceding embodiments where the electrolyte composition comprises at least two different ionic compounds; for example, where the electrolyte composition comprises
a protic ionic compound and an aprotic ionic compound;
two different protic ionic compounds;
two different aprotic ionic compounds;
two different salts;
two different ionic liquids;
a salt and an ionic liquid, for example a protic or aprotic ammonium salt or an alkali metal salt such as an alkai metal halide;
a protic acid, protic ammonium compound or a protic oxonium compound and an ionic liquid, for example a carboxylic acid and an ionic liquid.

E32. A cell according to any of the preceding embodiments where the electrolyte composition comprises two different ionic compounds which contain an identical cation or an identical anion.

E33. A cell according to any of the preceding embodiments where electrolyte composition comprises two different ionic compounds with a weight:weight ratio of from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E34. A cell according to any of the preceding embodiments where the electrolyte composition contains no organic solvent and ≤1000 ppm, ≤100 ppm or ≤10 ppm water by weight, based on the total weight of the electrolyte composition; or where the electrolyte composition contains ≤9, ≤8, ≤7, ≤6, ≤5 or ≤4 ppm water by weight, based on the total weight of the electrolyte composition.

E35. A cell according to any of embodiments 1-33 where the electrolyte composition comprises a solvent.

E36. A cell according to any of embodiments 1-33 where the electrolyte composition comprises a solvent consisting essentially of water.

E37. A cell according to any of embodiments 1-33 where the electrolyte composition comprises a solvent consisting essentially of organic solvent.

E38. A cell according to any of embodiments 1-33 where the electrolyte composition comprises a solvent comprising water and an organic solvent.

E39. A cell according to embodiment 38 where the weight:weight ratio of water to organic solvent is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E40. A cell according to any of embodiments 37-39 where the organic solvent comprises one or more solvents selected from the group consisting of organic carbonates, ethers, glymes, ortho esters, polyalklene glycols, esters, lactones, glycols, formates, sulfones, sulfoxides, amides, alcohols, ketones, nitro solvents and nitrile solvents.

E41. A cell according to embodiment 40 where the electrolyte composition comprises an organic solvent such as
an organic carbonate, for example a cyclic or acyclic organic carbonate such as ethylene carbonate (EC), propylene carbonate (PC), trimethylene carbonate, 1,2-butylene carbonate (BC), dimethyl carbonate (DMC), diethyl carbonate (DEC), ethylmethyl carbonate (EMC), vinylene carbonate, difluoroethylene carbonate or monofluoroethylene carbonate; or an ether or glyme such as dimethoxymethane (DMM), diethoxymethane, 1,2-dimethoxyethane (DME or ethyleneglycol dimethylether or glyme), diglyme, triglyme, tetraglyme, ethyleneglycol diethylether (DEE), ethyleneglycol dibutylether, diethyleneglycol diethylether, tetrahydrofuran (THF), 2-methyltetrahydrofuran (2-MeTHF), 1,3-dioxane, 1,3-dioxolane (DIOX), 4-methyl-1,3-dioxolane (4-MeDIOX), 2-methyl-1,3-dioxolane (2-MeDIOX), 1,4-dioxane, dimethylether, ethylmethylether, diethylether, di-n-butylether, di-t-butylether, di-isopropylether, methyl-t-butylether, ethyl-t-butylether or t-amyl-methylether; or an ortho ester such as trimethoxymethane, triethoxymethane, 1,4-dimethyl-3,5,8-trioxabicyclo[2.2.2]octane or 4-ethyl-1-methyl-3,5,8-trioxabicyclo[2.2.2]octane; or a polyalkylene glycol, that is a homo- or cooligomer or homo- or copolymer of $C_1$-$C_4$alkylene glycols, such as polyethylene glycol (PEG) or monomethyl, dimethyl or diethyl (end-capped) polyethylene glycol with weight average molecular weights (Mw) for example from about 200 to about 1200 g/mol, from about 200 to about 1000 g/mol, from about 200 to about 900 g/mol, from about 200 to about 700 g/mol or from about 200 to about 500 g/mol, for example oligomers of 4 monomers or more, for instance tetraethylene glycol, fluorinated tetraethylene glycol or tetrapropylene glycol, for instance PEG 200, PEG 300, PEG 400, PEG 500, PEG 600, PEG 700, PEG 800, PEG 900 or PEG 1000; or an ester or lactone such as γ-butyrolactone (GBL), γ-valerolactone, δ-valerolactone, ethyl acetate (EA), 2-methoxyethyl acetate, 2-ethoxyethyl acetate, 2-butoxyethyl acetate, 2-(2-butoxyethoxy)ethyl acetate (diethylene glycol butyl ether acetate, DBA), ethylene glycol diacetate (EGDA), 3-ethoxy ethyl propionate (EEP), methyl butyrate (MB), n-amyl acetate (NAAC), propylene glycol methyl ether acetate (PMA), ethyl butryate (EB), diethyl malonate or dimethyl malonate; or a dibasic ester mixture such as methyl esters of adipic, glutaric or succinic acids; or a glycol such as ethylene glycol, propylene glycol, 2-methoxyethanol, 2-ethoxyethanol, 2-propoxyethanol, 2-isopropoxyethanol, 2-butoxyethanol (ethylene glycol butyl ether, EB), 2-phenoxyethanol, 2-benzyloxyethanol, 2-(2-methoxyethoxy)ethanol, 2-(2-ethoxyethoxy)ethanol, 2-(2-butoxyethoxy)ethanol (diethylene glycol butyl ether, DB), propylene glycol butyl ether (PB), propylene glycol methyl ether (PM), triethylene glycol (TEG), dipropylene glycol methyl ether (DPM), diethylene glycol methyl ether, 1,3-butanediol, 1,4-butanediol, 1,5-pentanediol, perfluoro-1,4-butanediol, perfluoro-1,5-butanediol, fluorinated diethylene glycol methyl ether, fluorinated triethylene glycol, fluorinated triethylene glycol methyl ether or fluorinated diethylene glycol butyl ether; or a formate such as methyl formate, ethyl formate, isobutyl formate or tert-butyl formate; or a sulfone or sulfoxide such as methylsulfonylmethane (MSM or dimethylsulfone), ethylmethylsulfone, sulfolane or dimethylsulfoxide (DMSO); or an amide such as dimethylformamide (DMF), dimethylacetamide (DMA), N-methylpyrrolidone (NMP), 2-pyrrolidone, 1,3-dimethyl-2-imidazolidinone (DMI), hexamethylphosphoramide (HMPA) or N,N'-dimethyl-N,N'-trimethyleneurea (1,3-dimethyl-3,4,5,6-tetrahydro-2(1H)-pyrimidinone (DMPU)); or an alcohol such as benzylalcohol (BA), ethanol, trifluoroethanol (2,2,2-trifluoroethanol), methanol, isopropanol, t-butanol or n-butanol; or a ketone such as methylethylketone (MEK) or methylisoamylketone (MIAK); or a nitro solvent such as nitrobenzene, nitromethane or nitroethane; or a nitrile solvent such as acetonitrile, propionitrile, butyronitrile or adiponitrile.

E42. A cell according to any of embodiments 1-33 and 35-41 where the electrolyte composition comprises a solvent and where the weight:weight ratio of ionic compounds in total to solvent is from about 99.9:0.1 to about 0.1:99.9, from about 99.5:0.5 to about 0.5:99.5, from about 99:1 to about 1:99, from about 95:5 to about 5:95, from about 90:10 to about 10:90, from about 80:20 to about 20:80, from about 70:30 to about 30:70 or from about 60:40 to about 40:60.

E43. A cell according to any of embodiments 1-42 where the electrolyte composition further comprises one or more additives selected from the group consisting of corrosion inhibitors, solid electrolyte interface (SEI) improvers, proton evolution improvers, self-discharge inhibitors, anti-gassing agents, viscosity adjusting agents, cathode protection agents, salt stabilizers, conductivity improvers and solvating agents.

E44. A cell according to any of embodiments 1-43 where the electrolyte composition contains one or more additives selected from the group consisting of fluorinated oil, sodium stannate, sodium citrate or polyacrylic acids;

HF or KF, oxides or hydroxides of rare earths such as Y, metal porphines, for example Ni or Fe porphine, vinylene carbonate, vinylethylene carbonate, methylene ethylene carbonate or fluoro-ethylene carbonate;

polyglycols, polyglycol alkyl ethers, polyglycol alkyl phosphate esters or polysorbates such as polyethylene glycol (PEG), polypropylene glycol, polysorbate 20, polysorbate 40 or polysorbate 80 or a mixture of PEG 600 and polysorbate 20 or a mixture of PEG 600 and ZnO; phosphate ester-based surfactants, propane sultone or fluoropropane sultone; and

DMSO;

for example at a level of from about 0.1% to about 15% by weight, based on the total weight of the electrolyte composition.

E45. A cell according to any of the preceding embodiments where the reversible half cell charge/discharge electrochemical reaction at the negative electrode is $$IV + H^+ + e^- \rightleftharpoons IVH$$

or $$Si + H^+ + e^- \rightleftharpoons SiH$$

where

IV is a group IV element-based hydrogen storage material and

Si is a silicon-based hydrogen storage material.

E46. A cell according to any of the preceding embodiments comprising a positive electrode, the positive electrode comprising one or more cathode active materials selected from the group consisting of transition metals, transition metal oxides, transition metal hydroxides, transition metal oxide/hydroxides and transition metal fluorides; for example one or more materials selected from the group consisting of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;

oxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;

hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;

oxide/hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au; and fluorides Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au.

Example 1

A present anode is employed in a SWAGELOK cell assembly. A smaller anode is employed and therefore limits the capacity.

An anode is prepared via chemical vapor deposition of amorphous silicon on a nickel substrate. The anode is 0.94 cm$^2$ with an amorphous silicon film thickness of about 250 nm and a film mass of 51.7 μg. Thickness is measured with a scanning electron microscope (SEM). The cathode is sintered nickel hydroxide on a nickel mesh substrate. The electrolyte composition is 2 molar acetic acid in 1-ethyl-3-methylimidazolium acetate.

The cell is cycled at a charge/discharge current density of 387 mA/g. The cell exhibits stable charge/discharge characteristics after 25 cycles as demonstrated in FIG. 1. The anode exhibits a charge plateau at ca. 1.4 V and a discharge plateau at ca. 1.2 V and a specific capacity of ca. 889 mAh/g at the 20$^{th}$ cycle.

A 100 g anode alloy containing 1 weight percent (wt %) hydrogen (1 g or 1 mol) will have a capacity of 96500 A·sec (Faraday's constant) or 26.8 A·hour or 268 mAh/g of alloy. As present film exhibits a capacity of 889 mAh/g, the film charges 889/268=3.3 wt % hydrogen. This equates to greater than 0.9H atoms charged per Si atom: 1 g/mol (H)/28 g/mol (Si)=3.57 wt %; 3.3/3.57=0.92H per Si atom.

Example 2

Example 1 is repeated, with the cell charged at a rate of 408 mA/g for 10 hours and discharged at 510, 1020, 2041 and 4082 mA/g to provide discharge capacities of 2604, 1681, 1080 and 647 mAh/g respectively.

Example 3

Hydrogenated amorphous silicon (a-Si:H) thin films are deposited on nickel foil substrates in an AMAT P5000 plasma enhanced chemical vapor deposition (PECVD) system. To enhance the conductivity of the films, n-type doped a-Si:H thin films are obtained in-situ by the addition of phosphine in the working gas. The gas flow for PECVD is 60 sccm silane, 460 sccm helium and 40 sccm 5% phosphine in helium. The substrate temperature is 100° C., radio frequency (rf) power is 30 W and working pressure is 3 Torr during deposition. The deposition time is 125 s and the average thickness of the as-deposited a-Si:H thin films is 247 nm. In addition to the CVD process, amorphous silicon samples are also prepared by an rf-sputtering technique, a kind of physical vapor deposition (PVD). Non-hydrogenated a-Si films are deposited on nickel substrates by rf-sputtering, followed by a subsequent ex-situ hydrogenation treatment. The sputter deposition source is an 800 diameter planar silicon target constructed of segments of monocrystalline silicon wafers (0.001 Ωcm, boron-doped) bonded to the sputtering cathode backing plate. Typical sputter deposition parameters include a gas flow of 3 sccm argon, 8 mTorr glow discharge pressure, an rf (13.56 MHz) power of 486 W (1.5 W cm$^{-2}$) and a target-substrate distance of 74 mm, with substrates held close to room temperature. Substrates are located in fixed positions underneath the target, and maximum deposition rates of approximately 125 Å min$^{-1}$ are obtained in the racetrack region under these conditions. Post-deposition ex-situ hydrogenation treatments are conducted in a steel reactor vessel used in the pressure-concentration-temperature measurement. Variables of peak pressure (1 MPa and 6 MPa), peak temperature (300° C. and 500° C.), and anneal time (2 h and 20 min) are employed.

The non-aqueous electrolyte is 2M glacial acetic acid (CH3COOH, >99.7%, Alfa Aesar) in [EMIM] [Ac] (>95%, IoLiTec GmbH) (1-ethyl-3-methylimidazolium acetate). [EMIM] [Ac] is baked at 115° C. in a vacuum oven for 48 h to remove residual water. The water content of the ionic liquid is determined to be <1000 ppm using a coulometric Karl Fischer titrator. Then glacial acetic acid is mixed with [EMIM] [Ac] with a volume ratio of 1.14:10. The ionic conductivity at 6 mS cm$^{-1}$ is measured by a conductivity meter (YSI model 3200). After the deposition of a-Si:H thin films on Ni substrates (1.25 cm×1.25 cm), samples are cut into circular discs (diameter=1.25 cm). The thickness of a-Si:H films varies between 247 nm and 3.0 mm and the active material mass varies between 70 mg and 840 mg. The electrochemical performance of the a-Si:H thin films are tested using a half-cell configuration with P/N ratio (positive capacity/negative capacity)>100. The positive electrode is a piece of sintered Ni(OH)$_2$ that is fabricated in-house and used as standard positive electrodes for our Ni/MH battery research. Both electrodes are baked at 115° C. in a vacuum oven for 12 h before cell assembly. A 1.25 cm (dia.) Swagelok-type cell is assembled in an Ar-filled glove box using an a-Si:H thin film anode and a sintered Ni(OH)$_2$ cathode, separated by a standard nonwoven separator and clamped with two 1.25 cm (dia.) nickel rod current collectors. Then 1 mL of electrolyte is injected into the cell before the cell is sealed for testing. The electrochemical charge/discharge tests are performed using an Arbin BT-2143 battery test station at constant currents and a discharge cut-off voltage at 0.6 V. To study the rate capability of a-Si:H anode, the current densities are varied between 510 and 4082 mA g$^{-1}$. Cyclic voltammetry (CV) measurements are performed using Gamry's Interface 1000 potentiostat/galvanostat in a three-electrode Swagelok cell. The working electrode is an a-Si:H thin film on Ni foil and the counter electrode is a sintered Ni(OH)$_2$ disc. A leak-free reference electrode (Warner Instruments) is inserted through the top port of the Swagelok cell as reference, which has a standard potential of 0.24 V vs. standard hydrogen electrode in a 3.4M KCl solution. Surface morphology and film thickness is measured using JEOL-JSM6320F SEM. The Raman shift is measured using an E-Z Raman spectroscopy system with a 532 nm excitation source. The instrument is calibrated with a signal from a silicon standard at 520 cm$^{-1}$. Fourier transform infrared (FTIR) spectra are measured using Perkin Elmer Spotlight 400 FTIR Imaging System.

The a-Si:H anode prepared via CVD is charged to 1935 mAh g$^{-1}$ at a rate of 2041 mA g$^{-1}$ (~1C rate) and discharged at the same rate (~1C) until a cutoff voltage at 0.6 V vs. the Ni(OH)$_2$ counter electrode. The initial discharge capacity is 888 mAh g$^{-1}$ and gradually increases to 1418 mAh g$^{-1}$ at the 38th cycle, which is more than four times higher than conventional the AB$_5$ alloy used in Ni/MH batteries. Converting to the number of hydrogen per Si atom, it corresponds to SiH$_{1.48}$. The capacity increase during initial cycling may be attributed to the activation of the a-Si:H anode. For Si thin film anode in LIB (lithium ion battery), a similar phenomenon is reported and it is suggested that the capacity increase is due to the transition of crystalline Si to amorphous Si. As the a-Si:H thin films are already amorphous in this experiment, the cause is different from the crystalline Si case. In another report for amorphous Si thin film anode in LIB, it is proposed that the capacity increase is due to the enhanced lithium diffusion resulting from increased density of micro-crackings/grain boundaries during the initial cycles. Likewise, the capacity increase in this study may also be attributed to the enhanced hydrogen diffusion as a result of increased micro-crackings/grain boundaries developed during the first few cycles. The open circuit voltage after charging is 1.3 V. For the 1st cycle test, charge and discharge voltage plateaus are found at 1.37 V and 1.24 V (middle point) respectively, and the charge/discharge overpotential did not show dramatic increase until the specific capacity reached maximum at the 38th cycle. Then the charge/discharge overpotential increased and capacity faded gradually. At the 100th cycle, the specific capacity decreases to 917 mAh $g^{-1}$ and charge voltage plateau increased to a value above 1.7 V. In the discharge curve two plateaus are present at decreased voltages ~1.0 V and 0.85 V, which are suspected to be correlated to the phase or Si—H bond structure changes in the films during cycling and needs to be explicated. The a-Si:H anode exhibits a long cycle life—707 mAh $g^{-1}$ at the end of 500 cycles and a discharge voltage plateau at around 0.9 V. As commonly found in non-aqueous LIB, the increased charge and discharge overpotentials upon cycling may result from the increased internal resistance due to the growth of solid electrolyte interface (SEI) between the electrolyte and electrodes, electrolyte degradation and/or the increased contact resistance arising from the lose contact of a-Si:H thin film from the nickel substrate. After 500 cycles, the cell is dismantled and visual inspection of the anode showed that the a-Si:H thin films remained intact.

The rate capability of the a-Si:H anode is tested. The anode is charged to 4082 mAh $g^{-1}$ at a rate of 2041 mA $g^{-1}$ and discharged at four different rates: 510, 1020, 2041 and 4082 mA $g^{-1}$.

The discharge capacity decreases dramatically with the increase of current density, and the obtained discharge capacities are 2604, 1681, 1080 and 647 mAh $g^{-1}$, corresponding to $SiH_{2.72}$, $SiH_{1.76}$, $SiH_{1.13}$ and $SiH_{0.68}$, respectively. The discharge capacity and coulombic efficiency at a constant discharge rate of 510 mA $g^{-1}$ as a function of charge capacity are measured.

With the increase of charge capacity, discharge capacity increases whereas the coulombic efficiency decreases. The highest discharge capacity obtained is 3635 mAh $g^{-1}$ when the a-Si:H anode is charged to 5752 mAh $g^{-1}$, which is equivalent to about 3.8 hydrogen atoms stored in each silicon atom. This capacity is comparable with the highest capacity reported for a-Si thin film anode in LIB. The coulombic efficiency is 87% when the anode is charged to 1000 mAh $g^{-1}$, which declines to 63% for a charge capacity of 5752 mAh $g^{-1}$. Such a coulombic efficiency is relatively low compared to LIB and the mechanism of capacity loss needs further investigation.

It I believed that during the charge process for an a-Si:H electrode, the weakly bonded protons in the non-aqueous electrolyte are reduced and adsorbed at the surface of the electrode, followed by a hydrogen absorption and diffusion in the bulk a-Si:H. During discharge, hydrogen diffuses toward the anode/electrolyte interface, is oxidized and is desorbed.

The anodic peak is observed at near −0.2 V vs. reference electrode, which results from the oxidation and desorption of absorbed hydrogen atom at the anode-electrolyte interface. With the increase of scan rate, the anodic peak current increases and the peak potential slightly shifts in the positive direction. Unlike typical metal hydride electrode in alkaline solutions, a full cathodic peak is observed at near −0.9 V vs. reference electrode, which benefits from the enlargement in electrochemical window of non-aqueous IL based electrolyte. There is about 0.3 V voltage gap between the hydrogen adsorption peak and the edge of the reduction of electrolyte, whereas for metal hydride electrode in an aqueous 30% KOH electrolyte the hydrogen adsorption peak is so close to the hydrogen evolution threshold that it overlaps with hydrogen evolution peak and cannot be differentiated. A plateau instead of a peak is often observed for metal hydride electrode in 30% KOH electrolyte and self-discharge cannot be ignored. Owing to their widened electrochemical window, nonaqueous IL (ionic liquid) electrolytes enable the use of redox couples with higher standard potential and thus further increase in energy density of proton conducting Ni/MH batteries are promising.

SEM micrographs are taken for an a-Si:H thin film before electrochemical cycling experiment and after 500 cycles. The as-deposited a-Si:H thin film exhibits a smooth surface and an average film thickness of 247 nm. After 500 cycles, the film surface becomes rougher and crackings are observed. However, the films remained attached to the Ni substrate and did not peel off. The average film thickness increases to 281 nm after 500 cycles, about 13% increase than the as-deposited films. As reported for LIB, volumetric expansion occurs anisotropically during the lithiation process, with the preferred expansion perpendicular to the film surface. While contraction occurs both in-plane with and perpendicular to the film surface during delithiation process, film crackings develop as a result. The findings for Si thin film anode in LIB can also explain the crackings and increased thickness after cycling found for a-Si:H thin films in this study. Initially micro-crackings formed, which led to enhanced hydrogen diffusion and initial capacity increase. With repetitive volume expansion and contraction, crackings grow and some active material loses contact with current collectors resulting in a gradual capacity fading.

To determine the bond structure change in a-Si:H thin films, Raman and FTIR spectroscopy are conducted. Raman spectroscopy is sensitive to Si—Si bond structure while FTIR spectroscopy is effective to reveal the Si—H bond configuration. Raman spectra of an a-Si:H thin film before and after 500 cycles is performed. A typical Raman spectrum of a-Si:H thin film comprises of four Gaussian peaks, corresponding to transverse optic (TO), longitudinal optic (LO), longitudinal acoustic (LA) and transverse acoustic (TA) modes. The transition of amorphous to micro-crystalline/crystalline Si is differentiated from the peak wavenumber shift. A broad peak at 460-490 $cm^{-1}$ results from the TO vibrational mode of amorphous silicon and a sharp peak at 512-520 $cm^{-1}$ represents the TO mode of crystal grains of different sizes. A third peak near 500 $cm^{-1}$ is from the bond dilation at the grain boundaries. Only one broad peak present is in the range of 460-520 $cm^{-1}$ before and after 500 cycles. The broad peak centers at 480 $cm^{-1}$, which means that the film is purely amorphous. No noticeable Raman shift is observed before and after cycling, indicating that the a-Si:H thin films remain amorphous during cycling.

FTIR spectra of a-Si:H thin films before and after 500 cycles is performed. The FTIR spectrometer has a limited range starting from 650 $cm^{-1}$, which is at the edge of the major absorption band centered near 630 $cm^{-1}$ due to the wagging vibrational mode of Si mono-hydride (Si—H). Less intensive absorption bands at 800-1000 $cm^{-1}$ and near 2100 cm$^{-1}$ are observed, which are assigned to the bending vibrational and stretching modes of Si dihydride (Si—H$_2$) and poly-hydride complexes (Si—H$_2$)$_n$ respectively. The absorption band near 2000 cm$^{-1}$ resulting from the stretching mode of Si—H is not observed. The absorption peaks due to Si—H$_2$ and (Si—H$_2$)$_n$ shift toward lower wavenumbers and intensity increases slightly after 500 cycles. The most intensive Si—H peak near 630 cm$^{-1}$ is often used to estimate the hydrogen content in a-Si:H thin films.

The electrochemical performance of rf-sputtering deposited Si thin films is performed. Non-hydrogenated a-Si films exhibit very low discharge specific capacities of less than 200 mAh g$^{-1}$, and the capacity increases significantly after hydrogenation treatment, which may be attributed to enhanced hydrogen diffusion after hydrogenation. Specifically, a thicker sample NT (nickel tab) –92, ~3.0 microns, hydrogenated with 6 MPa hydrogen pressure at 300° C. for 2 h, shows a discharge capacity in excess of 2224 mAh g$^{-1}$ after 3 cycles. However, capacity faded quickly afterwards. In contrast, a thinner sample NT-93, ~1.2 microns, hydrogenated at 500° C. and 1 MPa for 2 h exhibits a discharge capacity of 2377 mAh g$^{-1}$ after 13 cycles and no sign of capacity fading after 14 cycles. A 1 mm-thick Si thin film anode in LIB exhibits a capacity of 3000 mAh g$^{-1}$ for 12 cycles followed by a quick decline. Compared to the large volume change for a Si thin film anode during lithiation/delithiation, it may have much smaller volume change during hydrogenation/dehydrogenation as hydrogen is much smaller than lithium. And thus the high capacity can be retained with longer lifetime for thicker (>1 mm) a-Si thin films. Several reference ex-situ hydrogenated a-Si:H thin films (1 MPa/300° C./2 h) performed poorly in cycling tests, yielding low capacities on the order of the non-hydrogenated a-Si films (<200 mAh g$^{-1}$). It appears hydrogen incorporation into the silicon network requires thermal activation, whether that process involves permanent microstructural changes of the silicon film or simply a relaxation-induced diffusion enhancement for the hydrogen species at high temperature. It is well known in thin film silicon technology that microcrystalline regrowth of amorphous films occurs at around 600° C.

To summarize, using both in-situ hydrogenated CVD and rf-sputtering followed by ex-situ hydrogenation, a-Si:H thin films are prepared and used as anodes in a proton conducting Ni/MH battery with non-aqueous ionic liquid based electrolyte, which exhibit high specific capacities and excellent cycle stabilities. In CVD grown thin films, a specific discharge capacity of 1418 mAh g$^{-1}$ is obtained at a discharge rate of 2041 mA g$^{-1}$ for the 38th cycle and the capacity retained 707 mAh g$^{-1}$ after 500 cycles; and a maximum capacity of 3635 mAh g$^{-1}$ is obtained at a lower discharge rate. A 1.2 micron thick rf-sputtered a-Si:H thin film anode hydrogenated at 500° C. demonstrates a capacity of 2377 mAh g$^{-1}$, while another 3.0 micron thick a-Si:H thin film exhibits a capacity of 2224 mAh g$^{-1}$ at the 3rd cycle.

The invention claimed is:

1. A rechargeable electrochemical cell comprising:
a stable silicon-based hydrogen storage negative electrode, a positive electrode capable of reversibly absorbing and desorbing hydrogen, and an electrolyte composition;
wherein the negative electrode comprises a hydrogen storage material comprising >27 wt % silicon, and is in contact with the electrolyte composition, wherein the hydrogen storage material comprises amorphous silicon;
wherein the electrolyte composition is pH neutral or acidic and allows for transport of protons; and
wherein during charge/discharge cycles the negative electrode reversibly charges and discharges hydrogen.

2. The electrochemical cell according to claim 1, wherein the hydrogen storage material is comprised in a film in adherence to a substrate selected from metal, glass, inorganics and plastic.

3. The electrochemical cell according to claim 1, wherein the hydrogen storage material contains >50 wt % Si based on the total weight of the hydrogen storage material.

4. The electrochemical cell according to claim 1, wherein the negative electrode comprises >50% by weight Si, based on the total weight of the negative electrode.

5. The rechargeable electrochemical cell according to claim 1, wherein the electrolyte composition comprises a protic acid.

6. The electrochemical cell according to claim 1, wherein the electrolyte composition comprises one or more ionic compounds selected from the group consisting of protic acids, protic ammonium compounds, protic oxonium compounds, aprotic ammonium compounds, aprotic oxonium compounds, aprotic phosphonium compounds and alkali or alkali earth metal salts.

7. The electrochemical cell according to claim 1, wherein the electrolyte composition comprises an ionic compound containing a cation selected from the group consisting of NH$_4$, methylammonium, ethylammonium, dimethylammonium, diethylammonium, trimethylammonium, triethylammonium, tributylammonium, diethylmethylammonium, hydroxyethylammonium, methoxymethylammonium, dibutylammonium, methylbutylammonium, anilinium, pyridinium, 2-methylpyridinium, imidazolium, 1-methylimidazolium, 1,2-dimethylimidazolium, imidazolinium, 1-ethylimidazolium, 1-(4-sulfobutyl)-3-methylimidazolium, 1-allylimidazolium, quinolinium, isoquinolinium, pyrrolinium, pyrrolininium or pyrrolidinium; 1-butyl-1-methylpyrrolidinium, tetramethylammonium, tetraethylammonium, tetra-n-butylammonium, n-butyl-tri-ethylammonium, benzyl-tri-methylammonium, tri-n-butylmethylammonium, benzyl-tri-ethylammonium, 1-methylpyridinium, 1-butyl-3,5-dimethylpyridinium, 1,2,4-trimethylpyrazolium, trimethylhydroxyethylammonium, tri-(hydroxyethyl)methylammonium, dimethyl-di(polyoxyethylene)ammonium, 1,2,3-trimethylimidazolium, 1-butyl-3-methylimidazolium, 1-ethyl-2,3-dimethylimidazolium, 1-allyl-3-methylimidazolium, 1-hydroxyethyl-3-methylimidazolium, 1,3-dimethylimidazolium, 1-ethyl-1-methylpiperidinium, 4-ethyl-4-methylmorpholinium, 1-(cyanomethyl)-3-methylimidazolium, 1-(3-cyanopropyl)pyridinium, 1,3-bis(cyanomethyl)imidazolium, 1-hexyl-3-methylimidazolium or 1-ethyl-3-methylimidazolium; and methyltriphenylphosphonium, tetraphenylphosphonium, tetrabutylphosphonium, tributylmethylphosphonium, triethylmethylphosphonium, trihexyltetradecylphosphonium, triphenylpropylphosphonium or tetrakis(hydroxymethyl)phosphonium; and
containing an anion selected from the group consisting of carboxylates, imides, methides, nitrate, bifluoride, halides, borates, phosphates, phosphinates, phosphonates, sulfonates, sulfates, carbonates and aluminates.

8. The electrochemical cell according to claim 1, wherein the electrolyte composition comprises an ionic compound containing an anion selected from the group consisting of F$_2$P(C$_2$F$_5$)$_4^-$, F$_3$P(C$_2$F$_5$)$_3^-$, F$_4$P(C$_2$F$_5$)$_2^-$, F$_2$P(C$_3$F$_7$)$_4^-$, F$_3$P(C$_3$F$_7$)$_3^-$, F$_4$P(C$_3$F$_7$)$_2^-$, F$_2$P(C$_4$F$_9$)$_4^-$, F$_3$P(C$_4$F$_9$)$_3^-$, F$_4$P(C$_4$F$_9$)$_2^-$, perfluoroalkylcarboxylate, perfluoroalkylsulfonate, bis(perfluoroalkylsulfonyl)imide, (perfluoroalkylsulfonyl)(perfluoroalkylcarboxyl)imide, tris(perfluoroalkylsulfonyl)methide, trifluoroacetate, trifluoromethanesulfonate, bis(trifluoromethylsulfonyl)imide, tris(trifluoromethylsulfonyl)methide, tetrafluoroborate, bisoxalatoborate, difluorooxalatoborate, di(trifluoroacetato)oxalatoborate, trisoxalatophosphate, tetrafluorooxalatophosphate and di(trifluoroacetato)oxalatoaluminate.

9. The electrochemical cell according to claim 1, wherein the electrolyte composition comprises an ionic compound containing a carboxylate anion of formula RCOO⁻ where R is hydrogen or hydrocarbyl.

10. The electrochemical cell according to claim 1, wherein the electrolyte composition comprises an ionic compound containing an anion selected from the group consisting of dicyanamide, $N(SO_2F)_2^-$, $[N(SO_2CF_3)_2]^-$, bis(pentafluoroethylsulfonyl)imide, $N(CF_3SO_2)(CF_3(CF_2)_3SO_2)^-$ or a (perfluoroalkylsulfonyl)(perfluoroalkylcarboxyl)imide; $C(CF_3SO_2)_3^-$; $HF_2^-$; chloride, bromide, iodide or fluoride; orthoborate, tetrahydroxyborate, tetraborate, tetraphenylborate, $[B(3,5-(CF_3)_2C_6H_3)_4]^-$, $B(C_2O_4)_2^-$ (bis(oxalato)borate), difluoro(oxalato)borate, di(trifluoroacetato)oxalatoborate, $B(C_6F_5)_4^-$ or $BF_4^-$; dihydrogen phosphate, hydrogen phosphate, alkyl phosphate, dialkyl phosphate, phosphate, $PF_6^-$, $HPO_3F^-$, trisoxalatophosphate, tetrafluorooxalatophosphate, $F_2P(C_2F_5)_4^-$, $F_3P(C_2F_5)_3^-$, $F_4P(C_2F_5)_2^-$, $F_2P(C_3F_7)_4^-$, $F_3P(C_3F_7)_3^-$, $F_4P(C_3F_7)_2^-$, $F_2P(C_4F_9)_4^-$, $F_3P(C_4F_9)_3^-$ or $F_4P(C_4F_9)_2^-$; trifluoromethanesulfonate, p-toluenesulfonate or methanesulfonate; hydrogensulfate, sulfate, thiosulfate, methylsulfate or ethylsulfate; carbonate, hydrogencarbonate, methylcarbonate, ethylcarbonate or butylcarbonate; and $Al(OC(CF_3)_3)_4^-$, di(trifluoroacetato)oxalatoaluminate, tetrachloroaluminate, tetrafluoroaluminate, tetraiodoaluminate or tetrabromoaluminate.

11. The electrochemical cell according to claim 1, wherein the electrolyte composition comprises an ionic liquid.

12. The electrochemical cell according to claim 1, wherein the electrolyte composition comprises an ionic liquid selected from the group consisting of diethylmethylammonium trifluoromethanesulfonate, ethylammonium nitrate, triethylammonium methanesulfonate, 2-methylpyridinium trifluoromethanesulfonate, ammonium fluoride, methylammonium nitrate, hydroxyethylammonium nitrate, ethylammonium nitrate, dimethylammonium nitrate, 1-methylimidazolium nitrate, 1-ethylimidazolium nitrate, t-butylammonium tetrafluoroborate, hydroxyethylammonium tetrafluoroborate, methylbutylammonium tetrafluoroborate, triethylammonium tetrafluoroborate, imidazolium tetrafluoroborate, 1-methylimidazolium tetrafluoroborate, 1,2-dimethylimidazolium tetrafluoroborate, t-butylammonium triflate, 2-fluoropyridinium triflate, hydroxyethylammonium triflate, 1,2-dimethylimidazolium triflate, imidazolium triflate, 1-methylimidazolium hydrogensulfate, 1-methylimidazolium chloride, 1-methylimidazolium triflate, hydronium triflate, methylammonium mesylate, ethylammonium mesylate, butylammonium mesylate, methoxyethylammonium mesylate, dimethylammonium mesylate, dibutylammonium mesylate, triethylammonium mesylate, dimethylethylammonium mesylate, hydronium hydrogensulfate, ammonium hydrogensulfate, methylammonium hydrogensulfate, ethylammonium hydrogensulfate, propylammonium hydrogensulfate, n-butylammonium hydrogensulfate, t-butylammonium hydrogensulfate, dimethylammonium hydrogensulfate, diethylammonium hydrogensulfate, di-n-butylammonium hydrogensulfate, methylbutylammonium hydrogensulfate, ethylbutylammonium hydrogensulfate, trimethylammonium hydrogensulfate, triethylammonium hydrogensulfate, tributylammonium hydrogensulfate, dimethylethylammonium hydrogensulfate, dibutylammonium fluorohydrogen phosphate, triethylammonium fluorohydrogen phosphate, tributylammonium fluorohydrogen phosphate, hydronium dihydrogen phosphate, methylammonium dihydrogen phosphate, ethylammonium dihydrogen phosphate, propylammonium dihydrogen phosphate, n-butylammonium dihydrogen phosphate, methoxyethylammonium dihydrogen phosphate, dimethylammonium dihydrogen phosphate, dibutylammonium dihydrogen phosphate, methylbutylammonium dihydrogen phosphate, ammonium bifluoride, methylammonium bifluoride, ethylammonium bifluoride and dimethylammonium bifluoride.

13. The electrochemical cell according to claim 1, wherein the electrolyte composition comprises an ionic liquid selected from the group consisting of 1-ethyl-3-methylimidazolium trifluoromethanesulfonate, 1-ethyl-3-methylimidazolium tetrafluoroborate, 1-ethyl-3-methylimidazolium bis(trifluoromethylsulfonyl)imide, 1-ethyl-3-methylimidazolium acetate, 1-butyl-3-methylimidazolium trifluoromethanesulfonate, 1-butyl-3-methylimidazolium acetate (BMIM Ac), 1-butyl-3-methylimidazolium bis(trifluoromethylsulfonyl)imide, tri-n-butylmethylammonium methylsulfate, 1-ethyl-2,3-dimethylimidazolium ethylsulfate, 1-butyl-3-methylimidazolium thiocyanate, 1-butyl-3-methylimidazolium tetrachloroaluminate, 1-butyl-3-methylimidazolium methylsulfate, 1-butyl-3-methylimidazolium methanesulfonate, 1-butyl-3-methylimidazolium hydrogencarbonate, 1-butyl-3-methylimidazolium hydrogensulfate, 1-butyl-3-methylimidazolium chloride, 1,2,3-trimethylimidazolium methylsulfate, tris-(hydroxyethyl)methylammonium methylsulfate, 1,2,4-trimethylpyrazolium methylsulfate, 1,3-dimethyldiazolium hydrogencarbonate, 1-ethyl-3-methylimidazolium hydrogencarbonate, 1-ethyl-3-methylimidazolium chloride, 1-ethyl-3-methylimidazolium tetrachloroaluminate, 1-ethyl-3-methylimidazolium thiocyanate, 1-ethyl-3-methylimidazolium methanesulfonate, 1-ethyl-3-methylimidazolium hydrogensulfate, 1-ethyl-3-methylimidazolium ethylsulfate, 1-ethyl-3-methylimidazolium nitrate, 1-butylpyridinium chloride, 1-ethyl-3-methylimidazolium dicyanamide, 1-ethyl-3-methylimidazolium hexafluorophosphate, 1-butyl-3,5-dimethylpyridinium bromide, 1-ethyl-3-methylimidazolium bis(pentafluoroethylsulfonyl)imide, 1-ethyl-2,3-dimethylimidazolium methylcarbonate, carboxymethyl-tributylphosphonium bis(trifluoromethylsulfonyl)imide, N-carboxyethyl-methylpyrrolidinium bis(trifluoromethylsulfonyl)imide, N-carboxymethyl-trimethylammonium bis(trifluoromethylsulfonyl)imide, N-carboxymethyl-methylpyridinium bis(trifluoromethylsulfonyl)imide, hexyltrimethylammonium bis(trifluromethylsulfonyl)imide, tetrabutylphosphonium methanesulfonate, triethylmethylammonium methylcarbonate, 1-ethyl-1-methylpiperidinium methylcarbonate, 4-ethyl-4-methylmorpholinium methylcarbonate, 1-butyl-1-methylpyrrolidinium methylcarbonate, triethylmethylammonium dibutylphosphate, tributylmethylphosphonium dibutylphosphate, triethylmethylphosphonium dibutylphosphate, tetrabutylphosphonium tetrafluoroborate, tetrabutylphosphonium p-toluenesulfonate, tributylmethylphosphonium methylcarbonate, 1-ethyl-3-methylimidazolium hydrogencarbonate, tributylmethylammonium methylcarbonate, tributylmethylammonium dibutylphosphate, 1-ethyl-3-methylimidazolium dibutylphosphate, 1-butyl-3-methylimidazolium dibutylphosphate, 1-(cyanomethyl)-3-methylimidazolium chloride, 1-(3-cyanopropyl)-3-methylimidazolium chloride, 1-(3-cyanopropyl)-3-methylimidazolium bis(trifluoromethylsulfonyl)imide, 1-(3- cyanopropyl)-3-methylimidazolium dicyanamide, 1-(3-cyanopropyl)pyridinium chloride, 1-(3-cyanopropyl)pyridinium bis(trifluoromethylsulfonyl)imide, 1,3-bis(cyanomethyl)imidazolium chloride, 1,3-bis(cyanomethyl)imidazolium bis(trifluoromethylsulfonyl)imide, 1,3-bis(cyanopropyl)imidazolium chloride, 1,3-bis(3-cyanopropyl)imidazolium bis(trifluoromethylsulfonyl)imide, 1-butyl-3-methylimidazolium hexafluorophosphate, 1-butyl-3-methylimidazolium tetrafluoroborate, 1-ethyl-3-methylimidazolium tetrafluoroborate, 1-ethyl-3-methylimidazolium chloride, 1-ethyl-3-methylimidazolium bromide, 1-butyl-3-methylimidazolium bromide, 1-hexyl-3-methylimidazolium chloride, tributylmethylphosphonium methylsulfate, triethylmethylphosphonium dibutylphosphate, trihexyltetradecylphosphonium bis(trifluoromethylsulfonyl)imide, trihexyltetradecylphosphonium bis(2,4,4-trimethylphenyl)phosphinate, trihexyltetradecylphosphonium bromide, trihexyltetradecylphosphonium chloride, trihexyltetradecylphosphonium decanoate, trihexyltetradecylphosphonium dicyanamide, 3-(triphenylphosphonio)propane-1-sulfonate and 3-(triphenylphosphonio)propane-1-sulfonic acid tosylate.

14. The electrochemical cell according to claim 1, wherein the electrolyte composition comprises an ionic compound selected from the group consisting of hydrochloric acid, nitric acid, phosphoric acid, sulfuric acid, boric acid, hydrofluoric acid, hydrobromic acid, hydroiodic acid, perchloric acid, periodic acid, sodium bisulfate, potassium bisulfate, ammonium bisulfate, $HAsF_6$, $HBF_4$, $H(OEt_2)BF_4$, $HPF_6$, $H[N(SO_2CF_3)_2]$ and $H[N(SO_2CF_2CF_3)_2]$.

15. The electrochemical cell according to claim 1, wherein the electrolyte composition comprises a carboxylic acid of formula RCOOH where R is hydrogen or hydrocarbyl or a sulfonic acid of formula $RSO_3H$ where R is alkyl or aryl or alkyl or aryl substituted by one to three halogens.

16. The electrochemical cell according to claim 1, wherein the electrolyte composition comprises formic acid, acetic acid, acrylic acid, fluoroacetic acid, difluoroacetic acid, trifluoroacetic acid, chloroacetic acid, dichloroacetic acid, trichloroacetic acid, propanoic acid, butyric acid, 3-methylbutanoic acid, valeric acid, hexanoic acid, heptanoic acid, caprylic acid, nonanoic acid, benzoic acid, salicylic acid, 2-, 3- or 4-nitrobenzoic acid; citric acid, oxalic acid, tartaric acid, glycolic acid, gluconic acid, malic acid, mandelic acid, nitrilotriacetic acid, N-(2-hydroxyethyl)-ethylenediaminetriacetic acid, ethylenediaminetetraacetic acid, diethyleneaminepentaacetic acid, p-toluenesulfonic acid, phenylsulfonic acid, methanesulfonic acid, trifluoromethanesulfonic acid, $[H(OEt_2)_2][B\ [3,5\text{-}(CF_3)_2C_6H_3]_4]$, $[H(OEt_2)_2][B(C_6F_5)_4]$ or $[H(OEt_2)_2][Al(OC(CF_3)_3)_4]$.

17. The electrochemical cell according to claim 1, wherein the electrolyte composition comprises one or more organic solvents selected from the group consisting of organic carbonates, ethers, glymes, ortho esters, polyalklene glycols, esters, lactones, glycols, formates, sulfones, sulfoxides, amides, alcohols, ketones, nitro solvents and nitrile solvents.

18. A rechargeable electrochemical cell according to claim 1, further comprising a casing having the negative electrode and the positive electrode positioned therein,
wherein the electrolyte composition in contact with the negative and positive electrodes, and wherein
the gravimetric energy density of the cell is >100 Wh/kg and/or
the volumetric energy density of the cell is >250 Wh/L and/or
the discharge capacity of the hydrogen storage material is ≥800 mAh/g over 20 cycles or more.

19. A rechargeable electrochemical cell according to claim 1, further comprising a casing having the negative electrode and the positive electrode positioned therein,
wherein the electrolyte composition is in contact with the negative and positive electrodes, and
wherein the reversible half cell charge/discharge electrochemical reaction at the negative electrode is

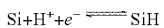

wherein Si is a silicon-based hydrogen storage material.

20. A rechargeable electrochemical cell according to claim 1, further comprising a casing having the negative electrode and the positive electrode positioned therein,
wherein the electrolyte composition in contact with the negative and positive electrodes, and
wherein the positive electrode comprises one or more cathode active materials selected from the group consisting of transition metals, transition metal oxides, transition metal hydroxides, transition metal oxide/hydroxides and transition metal fluorides.

21. The electrochemical cell of claim 1 wherein the negative electrode comprises hydrogenated amorphous silicon (a-Si:H) or hydrogenated amorphous silicon carbide (a-$Si_{1-x}C_x$:H).

* * * * *